(12) United States Patent
Silano et al.

(10) Patent No.: US 11,604,922 B2
(45) Date of Patent: Mar. 14, 2023

(54) SYSTEM FOR GENERATING AN OUTPUT FILE

(71) Applicant: CSER VENTURES, LLC, Melbourne, FL (US)

(72) Inventors: Carmine Silano, Melbourne, FL (US); Edward Roberts, Melbourne, FL (US); R. Maxwell Flaherty, Topsfield, MA (US); J. Christopher Flaherty, Auburndale, FL (US)

(73) Assignee: CSER Ventures, LLC, Melbourne, FL (US)

( * ) Notice: Subject to any disclaimer, the term of this patent is extended or adjusted under 35 U.S.C. 154(b) by 0 days.

(21) Appl. No.: 17/284,990

(22) PCT Filed: Nov. 1, 2019

(86) PCT No.: PCT/US2019/059352
§ 371 (c)(1),
(2) Date: Apr. 13, 2021

(87) PCT Pub. No.: WO2020/092879
PCT Pub. Date: May 7, 2020

(65) Prior Publication Data
US 2021/0357580 A1    Nov. 18, 2021

Related U.S. Application Data

(60) Provisional application No. 62/754,881, filed on Nov. 2, 2018, provisional application No. 62/871,514, filed on Jul. 8, 2019.

(51) Int. Cl.
*G06F 3/04817* (2022.01)
*G06F 40/177* (2020.01)

(52) U.S. Cl.
CPC ........ *G06F 40/177* (2020.01); *G06F 3/04817* (2013.01)

(58) Field of Classification Search
CPC .. G06F 40/177; G06F 3/04817; G06F 3/0481; G06F 3/0486; G06F 3/04847; G06F 3/0482; G06F 3/048; G09G 5/00
See application file for complete search history.

(56) References Cited

U.S. PATENT DOCUMENTS 7,634,789 B2   12/2009   Gerba et al.
7,767,895 B2    8/2010   Johnston
(Continued)

FOREIGN PATENT DOCUMENTS

| GB | 2548503 | 9/2017 |
|---|---|---|
| WO | 2007072051 | 6/2007 |
| WO | 2014093668 | 6/2014 |

OTHER PUBLICATIONS

Great Britain Office Action dated Nov. 22, 2021 issued in corresponding Great Britain Application No. GB1707612.6.
(Continued)

*Primary Examiner* — Jeanette J Parker
(74) *Attorney, Agent, or Firm* — Onello & Mello, LLP

(57) ABSTRACT

A system for creating an output comprises a processing unit, a user input module operably connected to the processing unit, and a display operably connected to the processing unit. The processing unit provides on the display: a grid image comprising multiple cells, each cell representing a duration of time; and a selection area comprising multiple select icons, each select icon representing a source data file. The processing unit is configured such that a user can create a grid layout representing the correlation between individual (Continued)

selected source data files and one, two, or more of the multiple cells. The processing unit produces the output based on the correlation.

32 Claims, 25 Drawing Sheets

(56) References Cited

U.S. PATENT DOCUMENTS

| | | | |
|---|---|---|---|
| 7,903,927 B2 | 3/2011 | Minami et al. | |
| 8,330,033 B2 | 12/2012 | Lengeling et al. | |
| 8,659,622 B2 | 2/2014 | Dhawan | |
| 8,831,408 B2 | 9/2014 | Shore | |
| 9,129,640 B2 | 9/2015 | Hamer | |
| 9,417,756 B2 | 8/2016 | Pendergast et al. | |
| 9,583,144 B2 | 2/2017 | Ricciardi | |
| 9,640,084 B2 | 5/2017 | Schweid et al. | |
| 9,715,630 B2 | 7/2017 | Liu et al. | |
| 10,535,370 B2 | 1/2020 | Silano et al. | |
| 2001/0041050 A1 | 11/2001 | Iwata et al. | |
| 2002/0138834 A1 | 9/2002 | Gerba et al. | |
| 2006/0008247 A1 | 1/2006 | Minami et al. | |
| 2007/0209025 A1* | 9/2007 | Jing | G06F 16/58 |
| 2008/0141849 A1 | 6/2008 | Johnston | |
| 2009/0234831 A1* | 9/2009 | Ebadollahi | G06Q 30/0201 707/999.005 |
| 2011/0209224 A1 | 8/2011 | Gentile et al. | |
| 2012/0054603 A1* | 3/2012 | Demant | G06F 3/0484 715/247 |
| 2012/0060668 A1* | 3/2012 | Lengeling | G10H 1/0008 84/645 |
| 2012/0221383 A1* | 8/2012 | Shore | G11B 27/34 386/E5.028 |
| 2013/0120442 A1 | 5/2013 | Dhawan | |
| 2014/0115477 A1 | 4/2014 | Pendergast et al. | |
| 2014/0186004 A1 | 7/2014 | Hamer | |
| 2014/0279177 A1* | 9/2014 | Stump | G06Q 30/0611 705/26.4 |
| 2015/0074802 A1* | 3/2015 | Sanjeev | H04L 51/12 726/22 |
| 2015/0086947 A1 | 3/2015 | Schweid et al. | |
| 2015/0269442 A1 | 9/2015 | Liu et al. | |
| 2015/0348588 A1 | 12/2015 | Voss | |
| 2016/0247537 A1 | 8/2016 | Ricciardi | |
| 2016/0279527 A1* | 9/2016 | Nishioka | A63F 13/822 |
| 2017/0091153 A1* | 3/2017 | Thimbleby | G06F 3/0486 |
| 2017/0091207 A1* | 3/2017 | Kumar | G06F 16/2228 |
| 2018/0024705 A1 | 1/2018 | Silano et al. | |
| 2018/0157746 A1* | 6/2018 | Zhu | G06F 16/685 |
| 2018/0376205 A1* | 12/2018 | Oswal | G02B 27/0172 |
| 2019/0355372 A1* | 11/2019 | Bittner | G10L 19/00 |
| 2020/0037416 A1* | 1/2020 | Oobayashi | H05B 47/155 |
| 2022/0254376 A1 | 8/2022 | Silano et al. | |

OTHER PUBLICATIONS

Great Britain Office Action dated Sep. 13, 2021 issued in corresponding Great Britain Application No. GB1707612.6.
Canadian Office Action dated Oct. 19, 2021 issued in corresponding Canadian Application No. 2970480.
Australian Office Action dated Jan. 25, 2022 issued in related Australian Application No. 2021201569.
Great Britain Office Action dated Jul. 9, 2021 issued in corresponding Great Britain Application No. GB1707612.6.
International Search Report and Written Opinion dated Jan. 17, 2020 issued in corresponding International Application No. PCT/US2019/059352.
"System for Generating an Output File" Specification, Drawings, and Prosecution History of United States U.S. Appl. No. 15/520,972, filed Apr. 21, 2017, now U.S. Pat. No. 10,535,370, dated Jan. 25, 2018, by Carmine John Silano, et al., which is stored in the United States Patent and Trademark Office (USPTO).
Australian Office Action dated Apr. 24, 2020 issued in corresponding Australian Application No. 2015336114.
Great Britain Office Action dated Feb. 15, 2021 issued in corresponding Great Britain Application No. GB1707612.6.
International Search Report and Written Opinion dated Dec. 29, 2015 issued in corresponding International Application No. PCT/US2015/056398.
Great Britain Office Action dated May 26, 2022 issued in corresponding Great Britain Application No. 2107060.2.
Great Britain Office Action dated Dec. 20, 2022 issued in corresponding Great Britain Application No. GB2107060.2.
Notice of Acceptance dated Dec. 22, 2022 issued in related Australian Application No. 2021201569.

* cited by examiner

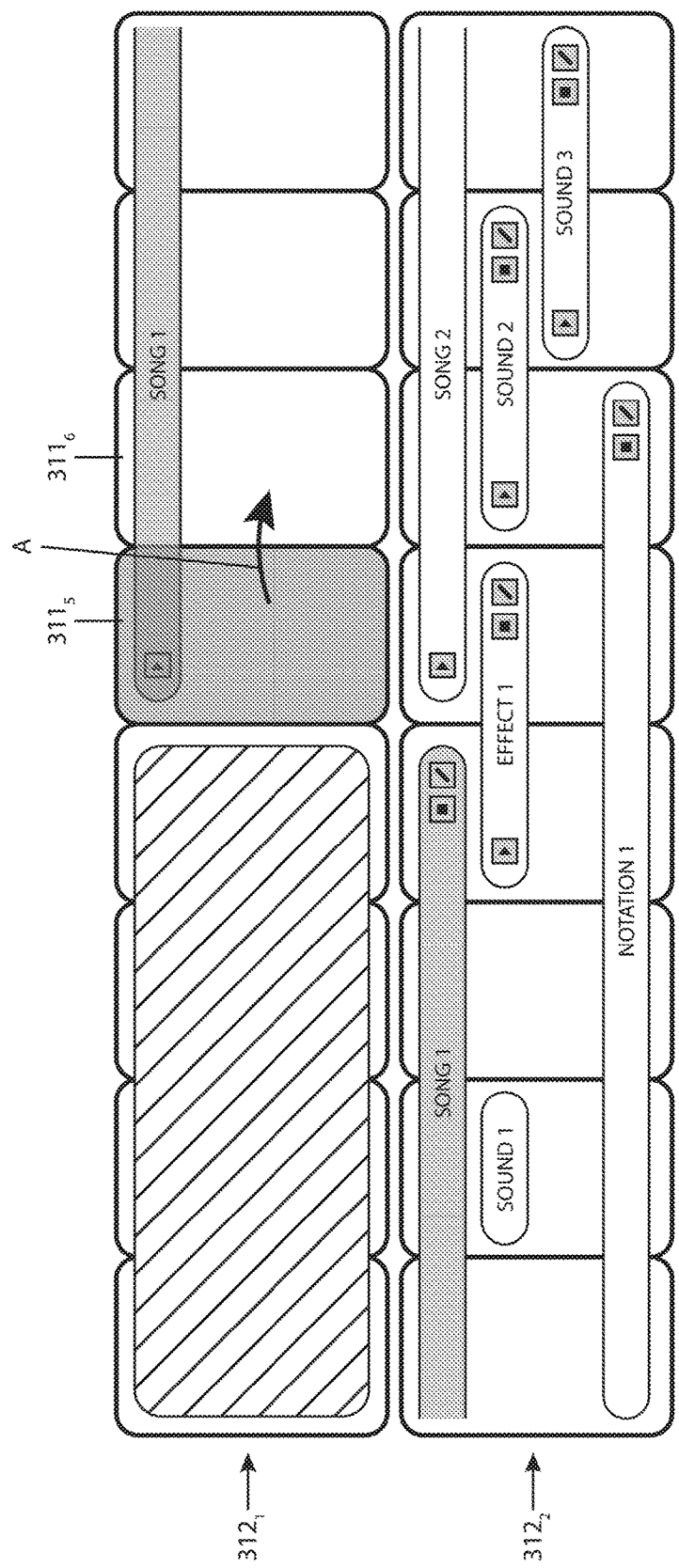
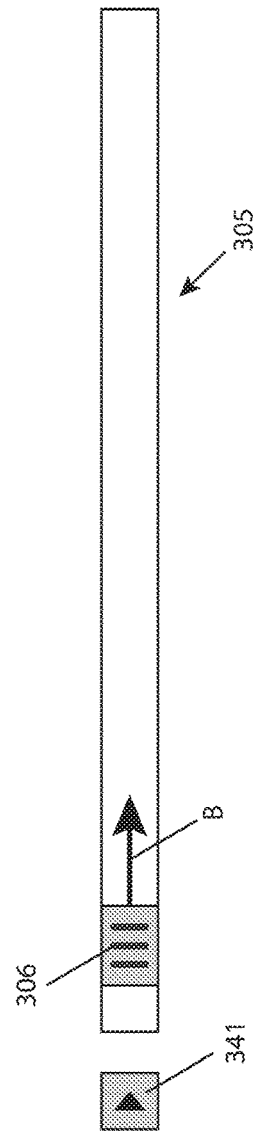
FIG 5A
FIG 5B

SYSTEM FOR GENERATING AN OUTPUT FILE

RELATED APPLICATIONS

The present application claims priority to U.S. Provisional Patent Application Ser. No. 62/754,881, entitled "System for Generating an Output File", filed Nov. 2, 2018, and U.S. Provisional Patent Application Ser. No. 62/871,514, entitled "System for Generating an Output File", filed Jul. 8, 2019, the content of each of which is incorporated herein by reference in its entirety.

The present application, while not claiming priority to, may be related to U.S. patent application Ser. No. 15/520,972, entitled "System for Generating an Output File", filed Apr. 21, 2017, which is a 35 USC 371 national stage filing of Patent Cooperation Treaty Application Serial Number PCT/US2015/056398, entitled "System for Generating an Output File", filed Oct. 20, 2015, which claims priority to U.S. Provisional Patent Application Ser. No. 62/066,932, entitled "System for Generating an Output File", filed Oct. 22, 2014, the content of each of which is incorporated herein by reference in its entirety.

FIELD

The present inventive concepts generally relate to the field of systems for creating an output, such as a system that operates over a network to produce an output that correlates source data files to cells of a grid layout.

BACKGROUND

Computerized and manual systems for creating an output representing data files are available. Systems for linking audio files to a choreographed routine involve manual generation of the links on paper forms. There is a need for improved systems, methods and devices for creating an output representing multiple linked data files.

SUMMARY

According to one aspect of the present inventive concepts, a system for creating an output, comprises: a processing unit; a user input module operably connected to the processing unit; and a video monitor operably connected to the processing unit, and the processing unit provides on the video monitor: a grid image comprising multiple cells, each cell representing a duration of time; and a selection area comprising multiple select icons, each select icon representing a source data file. The processing unit is configured such that a user can create a grid layout representing the correlation between individual selected source data files and one, two, or more of the multiple cells. The processing unit produces the output based on the correlation.

In some embodiments, the grid image comprises multiple rows, each comprising at least one cell. The multiple rows can each comprise at least four cells. The multiple rows can each comprise eight cells. The processing unit can be further configured such that a user can add and/or remove rows to the grid image.

In some embodiments, the processing unit is further configured to set the total number of rows based on input from a user. The processing unit can be further configured such that a user can add and/or remove cells to one, two, or more rows.

In some embodiments, the processing unit is further configured to set the total number of cells per row based on input from a user. Each row can comprise the same number of cells.

In some embodiments, each cell is associated with a beat of music.

In some embodiments, the time duration of each cell is adjustable based on input from a user. Each cell can be associated with a beat of music and the user input adjusts the numbers of beats per minute.

In some embodiments, the time duration of each cell comprises a time between 0.25 seconds and 1.0 seconds.

In some embodiments, at least one select icon comprises an image representing an audio file. The system further comprises audio file information related to the audio file, and the audio file information can comprise information selected from the group consisting of: text description of audio file; duration of audio file; performer of audio file; composer of audio file; artist associated with audio file; cost of audio file; offset associated with audio file; and combinations thereof. The processing unit can be configured to display the audio file information on the video monitor. The audio file information can be displayed on and/or near the at least one select icon. The audio file information can be displayed when a user hovers a cursor over the at least one select icon. The audio file information can be displayed when the at least one select icon can be selected by a user. The at least one select icon can represent multiple audio files.

In some embodiments, at least one select icon comprises a text image. The processing unit can be configured such that a user can enter text correlating to the text image.

In some embodiments, at least one source data file comprises an audio file. The audio file can comprise a music file. The audio file can comprise a sound effect. The audio file can comprise a voice over. At least one source data file can further comprise audio information. The audio information can comprise amplitude information. The amplitude information can be adjustable by a user. The audio information can comprise offset information. The associated select icon can comprise a width and the width does not include the offset time duration. The offset information can be adjusted by a user. The audio information can comprise trail off information. The associated select icon can comprise a width, and the width does not include the trail off time duration. The trail off information can be adjusted by a user.

In some embodiments, at least one source data file comprises an image file. The associated select icon can comprise a thumbnail preview of the image file.

In some embodiments, at least one source data file comprises a text file. The associated select icon can comprise user editable text.

In some embodiments, at least one source data file comprises a video file. The associated select icon can comprise a thumbnail preview of the video file. The thumbnail preview can be user selectable. The playback speed of the video file can be adjustable. The starting frame of the video file can be selectable. The ending frame of the video file can be selectable. The width of the associated select icon can be determined by the start and end frames of the video file.

In some embodiments, the source data file comprises information correlating to the appearance of the select icon representing the source data file on the video monitor.

In some embodiments, the source data file comprises cost information correlating to cost of including the source data file in the output.

In some embodiments, the source data file comprises position information correlating to where the select icon representing the source data file will appear within a cell of the grid image. The position information can comprise information related to where the associated select icon will appear in relation to select icons of other source data files in the same cell.

In some embodiments, the source data file comprises a proprietary overlay. The proprietary overlay can comprise a sound overlay. The overly can be dynamically generated during playback. The location of the overlay can be dynamically computed. The pitch of the overlay can be modified by the processing unit. The speed of the playback of the overlay can be modified by the processing unit. The frequency of the overlay can be modified by the processing unit. The proprietary overlay can comprise an image overlay. The proprietary overlay can comprise a removable overlay. The processing unit can be configured to remove the overlay upon purchase of the output. The processing unit can be configured to remove the overlay when combined with a second source data file also including a proprietary overlay.

In some embodiments, the processing unit is further configured to allow a user to associate multiple source data files to at least one cell.

In some embodiments, the processing unit is further configured to associate a source data file with a cell when a user drags and drops the associated select icon in the cell. The select icon can be dragged from the selection area to the cell, Multiple select icons can be dragged from the selection area to a cell simultaneously. The select icon can be dragged from a first cell to a second cell, Multiple select icons can be dragged from the first cell to the second cell simultaneously.

In some embodiments, the processing unit is further configured to allow a user to associate a select icon with a cell by direct entry of data into the cell. The system can further comprise a lookup menu of select icons configured to assist in the direct entry.

In some embodiments, the system further comprises a microphone, and the processing unit is further configured to allow a user to associate a select icon with a cell via voice control via the microphone.

In some embodiments, the processing unit is configured to provide a copy and paste function for associating a select icon with a cell.

In some embodiments, the processing unit comprises a keyboard comprising arrow keys, and a select icon can be moved from cell to cell via the arrow keys.

In some embodiments, multiple cells comprise similar durations of time.

In some embodiments, a first cell comprises a first duration of time, and a second cell comprises a second duration of time, and the first duration of time is dissimilar from the second duration of time.

In some embodiments, the processing unit comprises a local computer.

In some embodiments, the processing unit comprises a local computer only.

In some embodiments, the processing unit comprises multiple computers. The multiple computers can be connected over a network. The network can comprise a network selected from the group consisting of: the Internet; a LAN; and combinations thereof. The multiple computers can be configured as an Internet-based user interface. At least one of the two computers can comprise a computer selected from the group consisting of: desktop; laptop; server; storage device; tablet; phone; and combinations thereof. At least one computer can be configured to support multiple users simultaneously. The multiple users can be located at multiple different locations remote from the at least one computer. The at least one computer can be configured to perform multi-threaded processing. The at least one computer can comprise multiple CPUs.

In some embodiments, the processing unit is configured to allow access by multiple users. The processing unit can comprise a login function comprising a permission routine.

In some embodiments, the processing unit is configured to allow a user to perform two or more of the following steps: populate the grid layout; edit the grid layout; process the grid layout; review the grid layout; finalize the grid layout; purchase the output; and retrieve the output.

In some embodiments, the processing unit comprises a preview function. The preview function can be configured to master a cumulative set of selected source data files. Mastering includes a process selected from the group consisting of: summing; combining; manipulating; processing; mastering; equalizing; compressing; filtering; delaying; adding reverb; adding harmonic excitement; and combinations thereof. The processing unit can be configured to allow a user to adjust the mastering process. The processing unit can be configured to use a predefined mastering process. The processing unit can comprise at least one user selectable sound processing effect used in the mastering process. The at least one user selectable sound processing effect can comprise two of more of the following: edgy, smooth, warm, bright, and distorted.

In some embodiments, the processing unit is configured to provide status information on the video monitor. The status information can be related to creation of the output and/or audio processing of selected source data files.

In some embodiments, the processing unit further comprises a file storage library configured to store multiple source data files. The file storage library can be configured to store files selected from the group consisting of: audio file; music file; sound effect file; voice over file; text file; image file; video file; and combinations thereof.

In some embodiments, the processing unit further comprises a sound modification module configured to modify a source data file comprising an audio file. The sound modification module can be configured to perform group editing of a set of multiple source data files. The set of multiple source data files can comprise multiple files each comprising a similar category of audio file. The similar category can comprise a category selected from the group consisting of: music; voice over; sound effect; and text. The sound modification module can be configured to present source data file information graphically on the video monitor. The sound modification module can be configured to graphically represent one, two, or more of: waveform, trim, and spectrum analyzer. The source data file can comprise a user generated source data file.

In some embodiments, the processing unit further comprises a cost calculation module configured to provide cost information related to the selected source data files and/or the output. The cost calculation module can be configured to dynamically adjust cost information as the content of the grid layout changes. The cost calculation module can be configured to adjust costs based on one, two, or more of: length associated with the output; source data files included in the output; and cost reduction associated with a user. The cost information can be presented on the video monitor at least prior to purchase of the output by a user.

In some embodiments, the processing unit further comprises a proprietary matching module configured to match one, two, or more compatible source data files based on one, two, or more properties of the source data files. The matching module can be configured to match multiple source data files. At least one of the one, two, or more properties can include one, two, or more numeric values assigned to the source data file. The one, two, or more values can be displayed on the select icon representing the source data file.

In some embodiments, the processing unit further comprises a proprietary overlay placement module. The overlay placement module can be configured to place an audio overlay. The overlay placement module can be configured to place an image overlay. The image overlay can comprise alphanumeric data. The overlay placement module can be configured to include an overlay on pre-purchased audio files played and/or downloaded. The overlay placement module can be configured to remove an overlay upon purchase of the output.

In some embodiments, the processing unit further comprises a text to speech function. The processing unit can be configured to generate a source data file comprising synthetic and/or computer generated speech, and the speech can be generated by the text to speech function.

In some embodiments, the processing unit further comprises a user use log.

In some embodiments, the processing unit further comprises an auto save function.

In some embodiments, the processing unit further comprises an undo and/or redo function.

In some embodiments, the processing unit further comprises a source data file creation module configured to allow a user to create a source data file. The user input module can comprise a microphone. The user input module can comprise a data transfer port. The user input module can comprise a text input device. The user created source data file can comprise a file selected from the group consisting of: audio file; video file; and combinations thereof. The source data file creation module can be configured to record video while previewing the output. The source data file creation module can further comprise a synchronization function configured to synchronize recorded video with the grid layout.

In some embodiments, the processing unit further comprises an error detection algorithm. The error detection algorithm can be configured to detect an undesired positioning of a source data file in the grid image. The error detection algorithm can be configured to produce a warning upon detection of an undesired event. The error detection algorithm can be configured to prevent preview of the output upon detection of an undesired event. The error detection algorithm can be configured to prevent creation of the output upon detection of an undesired event. The error detection algorithm can be configured to detect an undesired length of the grid layout. The system can further comprise a user upload function, and the error detection algorithm detects one, two, or more undesirable characteristics of a user uploaded file. The one, two, or more source data files can comprise a matching score, and the error detection algorithm can detect a poor compatibility between two or more source data files based on the matching score. The two or more source data files can be sequentially placed in the grid layout. The error detection algorithm can be configured to automatically and/or semi-automatically correct one, two, or more errors.

In some embodiments, the processing unit further comprises a tempo adjustment algorithm. The output file can comprise a tempo between 50 beats/minute and 200 beats/minute. The tempo adjustment algorithm can be configured to automatically adjust the tempo of adjacent source data files.

In some embodiments, the processing unit further comprises a cell highlighting function configured to highlight one, two, or more active cells. The highlighting function can modify a parameter of the highlighted cell, the parameter selected from the group consisting of: color; background image; text style; border style; and combinations thereof. The active cell can correspond to the current playback position of the output file.

In some embodiments, the processing unit further comprises a row highlighting function configured to highlight one, two, or more active rows. The highlighting function can modify a parameter of the highlighted row, the parameter selected from the group consisting of: color; background image; text style; border style; and combinations thereof.

In some embodiments, the processing unit further comprises a beat count clock.

In some embodiments, the processing unit further comprises a beat metronome. The beat metronome can provide an aural and/or visual cue during playback for each cell on the grid layout.

In some embodiments, the processing unit further comprises a seek bar.

In some embodiments, the processing unit further comprises a beat indicator configured to indicate at least one of an active row or an active cell.

In some embodiments, the user input module comprises a device selected from the group consisting of: keyboard; mouse; trackball; touchscreen, microphone; camera; scanner; and combinations thereof.

In some embodiments, the user input module comprises a touchscreen, and the video monitor comprises the touchscreen.

In some embodiments, the user input module comprises a data transfer port. The data transfer port can comprise an element selected from the group consisting of: USB port; Firewire port; disk drive; Bluetooth port; Ethernet port; and combinations thereof. The data transfer port can be configured to allow a user to upload a user created data file. The data transfer port can be configured to upload a file selected from the group consisting of: source data file; electronic spreadsheet; graphics file; scanned paper document; and combinations thereof.

In some embodiments, the user input module comprises a microphone. The processing unit can be configured to respond to voice commands received via the microphone. The processing unit can be configured to create a source data file from sounds received via the microphone.

In some embodiments, the output comprises at least an audio file.

In some embodiments, the output comprises at least a video file.

In some embodiments, the output comprises at least an image. The image can comprise an image file. The image can comprise an image provided on paper.

In some embodiments, the output comprises at least one document. The document can comprise a text file or a spreadsheet. The document can comprise a document provided on paper.

In some embodiments, the processing unit is further configured to store user data. The user data can comprise a link associating the grid layout to the user data.

In some embodiments, the system further comprises a marketplace. A user can purchase an output from the marketplace. The output can comprise multiple outputs, and a user can purchase one, two, or more of the multiple outputs from the marketplace. The system can be configured to allow the user to finance a purchase of an output file through fund raising. The system can be configured to allow a first user to create a grid layout, and the processing unit creates an output based on the grid layout, and a second user can purchase the output from the marketplace. The system can be configured to allow the first user to receive a royalty when the second user purchases the output from the marketplace. The output can be reviewed by an administration prior to publication to the marketplace.

In some embodiments, the processing unit comprises an analyzer configured to determine the percent difference between two files. The two files can be two outputs of the system. The analyzer can determine if the percent difference is above a threshold.

In some embodiments, the processing unit is configured to master the output. The mastering can comprise adjusting the tempo of one, two, or more of the source data files.

In some embodiments, the processing unit is configured to produce a tempo map, and the output is produced based on the tempo map.

In some embodiments, the system comprises a highlight function configured to allow the user to highlight one, two, or more of the multiple cells. The output can be based on the highlighted cells.

In some embodiments, the output comprises instructions for a medical device. The instructions can comprise at least one of a patient manual, clinician manual, or technician manual. The instructions can comprise at least one of an audio manual, video manual, or paper manual.

In some embodiments, the output comprises instructions for a pharmaceutical. The instructions can comprise at least one of a patient manual, clinician manual, or technician manual. The instructions can comprise at least one of an audio manual, video manual, or paper manual.

In some embodiments, the source data file comprises an output previously generated by the processing unit.

In some embodiments, the processing unit further comprises a review algorithm. The review algorithm can be configured to review the output and identify unacceptable material. The unacceptable material can comprise profanity, pornography, and/or other undesirable content.

In some embodiments, the processing unit is further configured to analyze the output and to produce an appropriateness rating. The processing unit can analyze the output for age appropriateness based on the lyrics, message, and/or sentiment of the output. The rating can comprise a rating similar to an MPAA rating.

In some embodiments, the output comprises one, two, or more digital encryption and/or protection features. The processing unit can be configured to embed a digital fingerprint within the output prior to providing the output to a user. The digital fingerprint can comprise an expiration date, and the output cannot be played after the expiration date.

In some embodiments, the processing unit comprises an algorithm configured to automate, semi-automate, and/or otherwise assist a user with the layout of the grid image and/or production of the output.

In some embodiments, the system further comprises a user profile. The grid layout can comprise at least one grid file, and the at least one grid file can be associated with the user profile.

In some embodiments, the system is configured to allow a user to select one, two, or more grid image cells. The system can be further configured to open a zoom window to allow the user to analyze and/or modify the selected grid image cells. The zoom window can be configured to display information related to the selected cells.

In some embodiments, the source data file comprises a parent source data file comprising one, two, or more nested child source data files. The system can be configured to open a zoom window to allow the user to modify the parent source data file. The system can be configured to allow a user to rearrange, add, and/or subtract one, two, or more child source data files. The system can be configured to generate the parent source data when the user adds one, two, or more source data files to the grid image, and the one, two, or more source data files comprise the child source data files. The system can be configured to allow the parent source data file to be saved to a file storage library.

In some embodiments, the system further comprises a graphical user interface. The graphical user interface can comprise a suggestion area, and the selection area can be configured to present one, two, or more suggestions the user. The suggestion area can comprise a search control. The suggestion area can be configured to provide one, two, or more icons each representing a source data file.

In some embodiments, the processing unit further comprises an algorithm configured to identify and suggest one, two, or more source data files to a user. The processing unit can be configured to analyze the grid image as the user modifies the grid image.

In some embodiments, the processing unit is configured to analyze an input file and a user-selected style, and the processing unit is configured produce the output based on the analysis. The processing unit can further comprise a remix algorithm configured to analyze the input file and perform one, two, or more modifications based on the user-selected style.

In some embodiments, the processing unit is configured to create the grid layout based on one, two, or more user inputs. The processing unit can further comprise an automation algorithm configured to create the grid layout based on a correlation between two or more source data files. The processing unit can produce the output based on the grid layout.

In some embodiments, the processing unit is configured to analyze and replace one, two, or more source data files on the grid image. The processing unit can further comprise an automation algorithm configured to analyze and replace the source data files.

In some embodiments, the processing unit is configured to learn one, two, or more preferences of a user. The processing unit can be configured to analyze user input by comparing two or more outputs. The processing unit can further comprise a learning algorithm configured to select outputs, collect user responses, and/or analyze user responses to create a profile of user preferences.

In some embodiments, the processing unit is configured to analyze the grid image as a user modifies an associated grid layout. The processing unit can be configured to provide suggestions based on the modifications. The processing unit can be configured to provide the suggestions in real time.

In some embodiments, the processing unit is configured to provide suggestions to a user. The source data file can comprise lyrics and the provided suggestions can be based on the lyrics. The provided suggestions can be configured to create a transition between two source data files.

In some embodiments, the system is configured to allow a user to segment the source data file into multiple source data files.

In some embodiments, the system further comprises a graphical user interface comprising one, two, or more controls configured to allow a user to modify the grid image. The grid image can further comprise one, two, or more layers, and the graphical user interface can comprise a layer control. The layer control can comprise one, two, or more controls configured to allow the user to set, adjust, and/or modify the one, two, or more layers. The layer control can comprise one, two, or more controls configured to allow the user to mute and/or unmute at least one layer of the one, two, or more layers. The layer control can comprise one, two, or more controls configured to allow the user to lock and/or unlock at least one layer of the one, two, or more layers. The layer control can comprise one, two, or more controls configured to allow the user to hide and/or unhide at least one layer of the one, two, or more layers. The system can be configured to alert the user when at least one layer of the one, two, or more layers can be hidden. The one, two, or more controls can comprise a slider control configured to adjust one, two, or more properties of the source data file. The grid image can further comprise one, two, or more regions, and the graphical user interface can comprise a region control. Region control can comprise one, two, or more controls configured to allow the user to set, adjust, and/or modify the one, two, or more regions. The region control can comprise one, two, or more controls configured to allow the user to lock and/or unlock at least one region of the one, two, or more regions.

In some embodiments, the processing unit is configured to import a file. The processing unit can be configured to analyze the imported file. The imported file can comprise a video file comprising at least one of a video track or an audio track. The video file can comprise one, two, or more subjects performing a choreographed routine. The processing unit can further comprise an algorithm configured to modify the grid image based on the analysis of the video file. The processing unit can further comprise an algorithm configured to alert a user to inconsistences between the grid image and video file. The imported file can comprise an image file. The image file can comprise a hand drawn 8 count sheet. The processing unit can further comprise an algorithm configured to generate the grid image based on the analysis of the image file.

In some embodiments, the processing unit is configured to analyze data recorded by one, two, or more sensors. The processing unit can be configured to generate the grid image based on the analyzed data.

In some embodiments, the processing unit is configured to simultaneously produce at least portions of the output as a user edits the grid image.

In some embodiments, the processing unit is configured to produce the output without user interaction.

In some embodiments, the grid image further comprises one, two, or more layers. The one, two, or more layers can comprise layers defined by the system. The defined layers can comprise one, two, or more instrument layers. The instrument layers can be configured to group portions of the source data file. The grid image can further comprise one, two, or more layers defined by a user of the system.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

FIGS. 5A and 5B illustrate a portion of a grid image comprising a beat indicator and a seek bar comprising a position indicator, respectively, consistent with the present inventive concepts.

DETAILED DESCRIPTION

Figure 1:
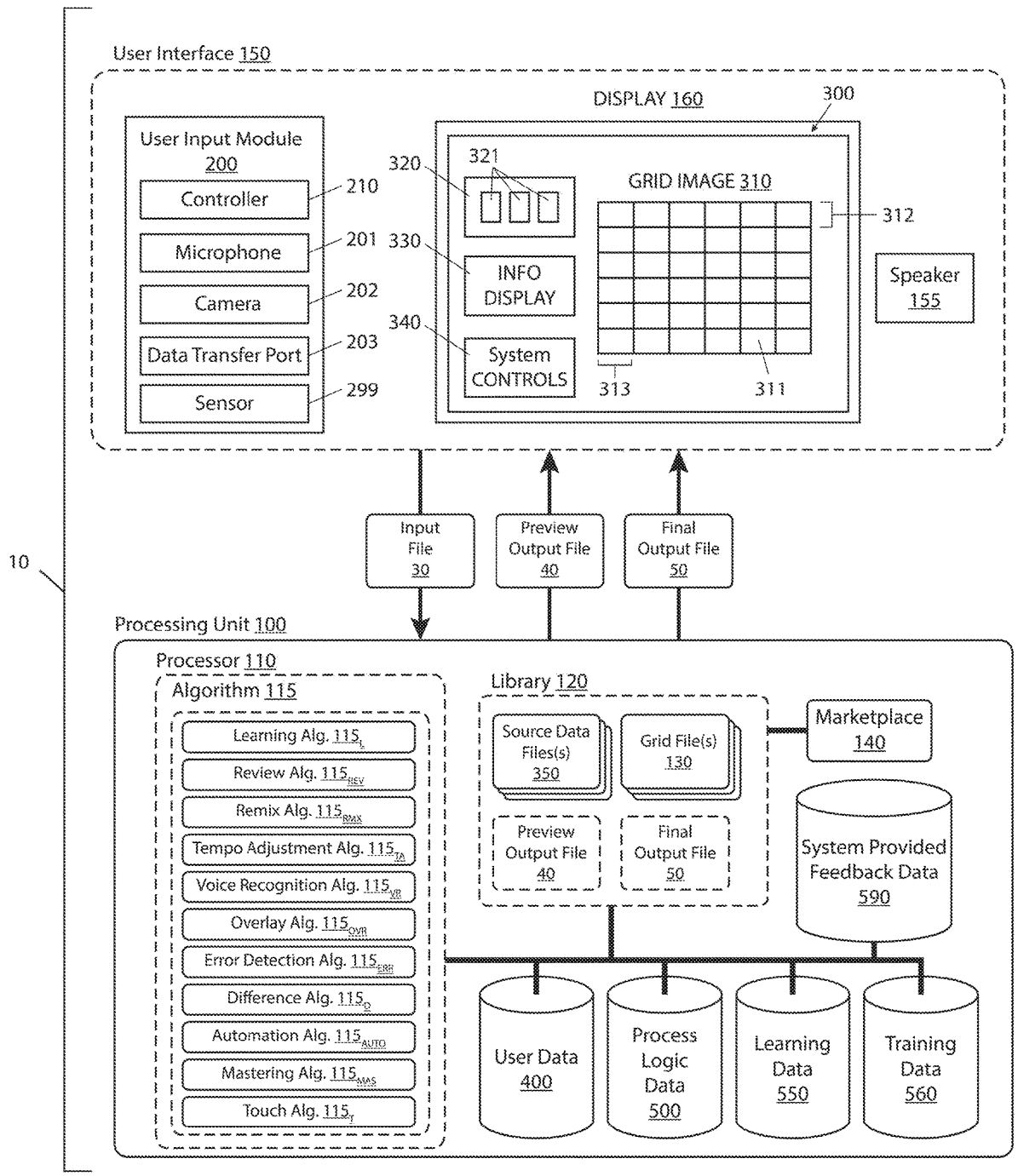
FIG. 1 illustrates a schematic view of a system for creating an output, comprising a processing unit configured such that a user can create an output representing the correlation between a grid layout and one, two, or more source data files, consistent with the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of two or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one, two, or more other features, integers, steps, operations, elements, components, and/or groups thereof.

The terms "and combinations thereof" and "and combinations of these" can each be used herein after a list of items that are to be included singly or collectively. For example, a component, process, and/or other item selected from the group consisting of: A; B; C; and combinations thereof, shall include a set of one or more components that comprise: one, two, three or more of item A; one, two, three or more of item B; and/or one, two, three, or more of item C.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present inventive concepts.

Referring now to FIG. 1, a schematic view of a system for creating an output is illustrated, comprising a processing unit configured such that a user can create an output representing the correlation between a grid file (the layout of a grid of information as described herein) and one, two, or more source data files, consistent with the present inventive concepts. System 10 can be configured to produce one, two, or more output files, output file 50. Output file 50 can comprise one, two, or more files selected from the group consisting of: an audio file; a video file; an image file; a text file; a document; and combinations of these. Output file 50 can be produced or otherwise generated using information associated with a grid file as described herein. Producing output file 50 can comprise rendering the output file 50, mastering the output file 50, and/or otherwise digitally generating output file 50 as described herein. In some embodiments, system 10 is configured to render a portion (e.g. only a portion) of output file 50, such as described herebelow in reference to FIG. 18.

In some embodiments, output file 50 comprises an output that provides instructions related to a product, such as an output that includes text, video, image, audio, and/or other media used to assemble, repair, diagnose, use, and/or otherwise interact with ("interact with" herein) a separate product. For example, output file 50 can comprise text, video, audio, and/or other media used to interact with a consumer product such as a barbecue grill, DVD or other media player, and system 10 can be used by a manufacturer of the consumer product to create an output (e.g., audio, video, and/or manuals used to assemble, repair, and/or use the product). In some embodiments, system 10 is used by a manufacturer of a medical device or pharmaceutical to create an output file 50 comprising a patient manual, clinician manual, technician manual, and/or other instructions for a medical device or pharmaceutical (e.g. an audio manual, a video manual, and/or a paper manual).

In some embodiments, output file 50 is provided to the user, such as via a file download, and/or output file 50 is saved to a memory storage component, such as to library 120 described herebelow. As described herein, system 10 can be configured to display a grid image and/or grid layout, grid image 310, to the user. Grid image 310 is a visual representation of a grid file 130 (e.g. one, two, or more data files stored by system 10). In some embodiments, grid file 130 comprises multiple data files, each corresponding to one, two, or more attributes of an associated grid image 310, for example, the layout of the grid image, the tempo associated with one, two, or more portions of the grid image, and/or other attributes of grid image 310. As used herein, grid file 130 can refer to one, some (e.g. a subset), and/or all of the grid files 130 associated with a grid image 310. As used herein, grid image 310 and grid file 130 are used interchangeably, for example, it should be understood that as a user modifies grid image 310, the corresponding data file, grid file 130, is correspondingly modified. As described herein, system 10 can store multiple versions and/or other revisions of a grid file 130, such as is enabled by a save function, or a revision history function of system 10, such as is described further herebelow. Additionally or alternatively, system 10 can store multiple grid files 130, for example, multiple grid files 130 that have been created by one or multiple users of system 10. As described herein, grid image 310 provides a visual tool for generating a correlation between one, two, or more files, such that an output file 50 can be generated based on that correlation. System 10 stores the correlation information data as grid file 130. As described herein, one, two, or more properties of a grid file 130 and/or grid image 310 can refer to the properties of an output file 50 based on the grid file 130, for example, the length (e.g. the time duration) of a grid image 310 can refer to the final length of an associated output file 50.

System 10 includes processing unit 100, comprising at least one microprocessor, computer, and/or other electronic controller, processor 110. System 10 can further comprise at least one data processing algorithm, algorithm 115. Algorithm 115 can be performed by processing unit 100. Examples of algorithm 115 are described herein. Algorithm 115 can be configured to perform one, two, or more functions of system 10, also as described herein. In some embodiments, algorithm 115 is configured to perform one, two, or more actions based on logic stored by system 10 as process logic data 500. Process logic data 500 can comprise one, two, or more rules, instructions, thresholds, and/or process parameters configured to enable one, two, or more algorithms 115 of system 10. Process logic data 500 can be configured to be periodically updated, such as by a user that is an "administrator" of system 10. An administrator can comprise a user with one, two, or more permissions not given to a non-administrative user. Administrative permissions can be set by a security routine as described herebelow. Updates to process logic data 500 can comprise including additional information, such as information including improvements, scope changes, additions and/or other modifications of algorithms 115, such as to improve the performance of one, two, or more existing algorithms 115. System 10 can further include learning data 550, training data 560, or both, each described in detail herebelow in reference to FIG. 13. Learning data 550 and/or training data 560 can comprise data compiled by machine learning and/or other artificial intelligence capabilities of system 10, as described herein. Additionally or alternatively, machine learning and/or other artificial intelligence capabilities of system 10 can be based on learning data 550 and/or training data 560, also as described herein. System 10 can be configured to produce and provide helpful feedback to the user, system provided feedback data 590, such as is described herebelow in reference to FIG. 3.

User interface 150 can comprise user input module 200, display 160 (e.g. a video monitor and/or other display device), and/or one, two, or more audio transducers, such as speaker 155. In some embodiments, system 10 is configured for operation by a user as described herebelow in reference to FIG. 2. Processing unit 100 can comprise one, two, or more computers, such as a desktop, tablet, smartphone, and/or a laptop computer. User input module 200 can comprise a control device, controller 210, such as a device selected from the group consisting of: keyboard; mouse; trackball; touchscreen; microphone; camera; scanner; and combinations of these. User input module 200 can further comprise one, two, or more data capture devices, such as microphone 201 and/or camera 202. User input module 200 can further comprise one, two, or more ports for transfer of electronic data, data transfer port 203. Data transfer port 203 can comprise an assembly selected from the group consisting of: USB port; Firewire port; disk drive; Bluetooth port; Ethernet port; and combinations of these. In some embodiments, processing unit 100 is configured to respond to voice commands received via microphone 201. Additionally or alternatively, processing unit 100 can be configured to respond to gesture-based control signals received via camera 202. Display 160 can comprise a computer monitor, such as a laptop screen or desktop computer monitor. Display 160 can comprise a screen of a smartphone or tablet. In some embodiments, display 160 comprises a touch screen display (e.g. display 160 also functions as at least a portion of controller 210). User interface 150 can comprise components positioned local to processing unit 100 (e.g. in the same room or general area of processing unit 100), such as when processing unit 100 comprises a single computer, local to the user and user interface 150 is operably connected to processing unit 100 via a local wired or wireless connection. In alternate embodiments, user interface 150 can comprise components positioned local to the user (e.g. in the same room), and operably connected to at least one component of processing unit 100 via a remote connection, such as a network connection comprising the Internet (e.g. when user interface 150 and processing unit 100 are in separate rooms, separate buildings, separate cities, and/or separate countries). In some embodiments, user input module 200 further comprises one, two, or more sensors, sensor 299.

Processing unit 100 can comprise a computer positioned local to a user, and system 10 can comprise a stand-alone system, such as when system 10 comprises a program and data stored in memory (e.g. software) installed on and/or otherwise residing within the local computer. In alternative embodiments, processing unit 100 comprises multiple computers, such as multiple computers connected over a network, such as a network selected from the group consisting of: the Internet; a LAN; a cellular network; and combinations of these. In these embodiments, processing unit 100 can comprise one, two, or more computers selected from the group consisting of: desktop; laptop; server; storage device; tablet; phone; and combinations of these. In some embodiments, system 10 is configured to provide an Internet-based user interface, such as a user interface where display 160 is positioned local to the user and the images and other information shown on display 160 is generated via a web interface. In these embodiments, user input 200 can comprise one, two, or more user input devices positioned local to the user and commands from input 200 can be received by the web interface. In some embodiments, at least one computer of processing unit 100 is configured to support multiple users simultaneously. The multiple users can be at a location remote from the at least one computer, such as when the at least one computer comprises a server hosting multiple users via a web-based user interface. The at least one computer configured to host multiple users can be configured to perform multi-threaded processing and/or it can comprise multiple processors 110. In some embodiments, processing unit 100 is configured to be operated by one, two, or more users, such as when individual or group operator (i.e. user) access is managed by a login function of system 10, the login function comprising a security routine used to set (e.g. enter and/or modify) and/or confirm user passwords and/or user permissions. For example, multiple users can have unique login information, stored by one, two, or more memory portions of processing unit 100. Individual or group users can have differing permission levels, such as either user level permissions (e.g. administrator and/or other user level permissions). In some embodiments, processing unit 100 stores this information as user data 400. User data 400 can comprise user information selected from the group consisting of: user contact information, such as name, email, or phone number; user preferences; payment information;

shopping cart information (e.g. as described herein), for example, which items are in the users shopping cart; user permissions; and combinations of these. In some embodiments, user data 400 comprises links to one, two, or more grid files 130, such as to associate the one, two, or more grid files 130 to the particular user that created the files. In some embodiments, one, two, or more source data files 350 are associated with a user account, and the user of that account can share those source data files 350 with other users. Additionally or alternatively, one, two, or more configurations of setting preferences and/or other parameters can be saved to a user account and/or shared by a user, such as mix settings, voice-over settings, and/or parameters specific to an effect (e.g. an audio effect). In some embodiments, one, two, or more source data files 350 are unique to a single user account (e.g. only accessible to that particular user). In some embodiments, the permission level of a user determines which source data files 350 are available to that user and/or other users.

Display 160 is operably connected to processing unit 100, and processing unit 100 can provide a graphical user interface, GUI 300, comprising an array of cells configured to be populated, grid image 310 shown. GUI 300 can further comprise an area including selectable icons, selection area 320. In some embodiments, GUI 300 also provides an area for user information, information display area 330, and/or one, two, or more user selectable controls, controls 340.

Grid image 310 comprises multiple cells, cells 311. Each cell 311 can represent a duration of time, such that grid image 310 represents a time duration equal to the sum of the time durations represented by each cell 311. In some embodiments, grid image 310 comprises multiple rows 312, each row 312 comprising at least one cell 311. In some embodiments, each row 312 comprises at least four cells 311, such as eight cells 311. In some embodiments, the total number of rows 312 in grid image 310 is based on an input received from a user, and the total number of cells 311 per row 312 (i.e. the total number of columns 313 in grid image 310) can also be set based on an input received from a user. In some embodiments, processing unit 100 is configured to allow a user to add and/or remove one, two, or more rows 312 to and/or from grid image 310. Processing unit 100 can be further configured to allow a user to add and/or remove one, two, or more cells 311 to and/or from one, two, or more rows 312 (e.g., add and/or remove a column 313 to and/or from grid image 310). In some embodiments, each row 312 has the same number of cells 311. In some embodiments, two or more rows 312 comprise different numbers of cells 311. The configuration of cells 311, including the duration, arrangement, and/or any data linked to the cells 311 of grid image 310 (as described herebelow), is stored by system 10 as grid file 130.

In some embodiments, each cell 311 is associated with a beat of music and/or other audio content, such as when the output created by system 10, preview output file 40, and/or final output file 50 (generally output file 50), comprises an output representing or otherwise correlating to a musical score. As used herein, output file 50 can comprise a portion of an output file 50, such as a partially rendered output file 50, or a portion of an output file 50 or preview file 40. Processing unit 100 can be configured to set the duration of time represented by each cell 311 based on an input from a user. In some embodiments, a user inputs a desired number of beats per minute, and processing unit 100 can determine the time duration represented by each cell 311 in order to correlate to the desired beats per minute. The time duration represented by each cell 311 can comprise a time of between 0.25 seconds and 1.0 seconds. Multiple cells 311 can comprise similar or dissimilar durations of time.

GUI 300 can further comprise a selection area 320. Selection area 320 comprises multiple selectable icons (e.g. each configured for "drag and drop", as described herebelow in reference to FIG. 3), select icons 321. Each select icon 321 represents one, two, or more source data files 350. Each source data file 350 can comprise a file selected from the group consisting of: audio file; music file; sound effect file; voice-over file; text file; image file; video file; and combinations of these. In some embodiments, a source data file 350 comprises an output file 50, such as an output file 50 previously generated by system 10. Each source data file 350 can be stored in memory, such as library 120 of processing unit 100. In some embodiments, library 120 comprises a segment of memory located on a separate server or other computer configured to provide processing unit 100 access to source data files 350, such as via a network as described hereabove. In some embodiments, one, two, or more select icons 321 comprise a text image, Processing unit 100 can be configured to allow a user to enter text to be displayed on a select icon 321. Processing unit 100 can be further configured to allow a user to edit text displayed on a select icon 321.

In some embodiments, a source data file 350 comprises an audio file, such as when the audio file comprises a music file, a sound effect audio file, and/or a voice-over audio file. Each source data file 350 comprising an audio file can further comprise audio information, such as information selected from the group consisting of: text description of audio file; duration of audio file; performer of audio file; composer of audio file; artist associated with audio file; user cost of audio file; a timing offset associated with audio file; and combinations of these. In some embodiments, processing unit 100 is configured to display, via display 160, the audio information associated with one, two, or more source data files 350, such as information provided by processing unit 100 within information display area 330, such as is described herebelow in reference to FIG. 3. In some embodiments, the audio information comprises amplitude information, such as when the amplitude information is adjustable by a user, such as to manipulate the amplitude of an audio source data file 350 with respect to other audio source data files 350 used by system 10. In some embodiments, the audio information comprises timing offset information and/or timing trail-off information, such as is described in detail herebelow in reference to FIG. 6.

In some embodiments, a source data file 350 comprises an image file, a text file, and/or a video file. Each source data file 350 can be represented by a unique select icon, icon 321, having a width (e.g. a width as displayed on display 160) correlating to the width of cells 311 of grid 310, and/or the length of the audio and/or video file associated with the select icon 321. For example, a select icon 321 representing an audio file with a length of four seconds, displayed on a grid 310 comprising a cell 311 width of 0.5 seconds, can have a width equal to eight cells 311, In some embodiments, source data files 350 do not have an associated length (e.g. the length of an audio track), and the width of the associated select icon 321 can be defined by a user (e.g. a "user-defined" parameter). A source data file 350 comprising an image file can correlate to a select icon 321 with a width which can be resizable by a user. Image source data file select icons 321 can include one, two, or more image attributes and/or annotations. Image source data files select icons 321 can include a "thumbnail" of the image (e.g. a small image representing a larger image), represented on the corresponding select icon 321.

A source data file 350 comprising a text file can correlate to a select icon 321 with a width which can be resizable by a user. Text source data file select icons 321 can comprise user editable text and/or user editable text format options (e.g., fonts, colors, or text size). A source data file 350 comprising a video file can correlate to a select icon 321 with a width which can be resizable by a user, Video source data file select icons 321 can include one, two, or more video attributes and/or annotations. Video source data file select icons 321 can include a user selectable thumbnail preview of the video file.

In some embodiments, system 10 includes a cost calculation module, which can be configured to determine cost information related to the one, two, or more source data files 350 and/or the final output 50. In some embodiments, the determined cost information is displayed, such as in information display area 330, and the information is dynamically updated as grid image 310 is modified by a user. The cost calculation module can be configured to adjust the cost based on one, two, or more of: length associated with the output; source data files included in the output; and cost reduction associated with a user.

In some embodiments, system 10 includes marketplace 140, such as a module that provides an online marketplace where users can buy files of system 10. In some embodiments, marketplace 140 provides files for purchase selected from the group consisting of: one, two, or more files from library 120, such as one, two, or more source data files 350; one, two, or more output files 50 generated by system 10; one, two, or more files otherwise generated (e.g. music remixes, compilations, and/or compositions generated without the use of system 10); and combinations of these. In some embodiments, system 10 is configured to allow a user to publish (e.g., make available for sale) an output file 50 in marketplace 140, such that other users can purchase the output file 50. A single user can publish more than one (e.g. two, three, or more) output files 50. For example, marketplace 140 can be customized by a first user, such that the first user can generate and publish several output files 50, and the several output files 50 can be grouped as a "store" within marketplace 140, These output files 50 grouped as a store are associated with the first user, and available for sale (e.g. sale to other users). In this manner, other users can browse published files within marketplace 140 from the first user, or from other publishing users (e.g. other users who have published output files 50 for sale in marketplace 140). In some embodiments, after completing the editing of a grid file 130 (such as via process 2000 as described hereabove in reference to FIG. 2), system 10 provides a single operation publishing option. For example, user data 400 can be used to allow a user to publish output files 50 to marketplace 140 with a single operation (e.g., a single step of selecting an icon), without having to enter (or re-enter) data saved to the user profile, and/or other data.

In some embodiments, before an output file 50 is published to marketplace 140, the content of output file 50 is reviewed by an administrator of system 10. Alternatively or additionally, algorithm 115 of system 10 can comprise a review algorithm $115_{REV}$, which can be configured to analyze the content of output file 50 before publishing. For example, the administrator and/or review algorithm $115_{REV}$ can review the content for identifying potentially unacceptable material, such as profanity, pornography, and/or other undesirable content. Additionally or alternatively, the content of output file 50 can be reviewed and "graded" by the administrator and/or review algorithm $115_{REV}$. Grading can be based on several factors, both determinable factors such as rhythm and/or content (e.g. poor rhythm and/or undesirably repeated content), and/or subjective factors such as a personal preference factor (e.g. how much the administrator simply "likes" the content). In some embodiments, an administrator is an "expert" in a particular type of output file 50, and the grade given to the published output file 50 can be denoted as given from an expert. In some embodiments, files published to marketplace 140 comprise meta data available for the purchaser to review, for example, data related to the grade of an output file 50 and/or the identity of the user that created the output file 50. Meta data associated with an output file 50 available for purchase from marketplace 140 can include meta data selected from the group consisting of: a textual description of the file; a grade; a user rating, such as a rating given by users who have previously purchased the output file; a price of purchase, such as a price determined by the creating user; an administrator, other user, and/or an algorithm of system 10; a system-determined ranking, for example, a ranking of popularity based on number of purchases and/or the number of previews (e.g. listens); the number of times the output file 50 was used as a source file 350 (e.g. in the creation of additional grid files 130); a ranking influenced by the source data files 350 that were used to create the output file 50; a ranking based on data from a source outside of system 10, for example, Billboard Top 40 data; a ranking of safety or appropriateness, for example, similar to ratings used to classify a motion picture; and combinations of these. In some embodiments, system 10 is configured to analyze an output file 50, and produce an appropriateness rating (e.g. similar to the MPAA rating system), such as a rating comprising an "age appropriateness" rating based on lyrics, message, and/or sentiment of an output file 50.

In some embodiments, system 10 is configured to calculate a royalty that a first user (e.g. the publisher of output file 50) receives for each purchase of one, two, or more of the first user's published files 50. System 10 can be further configured to pay the first user for any applicable purchase. In some embodiments, system 10 is configured to allow a user to modify the associated grid file 130 before and/or after the output file 50 is purchased from marketplace 140 by a second user. In some embodiments, if the associated grid file 130 is modified beyond a threshold (e.g. more than a certain percentage of the grid file 130 is changed, such as more than 10%), the first user's royalty can be modified (e.g. eliminated or otherwise reduced). Additionally or alternatively, the second user (e.g. the purchasing user) can be required to pay an additional premium for the changes to the output file 50.

In some embodiments, algorithm 115 of system 10 comprises an output file edit analyzer, difference algorithm $115_D$; which can be configured to determine the differences between two output files 50. Difference algorithm 1150 can be configured to assign differing rules and/or weights (e.g. weights related to priority or importance) to different types of changes, such as changes to the included source data files 350, the placement or arrangement of the select icons 321 on grid image 310, the length and/or tempo of the output files 50, and/or other properties of the output files 50. Difference algorithm $115_D$ can be configured to determine if the changes and/or differences between two output files 50 exceed a threshold, or otherwise warrant an additional charge to the user (e.g. if the two output files 50 are uniquely different, the user can be charged accordingly for both files).

In some embodiments, system 10 comprises an input file 30. Input file 30 can comprise a file input to the system by a user and/or an administrator of system 10. For example, as described hereinbelow in reference to FIG. 6, a user of system 10 can import a file to system 10, and which is received as input file 30. In some embodiments, input file 30 comprises a file generated by one, two, or more components of system 10, such as a recording made by camera 202 and/or microphone 201. Alternatively or additionally, input file 30 can comprise a file imported by a user, such as an audio, video, image, text, and/or other file. In some embodiments, input file 30 is received by processing unit 100, and saved to memory of library 120 as a source data file 350. In some embodiments, input file 30 is manipulated by system 10 prior to saving input file 30 as a source data file 350, such as via remix algorithm $115_{RMX}$, described hereinbelow in reference to FIG. 10. In some embodiments, remix algorithm $115_{RMX}$ is configured to analyze an input file 30, identify "break points" (e.g. suggested locations within input file 30 and separate the file into two or more portions) within the file 30, determine appropriate accompaniments and/or modifications to the input file 30, and to produce a preview of a remixed input file 30. This analysis, identification, and determination can be performed based on the process logic data 500 stored by system 10. The remixed input file 30 can be saved as a source data file 350, for example, after user and/or administrator approval of the remixed input file 30.

In some embodiments, output file 50 comprises one, two, or more digital encryption and/or protection features. For example, system 10 can be configured to embed a digital "fingerprint" (e.g. a unique key or identifier), such as a fingerprint embedded before providing an output file 50 to a user. In some embodiments, system 10 comprises an audio player, such as a stand-alone audio player such as a Walkman or Zune mp3 player, and/or a player controlled by processing unit 100, such as a player configured to play an output file via speakers 155 of system 10. Additionally or alternatively, system 10 can comprise a video player. In some embodiments, the video and/or audio player of system 10 is configured to only play files with an embedded digital fingerprint recognized by system 10. In some embodiments, the digital fingerprint comprises licensing information related to output file 50, such as to whom the output file 50 is registered (e.g. the purchaser), and/or the identity of the user who created the grid image 310 associated with the output file 50. In some embodiments, the digital fingerprint comprises an expiration date, such that the output file 50 cannot be played after the expiration date has been reached. In these embodiments, the user (or purchaser) can be able to renew the purchase such that the output file 50 can be played beyond the expiration date of the digital fingerprint. In some embodiments, the video and/or audio player of system 10 is configured to identify a digital fingerprint used by a performance organization, such as an organization broadcasting music for profit, such as to ensure only approved and properly licensed music is broadcast during the broadcast.

In some embodiments, system 10 comprises a revision history function. For example, system 10 can be configured to maintain a log of changes to a grid file 130, such that a user can load a previous revision, and/or undo changes (e.g. sequentially undo changes in reverse order to their creation). In some embodiments, each cell 311 comprises a revision history, for example, such that a user can select a cell 311 and see a list of all changes made to that cell over a particular period of time (e.g. since grid file 130 was first created, and/or since the last user save). Alternatively or additionally, system 10 can be configured to display or otherwise indicate to the user changes made to a section of grid image 310 (e.g. if the user selects two or more cells 311, system 10 can indicate all changes made to that selection over a time period). In some embodiments, system 10 comprises a "track changes" mode, similar to track changes functionality of modern word processors, whereby changes are highlighted, the time of the change is tracked, and/or the user who created the change is tracked.

In some embodiments, algorithm 115 is configured to automate, semi-automate, and/or otherwise assist a user with the layout of grid image 310 and production of output file 50. Algorithm 115 can comprise a learning algorithm $115_L$, such as described hereinbelow in reference to FIG. 13. Learning algorithm $115_L$ can be configured to process user data 400, process logic data 500, learning data 550, and/or training data 560, as well as one, two, or more grid files 130 of system 10 to determine one, two, or more trends, tendencies, and/or other patterns as system 10 is used over time by multiple users. Learning algorithm $115_L$ can utilize a neural network or other artificial intelligence or machine learning methods to analyze data.

Figure 10:
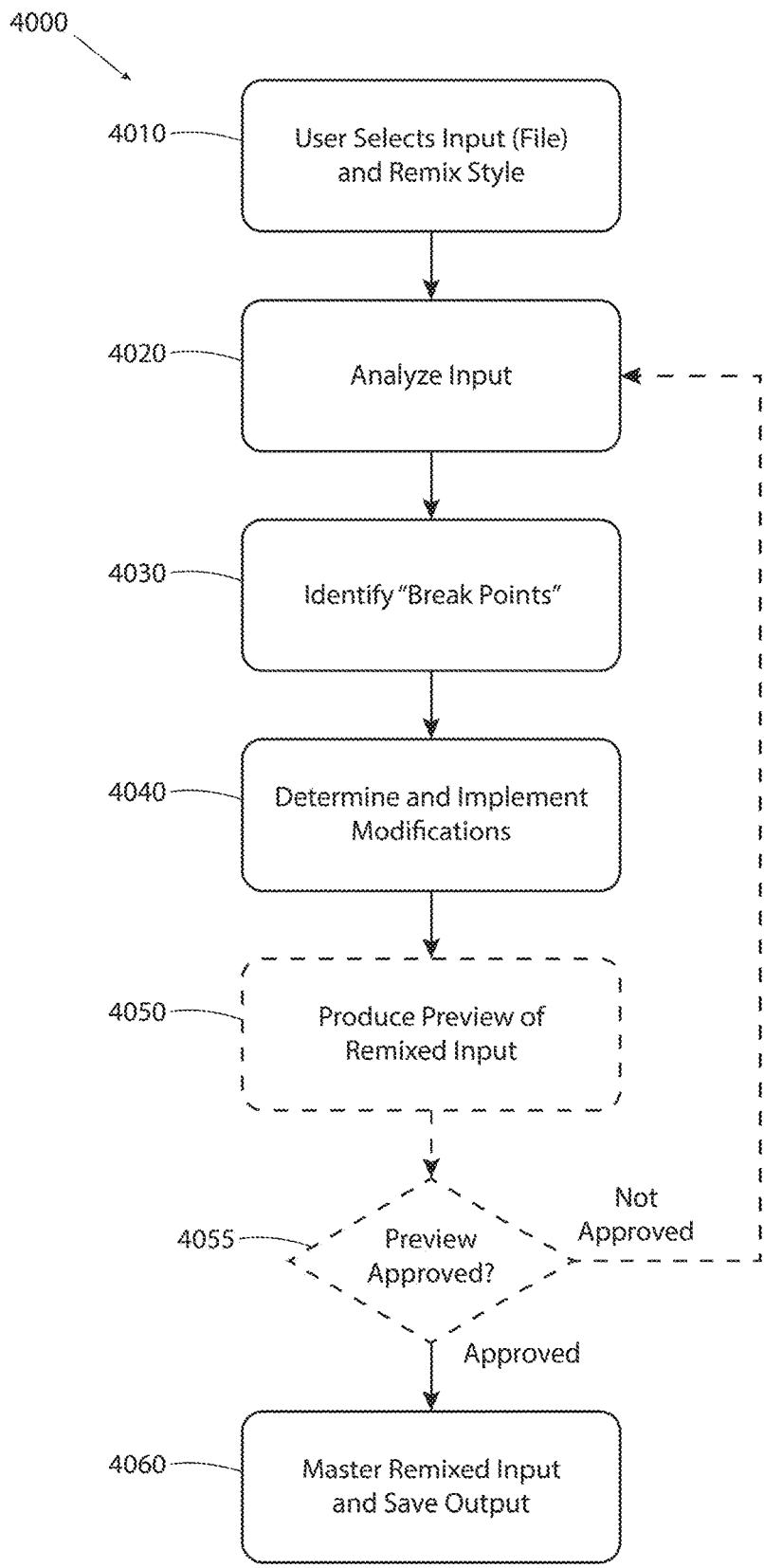
FIG. 10 illustrates a method of remixing an input to produce an output, consistent with the present inventive concepts.

Algorithm 115 can comprise review algorithm $115_{REV}$, such as described hereabove and also in reference to FIG. 10 herebelow.

Algorithm 115 can comprise remix algorithm $115_{RMX}$, such as described hereabove and also in reference to FIG. 10 herebelow. Remix algorithm $115_{RMX}$, can be configured to automatically modify an input file 30, source data file 350, and/or output file 50 based on learning data 550 and/or process logic data 500. In some embodiments remix algorithm $115_{RMX}$ is configured to perform one, two, or more automatic stylistic adjustments, such as stylistic adjustments to one, two, or more input files 30, such as described hereinbelow in reference to FIG. 10. In some embodiments, these stylistic adjustments are configured to tend toward stylistic consistency between one, two, or more input files 30 to be imported into system 10 as source data files 350. Algorithm 115 can comprise tempo adjustment algorithm $115_{TA}$, voice recognition algorithm $115_{VR}$, and/or overlay algorithm $115_{OVR}$, each such as described hereinbelow in reference to FIG. 2.

Algorithm 115 can comprise an error detection algorithm, algorithm $115_{ERR}$, such as described hereinbelow in reference to FIG. 4. In some embodiments, error detection algorithm $115_{ERR}$ is configured to identify an error in grid image 310, and indicate that error to the user, such as by displaying an indicator relative to the cell 311 containing the error, such as indicator 391 as described hereinbelow in reference to FIG. 14.

Algorithm 115 can comprise an automation algorithm, algorithm $115_{AUTO}$, such as described hereinbelow. Algorithm 115 can comprise a mastering algorithm, algorithm $115_{MAS}$, such as described hereinbelow in reference to FIGS. 2 and 10. Algorithm 115 can comprise a touch algorithm, algorithm $115_T$, such as described herein in reference to FIGS. 20A-F.

Figure 2:
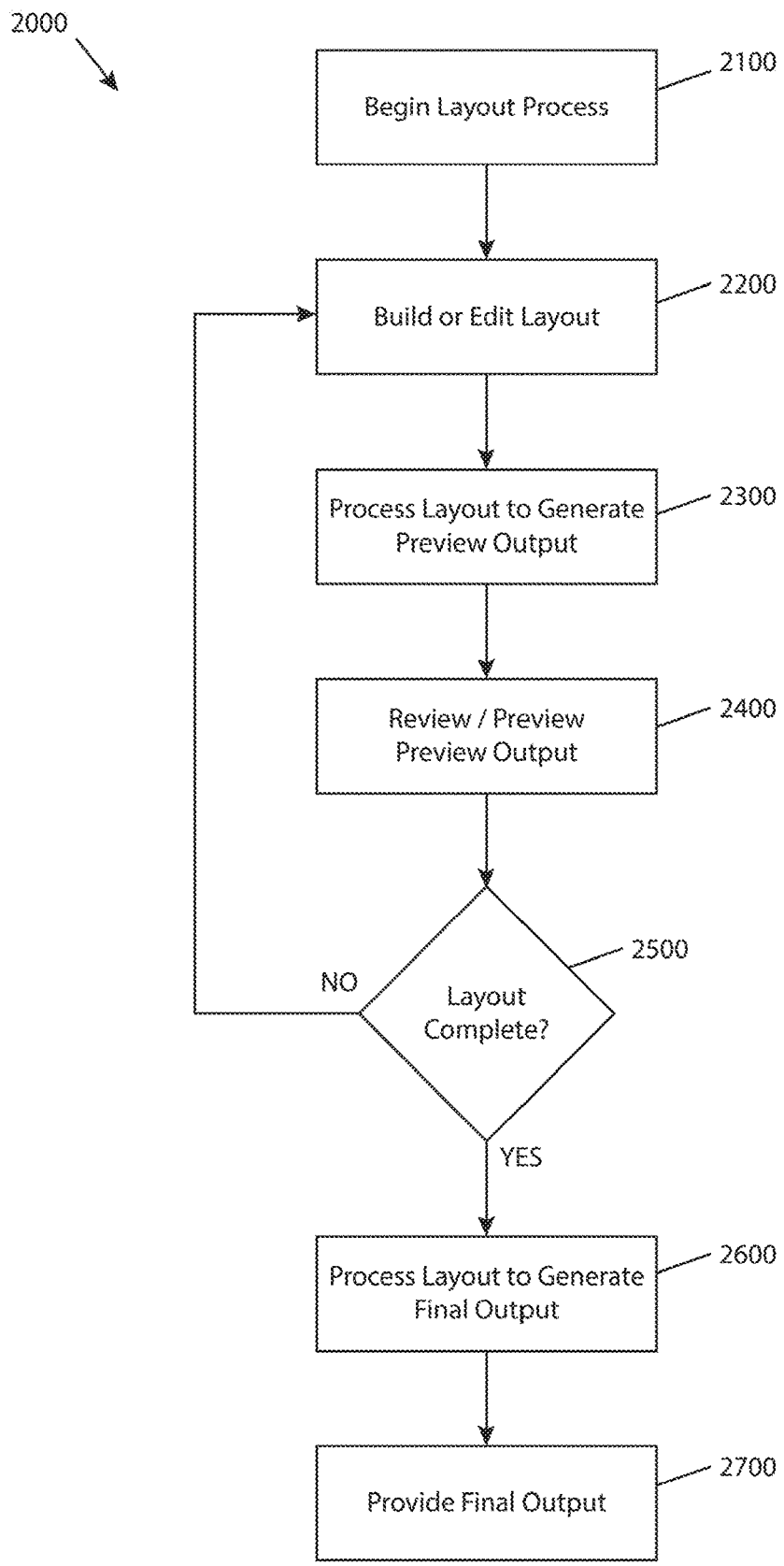
FIG. 2 illustrates a process of creating an output based on a correlation between one, two, or more files, consistent with the present inventive concepts.

Referring now to FIG. 2, a process of creating an output based on a correlation between one, two, or more files is illustrated, consistent with the present inventive concepts. In some embodiments, process 2000 of FIG. 2 is accomplished using system 10 described herein. Process 2000 comprises a series of steps for creating an output 50 based on a correlation between one, two, or more source data files 350 and multiple cells 311 of a grid image 310 (i.e. based on grid file 130).

In step 2100, a user begins the process of creating a grid file 130 by placing select icons 321, representing source data files 350, onto a grid image 310, and correlating the select icons to one, two, or more cells 311 of the grid image 310. To begin the process, a user can open a program (e.g. a software program), log onto a web-based interface, and/or otherwise initiate the correlation process. In some embodiments, system 10 comprises a "save" function, such that a user can save a preliminary or other grid file 130, such as to continue editing at a later time. In some embodiments, this grid file 130 is associated to the user profile as a part of user data 400. In step 2100, a previously saved grid file 130 can be loaded into the program for further editing. As described hereabove, in some embodiments, system 10 can comprise a user login function, such that a user can log in to system 10 and generate a grid file 130 in a customized environment. A customized environment can include an environment customized by modifying one, two, or more variables selected from the group consisting of: user specific permissions; access to user generated source data files 350; custom settings predefined or editable by the user; a library of saved grid files 130 or grid file 130 templates specific to the user; a log of user events; and combinations of these.

In some embodiments, the user defines and/or modifies the characteristics of the output file 50 to be generated. Algorithm 115 of system 10 can comprise a tempo adjustment algorithm $115_{T4}$, which can be configured to allow the user to set the tempo of the final output file 50 to be generated. In some embodiments, the tempo of the output file is set to a tempo of at least 50 beats/minute and/or no more than 200 beats/minute. In some embodiments, the user sets the length of the final output file 50 to be generated. In some embodiments, the user sets the number of cells 311 per row 312 to be shown on grid image 310 representing the final output file 50. System 10 can comprise default settings for a grid file 130 representing an output file 50. For example, the default settings for a grid file 130 representing a music-based output file 50 can comprise a grid image 310 comprising eight columns 313 of cells 311, and output file 50 can comprise a duration of approximately 2 minutes and 30 seconds, with a tempo of approximately 144 beats per minute (i.e. correlating to a grid image 310 including 45 rows 312 of eight cells 311 each).

In step 2200, the user begins to populate and/or otherwise edit the grid image 310. The user can place at least one select icon 321 onto grid image 310, correlating each placed select icon 321 to at least one cell 311 in grid image 310. An example of a grid image 310 is described in detail herebelow in reference to FIG. 3.

In some embodiments, system 10 provides a "drag and drop" function. In these embodiments, the user can actively select (e.g. actively select with a cursor) a select icon 321 from selection area 320. The user can then drag (e.g. move the cursor with the icon actively selected) the icon 321 to a location relative to grid image 310 (e.g. within and/or otherwise proximate a desired cell 311). The user can then drop (e.g. release the active selection of the icon) the icon 321 onto that location of grid image 310. This drag and drop function can also be used to move select icons 321 from one location to another relative to grid image 310, and/or to remove select icons 321 from grid image 310 (e.g. by dragging back to select area 320, dragging to a display-provided "trash can", or otherwise dragging away from grid image 310). The user can actively select multiple select icons 321 (e.g. by holding the shift key while selecting multiple icons 321) and drag and drop the multiple select icons 321 simultaneously from selection area 320 to grid image 310 and/or about grid image 310. The user can select one, two, or more select icons 321 already correlated to grid image 310 and move the selected select icons 321 within and/or otherwise about grid image 310 with arrow keys, such as arrow keys of a keyboard (e.g. the user can move the selected select icon 321 one cell 311 to the right by pressing the right arrow key).

In some embodiments, the user associates a select icon 321 with a cell 311 by directly selecting a cell 311 and inputting text (e.g. via a keyboard and/or microphone). Processing unit 100 can correlate the text entered by the user to a specific select icon 321 (e.g. a select icon 321 representing a unique source data file 350) and place the correct select icon 321 on the grid image relative to (e.g. within or otherwise proximate) the selected cell 311. System 10 can prompt the user to confirm the correct select icon 321 is chosen. Alternatively or additionally, system 10 can provide a filtered list of select icons 321 from which the user can select, such as a list based on the text entered (e.g. a lookup menu).

In some embodiments, process 2000 includes use of voice commands, such as when algorithm 115 of system 10 comprises a voice recognition algorithm $115_{VR}$. The voice recognition algorithm $115_{VR}$ can be configured to receive commands via a microphone and manipulate the grid image 310 via recognized commands received.

In some embodiments, process 2000 includes use of a copy and paste function provided by system 10. In these embodiments, the user can select a select icon 321 and/or group of select icons 321, copy the selection, and paste the selection onto the grid image 310. The selection can be pasted in place (i.e. with the same correlation to grid image 310 as the copied select icons 321) or the paste function can allow for the placement location to be unique and user selectable.

In some embodiments, process 2000 includes the user logging in to system 10, such as when system 10 comprises a user action recording function. A user log can record a log of the user's actions while using system 10, such as during step 2200 and/or any step of process 2000. The log can include recorded events selected from the group consisting of; keystrokes: selections, such as icons 321 selections; placement locations of select icons 321; deletions of select icons 321 from grid image 310: movement of select icons 321 within and/or about grid image 310; previewing of source data files 350; and combinations of these.

In some embodiments, process 2000 includes automatically saving commands and/or results of commands performed by a user, such as when system 10 comprises an auto save function. The auto save function can periodically save the grid file 130 created by the user, such as by saving at least every five minutes, such as at least every two minutes. The auto save function can save the grid file 130 continuously, for example, when each modification made by the user is recorded in a user log, and the grid file 130 is saved after each modification. System 10 can further comprise an undo and/or redo function, such that the user can undo one, two, or more modifications, and/or redo one, two, or more modifications that have been previously undone.

In some embodiments, process 2000 includes previewing of one, two, or more audio, text, video, and/or image files, such as when system 10 comprises a preview function for one, two, or more individual source data files 350 during the grid file creation process. In these embodiments, one, two, or more select icons 321 can comprise a control for previewing a file, such as play button 341 as is described further herebelow in reference to FIG. 3. The preview button can allow the user to preview at least a portion of the source data file 350 selected. The preview of the source data file 350 can comprise an "overlay" or other deterrent to dissuade the user from copying (e.g. recording audio or capturing a screen shot of an image file) the previewed file. In some embodiments, the source data file 350 to be previewed comprises an audio file. The audio file can comprise a sound overlay, or other degradation and/or branding of the previewed audio. In some embodiments, the preview comprises a visual preview (e.g. preview of an image, video, or document) and the visual preview can comprise a visual overlay (e.g. a watermark), or other degradation and/or branding of the previewed image. The source data file 350 can comprise the overlay and/or system 10 can dynamically apply the overlay during preview of the source data file 350. In some embodiments, the overlay comprises alphanumeric data.

In some embodiments, process 2000 includes placing an overlay on one, two, or more previewed source data files 350, such as when algorithm 115 of system 10 comprises an overlay algorithm $115_{OVR}$ for placing overlays on one, two, or more previewed source data files 350. The overlay algorithm $115_{OVR}$ can dynamically place the overlay during and/or prior to previewing the source data file 350. The location (e.g. the timing during audio playback or location on a visual preview) can be computed by the algorithm. The overlay algorithm $115_{OVR}$ can generate sound overlays with varying characteristics from one, two, or more overlay audio files. The varying characteristic can be selected from the group consisting of: the pitch of the overlaid audio; the speed of the overlaid audio; the frequency of the overlaid audio; the offset from the beginning and/or end of the source data file 350 being previewed; and combinations of these.

In some embodiments, for an audio overlay, the overlay algorithm $115_{OVR}$ adjusts the relative volume of the overlay based on a volume of the media being protected. For example, the overlay algorithm $115_{OVR}$ can adjust the volume of the overlay based on the average volume, relative RMS, LUFS, and/or other properties of the media being protected. In some embodiments, an audio overlay is selected based on the frequency or other spectral properties of the media being protected. For example, the overlay algorithm $115_{OVR}$ can select a high frequency overlay when the mid-frequencies of the media would overpower a mid-frequency overlay. In some embodiments, the overlay algorithm $115_{OVR}$ selects an overlay based on the length of the media to be protected. For example, a single, relatively short overlay can be selected to protect a relatively short audio clip (e.g. a segment of electronic media, also referred to as a file herein). Alternatively or additionally, a longer overlay and/or multiple overlays, can be selected for a relatively long audio clip.

In some embodiments, the overlay algorithm $115_{OVR}$ places overlays onto source data files 350 (i.e. modify the file itself), and system 10 is configured to remove the overlay. The overlay can be removed to generate a preview output file 40 and/or a final output file 50 without the overlay. A preview output file 40 can have additional overlays added during the preview creation process, such as is described herebelow.

In step 2300, system 10 processes the user created grid file 130 to generate a preview output file 40 of the custom grid file 130. In some embodiments, the final output file 50 to be generated comprises an audio output, and the preview output file 40 comprises an audio file generated by system 10 based on the correlation between select icons 321 represented on grid image 310. Preview output file 40 can comprise an overlay or other deterrent (as described hereabove) to dissuade the user from using preview output file 40 for an unauthorized and/or otherwise undesired use (e.g., the intended use of final output file 50).

The preview output file 40 can comprise the overlaid source data files 350 described above, producing a preview output file 40 comprising multiple overlays. In some embodiments, system 10 removes all overlays from source data files 350 used (or the system comprises source data files 350 without overlays, and system 10 dynamically overlays any previewed file) and system 10 dynamically generates a new pattern of overlays for the preview output file 40. Overlay algorithm $115_{OVR}$ can comprise an algorithm for dynamically placing one, two, or more overlays on a preview output file 40, such as one overlay every 15 seconds on an audio or video-based preview output file 40. The number of overlays applied can be determined dynamically by system 10, or it can be based on the length of grid image 310. One, two, or more source data files 350 can require an overlay during any preview (e.g. playback). The overlay algorithm $115_{OVR}$ can be configured to avoid placing more than one overlay on top of or within a predetermined distance (e.g. time span) of one another.

In some embodiments, the overlay algorithm $115_{OVR}$ is configured to analyze a grid file 130 (e.g. prior to a preview), and to determine an overlay "map" of the location, duration, and/or properties of the appropriate overlays for the grid file 130. In some embodiments, the overlay algorithm $115_{OVR}$ is biased to tend to avoid excessive implementation of overlays in the overlay map. In some embodiments, the overlay algorithm $115_{OVR}$ is configured to detect isolated source data files 350 within grid image 310 (e.g. at least a portion of a source data file 350 is included singly in a cell 311, without any overlapping source data files 350), and it is configured to bias overlay placement to protect any isolated source data files 350.

System 10 can be configured to generate an audio file (e.g. a custom musical mix). Algorithm 115 can comprise a mastering algorithm $115_{MAS}$, which can be configured to "master" the cumulative set of selected source data files 350, generating an output 50 correlating to the grid file 130 created. Mastering can include a process selected from the group consisting of: summing; combining; manipulating; processing; mastering; equalizing; compressing; filtering; delaying; adding reverb; adding harmonic excitement; and combinations of these. The mastering performed can include a set of processes configured to produce an output file 50 with unique characteristics. For example, a first set of processes can produce an output file 50 with a crisp sound and exaggerated bass line, and a second set of processes can produce an output file 50 with a full sound and smoother transitions. The sets of processes can be predefined or user editable. In some embodiments, system 10 is configured to allow the user to select from a set of predefined mastering process sets, wherein each set provides a unique sound or effect, System 10 can provide at least one user selectable sound processing effect to be used in the mastering process. In some embodiments, system 10 is configured to allow the user to select at least one of the following effects: edgy, smooth, warm, bright, and/or distorted.

In some embodiments, mastering performed by system 10 includes adjusting the tempo of one, two, or more overlapping source data files 350. For example, if a portion of a first select icon 321 overlaps a portion of a second select icon 321 in grid image 310, the tempo of the overlapping portions of the associated source data files 350 can be adjusted to match. In some embodiments; source data files 350 are assigned a priority based on the type of data file and/or the position of the associated select icon 321 (e.g. select icons 321 positioned earlier in time on grid image 310 can be given a higher priority). The tempo adjustment can be made to a lower priority data file so as to match a higher priority data file. In some embodiments, only the overlapping portion of a data files is modified, and the tempo is left unmodified where the two data files do not overlap. In some embodiments; the tempo of several overlapping and/or adjacent source data files 350 are adjusted such that the output file 50 comprises a consistent tempo and/or doesn't comprise any "jumps" (e.g. rapid changes) in tempo. In some embodiments, the tempo is gradually adjusted over time such as to avoid any jumps in tempo.

In some embodiments, system 10 is configured to adjust the tempo of one, two, or more (e.g. all) of the source data files 350 associated with a grid image 310, such as to adjust the overall time duration of the grid image 310. For example, if a grid image 310 is generated by a user and comprises a first duration (e.g. a duration of 1 minutes and 33 seconds), the user can indicate to system 10 to adjust the grid image 310 to adjust the duration to a different, second duration (e.g. a shorter duration such as a duration of 1 minute and 30 seconds). System 10 can adjust the tempo of each associated source data file 350, such as by adjusting each tempo by a percentage change. Alternatively or additionally, system 10 can be configured to analyze grid image 310, and to determine a set of changes to be made to appropriately adjust the length of grid image 310. Changes made available by system 10 can be selected from the group consisting of: tempo changes; shortening of sections and/or of source data files 350; removal of sections and/or source data files 350; and combinations of these. In some embodiments, system 10 is configured to make "silent" changes (e.g. automatic duration or other changes made without alerting the user), and/or can be configured to alert the user before and/or after a change is made. In some embodiments, changes are made based on priorities (user-defined or otherwise) assigned to different sections of grid image 310. For example, if the user defines a section of grid image 310 as having a tempo of high importance (e.g. the user does not want the tempo changed for that section), system 10 will modify other sections having a lower priority. In some embodiments, the user "flags" one, two, or more cells 311 and/or one, two, or more select icons 321 as having a tempo which cannot be altered (e.g., automatically altered by system 10) without user approval. In some embodiments, system 10 is configured to lengthen a grid image 310 using similar processes as are described hereabove.

In some embodiments, grid file 130 comprises a tempo "map". The tempo map can include (e.g. store) information corresponding to the various tempo components of one, two, or more source data files 350 associated with grid image 310. For example, the tempo map can comprise information related to: user identified tempo preferences for a source data file 350; the native tempo associated with a source data file 350; tempo differences between one, two, or more overlapping source data files 350; beat mapping associated with one, two, or more source data files 350; one, two, or more tempo priorities and/or rules associated with source data files 350 and/or grid image 310; and combinations of these. The tempo map can also include information related to tempo-based decisions generated by system 10, based on user input to grid image 310. For example, the tempo map can comprise information related to how system 10 should adjust the tempo and/or relative timing of one, two, or more source data files 350 relative to each other when rendering output file 50.

Figure 4:
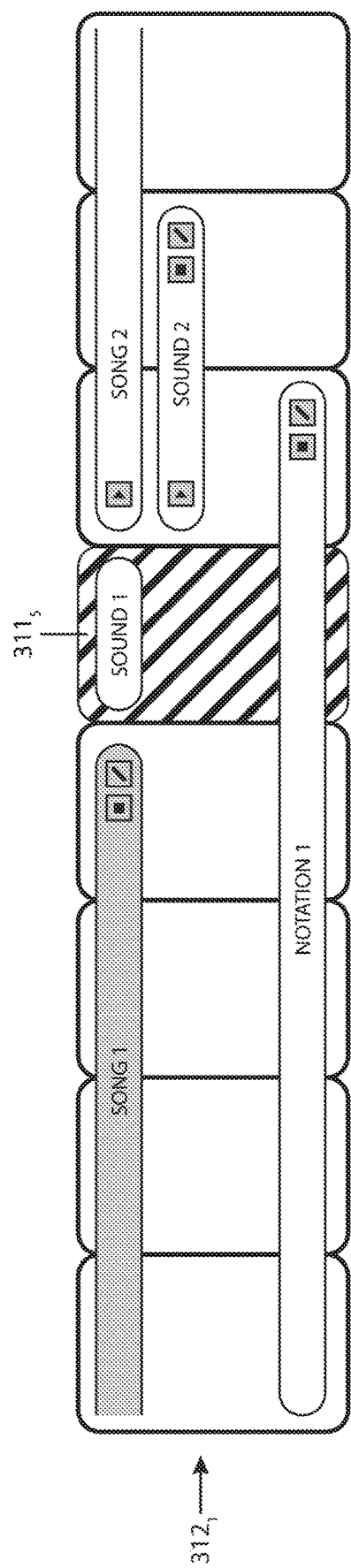
FIG. 4 illustrates a portion of a grid image containing an error, consistent with the present inventive concepts.

In some embodiments, in step 2300, system 10 analyzes the grid file 130 for any errors, before generating a preview output file 40 and/or final output file 50, as described in detail herebelow in reference to FIG. 4.

In step 2400, system 10 provides the preview output file 40 for the user to review. In some embodiments, system 10 streams, or otherwise provides, a preview output file 40 without providing the user with access to the file itself (e.g. to prevent the user from saving the preview output file 40). System 10 can further provide information to the user correlating to the preview output file 40 and/or the final output file 50 represented by preview output file 40. The information provided can include information selected from the group consisting of: final price information; duration; artists featured; beats per minute; other information pertaining to the final output file to be generated; and combinations of these.

In step 2500, the user decides if the grid file 130 is complete. The user can repeat one, two, or more of steps 2200 through 2500 until preview output file 40 represents a composition the user wishes to finalize and purchase. After the user decides the grid file 130 is finalized, system 10 proceeds to step 2600.

In step 2600, system 10 processes the grid file 130 to produce a final output file 50. Step 2600 can comprise mastering, such as mastering similar or dissimilar to the mastering performed in step 2300 described hereabove. In step 2600, system 10 can remove any overlays from source data files 350 that were applied previously (e.g. used in generating the final output file 50).

In step 2700, system 10 provides final output file 50 to the user. In some embodiments, system 10 provides final output file 50 via a shopping cart function, After finalization of final output file 50, system 10 can generate an item for purchase in an online store (e.g. web-based store including a digital shopping cart), and it can direct the user to purchase the item via the online store. The user can purchase one, two, or more final output files 50 (e.g. the user can create multiple grid files 130, generating multiple unique final output files 50), After purchasing the final output file 50, system 10 can "host" final output file 50 for download by the user, email the user final output file 50, and/or otherwise provide the user with access to final output file 50, In some embodiments, system 10 comprises a merchant-type service, allowing the user to purchase and download final output file 50 without the use of an online store, such as when system 10 is configured in a stand-alone single computer configuration, such as when a unique output file 50 "enabling-key" is provided (e.g. by the manufacturer of system 10) after a payment is made.

In some embodiments, output file 50 is automatically added to a digital shopping cart and without the need for the user to select an icon representing the output file 50 from an online store. For example, after the final output file 50 is generated, the user can proceed directly (e.g. via a hyperlink or icon) to the shopping cart and "check out" (e.g. purchase the output file 50). In some embodiments, output file 50 is previewed from the shopping cart, for example, the user can play output file 50 without navigating from the cart to a separate player. In these embodiments, output file 50 can comprise an overlay, as described hereabove.

In some embodiments, the output file 50 presented to the user in the shopping cart may not correlate to the latest (e.g. current) revision of the associated grid file 130. For example, after output file 50 has been generated by system 10, the user can alter grid file 130. If the user navigates to the shopping cart and an output file 50 is represented, system 10 can alert the user if the output file 50 does not correlate to the latest grid file 130 (e.g. system 10 can perform a consistency check between output file 50 and grid file 130), In some embodiments, the user chooses to update the output file 50, and/or the output file 50 is automatically updated to correlate to the updated grid file 130. In some embodiments, system 10 is configured to perform this consistency check prior to a payment being made, and/or prior to the user downloading output file 50.

Figure 3:
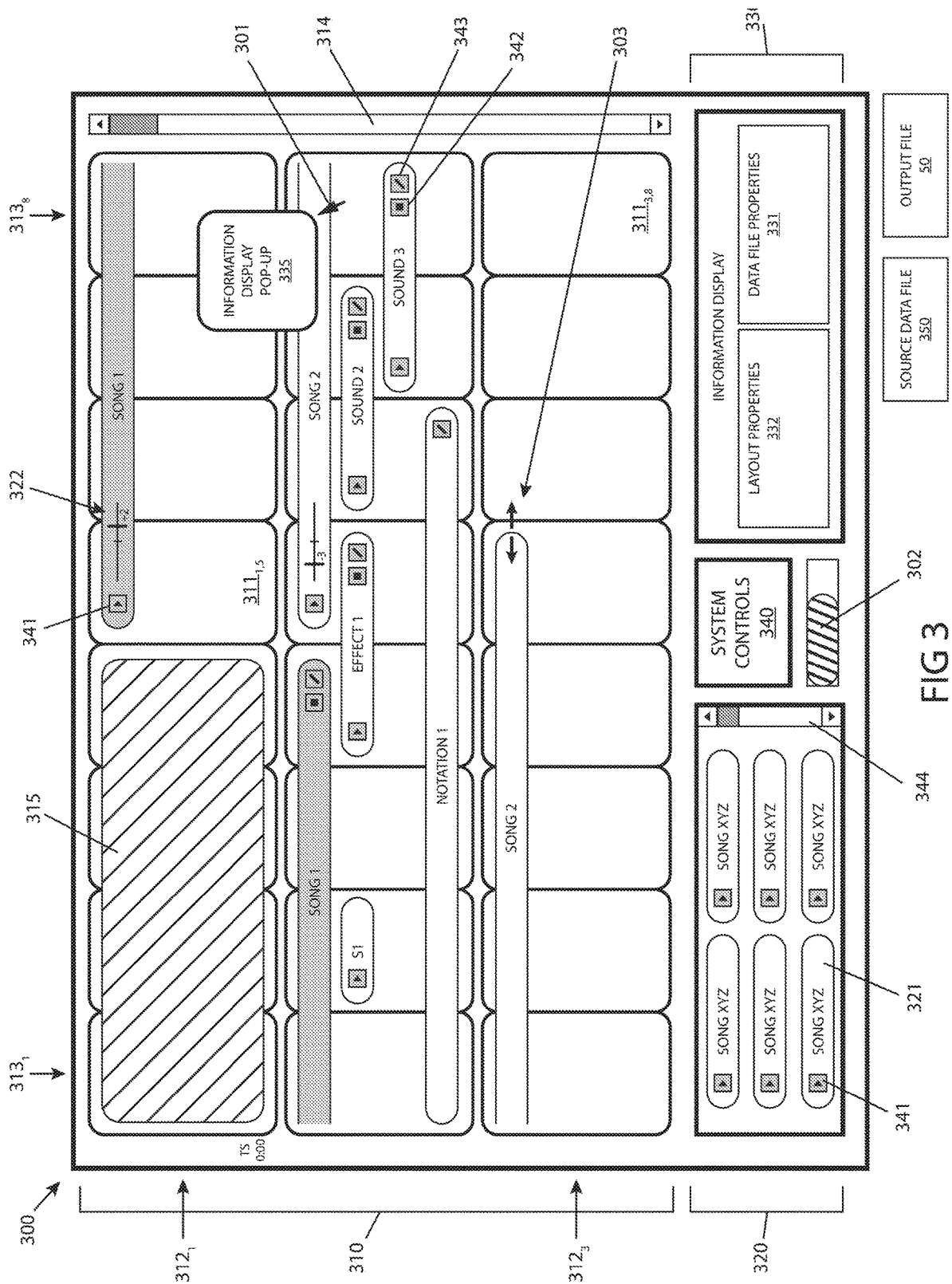
FIG. 3 illustrates a display providing a grid image correlating multiple select icons to multiple cells, consistent with the present inventive concepts.

Referring now to FIG. 3, a graphical user interface comprising a grid image correlating multiple select icons to multiple cells is illustrated, consistent with the present inventive concepts. Processing unit 100 of system 10 can provide GUI 300 on display 160. Display 160 can comprise a computer monitor, a tablet, a smartphone screen, a television, Google Glass, a holographic display, and the like. Processing unit 100 can generate a user-controlled pointer, cursor 301. The position of cursor 301 can be user-controlled such as via a touch pad or a mouse.

GUI 300 comprises grid image 310 comprising multiple cells 311. In the embodiment of FIG. 3, grid image 310 comprises eight columns 313, 313; through 313g. GUI 300 is shown displaying the first three rows 312 of grid image 310, 312$_1$ through 312$_3$. GUI 300 can comprise a scroll bar or other horizontal and/or vertical screen navigation tool, scroll bar 314, which can be configured to allow a user to scroll through grid image 310, for example, to one, two, or more rows 312 beyond (i.e. below) row 312$_3$ shown.

In some embodiments, one, two, or more cells 311 are blocked, or otherwise disabled for use by system 10, such that a user cannot associate one, two, or more select icons 321 with the one, two, or more blocked cells 311. GUI 300 can display a blocking icon 315, such as to indicate to a user that one, two, or more cells 311 are blocked. In some embodiments, the first four cells of grid 310 are blocked, such as to represent a "lead-in" time for a musical score (e.g. the musical score starts on a fifth beat of the score).

GUI 300 can comprise selection area 320. Selection area 320 can be configured to include multiple select icons 321 representing multiple source data files 350, such as multiple source data files 350 stored in library 120 of system 10. Selection area 320 can further include a scroll bar 344, which can be configured to allow a user to scroll through the select icons 321. System 10 can include a sort and/or filter function configured to allow a user to sort and/or filter icons displayed in selection area 320. For example, selection area 320 can include a sort function configured to allow a user to sort select icons 321 by type (e.g. songs, sound effects, voice-overs, and/or other types described hereabove in reference to FIG. 1). The sort function can be further configured to sort by source data file 350 characteristics, such as length, artist, cost, title, and the like. System 10 can include a filter function configured to allow a user to filter select icons 321 included in selection area 320, by one, two, or more source data file 350 characteristics, such that only the filtered select icons are displayed in selection area 320. Selection area 320 and/or select icons 321 can include a play button 341 which can be configured to play a preview of the associated source data file 350. For example, for an audio source data file 350, play button 341 can be configured to trigger processing unit 100 to play a preview audio file, such as through speaker 155 of system 10. The preview audio file can comprise an overlay as described hereabove in reference to FIG. 2. Play button 341 can be further configured to pause a preview being played (e.g. in a play/pause toggling manner). In some embodiments, processing unit 100 is configured such that the initiation of a preview of a first source data file 350, while a preview of a second source data file 350 is active (e.g. being played), will terminate the preview of the second source data file 350 before activating the subsequently initiated preview.

GUI 300 can comprise one, two, or more progress indicators and/or other status indicators, status bar 302. In some embodiments, status bar 302 comprises a "thermometer-like" appearance, configured to provide a visual indicator of completion level and/or rating (e.g. a quality and/or approval rating), such as a completion percentage and/or rating out of 100, for example, 40/100 (e.g. a 40 out of 100, or 40%). Status bar 302 can be constructed and arranged to display the status of a process selected from the group consisting of: audio processing (e.g. preview output processing and/or final output processing); grid file 130 completion; playback completion; and combinations of these. In some embodiments, status bar 302 indicates a rating of grid file 130, for example, a rating generated by an analysis of grid file 130 by system 10. In some embodiments, the rating is based on one, two, or more of the following: the proportions of types of source data files 350 used in grid file 130 (e.g. an appropriate amount of music, sound effect, voice-overs, and the like); repetitiveness of source data files 350 used (e.g. have one, two, or more source data files 350 been used multiple times in grid file 130); popularity (e.g. amongst other users) of source data files 350 used; the existence of any conflicts between source data files 350 identified by system 10; and combinations of these. In some embodiments, an algorithm of system 10, for example, automation algorithm 115$_{AUTO}$ described herein, is configured to provide helpful feedback, system-provided feedback data 590, to the user to improve the rating indicated by status bar 302. In some embodiments, when the user selects or hovers over status bar 302, one, two, or more items of feedback data 590 are displayed to the user (e.g. feedback data 590 provided visually and/or audibly by user interface 150).

GUI 300 can further comprise a set of system function controllers, controls 340. Controls 340 can be configured to control play, pause, and/or stop functions related to the playback of one, two, or more preview output files 40 and/or final output files 50. Controls 340 can further include controls for modifying system parameters, such as the length and/or tempo of the associated output file 50 to be generated using system 10. Controls 340 can further include controls for activating one, two, or more system functions, routines, and/or subroutines, such as a source data file 350 modification subroutine, such as is described herebelow in reference to FIG. 6. Controls 340 can further include one, two, or more controls configured for generating a preview output file 40 and/or a final output file 50, Controls 340 can further include controls configured to perform a function selected from the group consisting of: undo function; redo function; copy and paste function; save function; user log in/log out function; open previous grid file 130 function; delete function; and combinations of these.

GUI 300 can comprise information display area 330. Information display area 330 can comprise a source data file 350 property display area 331 and/or a grid file 130 property display area 332. Source data file property display area 331 ("display area 331" herein) can display properties and/or other information regarding one, two, or more source data files 350, such as one, two, or more source data files 350 correlating to one, two, or more highlighted select icons 321. In the embodiment of FIG. 3, SONG 1 represents a select icon 321 displayed on grid 310, which has been selected (e.g. and highlighted) by the user. Displayed information can include information selected from the group consisting of: text description of audio file; duration of audio file; performer of audio file; composer of audio file; artist associated with audio file; cost of audio file; offset associated with audio file; and combinations of these.

Grid image 310 property display area 332 ("display area 332" herein) can display properties and/or other information regarding the current grid image 310, and/or other system 10 properties or settings. Grid image 310 information can include information selected from the group consisting of: grid image 310 length; grid image 310 tempo; grid image 310 associated cost; percentage of cells comprising at least one select icon 321; errors associated with the current grid image 310; and combinations of these. In some embodiments, GUI 300 displays a timestamp, timestamp TS, proximate each row 312. Timestamp TS can indicate the timing of the first beat (e.g. the first cell 311) of the row 312. The timestamp TS can be automatically calculated (and/or recalculated) as the grid image 310 is updated, and the tempo of the various source data files 350 associated with cells 311 are correspondingly updated. Based on the difference in tempo from row to row of grid image 310, the difference between subsequent timestamps TS can differ (e.g. correspondingly differ) from row to row.

In some embodiments, processing unit 100 is configured to display one, two, or more pop-up windows, such as information display pop-up 335 ("pop-up 335") as shown. Processing unit 100 can be configured such that pop-up 335 is displayed when a user hovers a cursor or other selection tool over a portion of GUI 300 (e.g. places cursor over a particular portion and holds that position for at least 1 second), and the portion of GUI 300 contains an element which comprises or is otherwise associated with information to be displayed. For example, in the embodiment of FIG. 3, cursor 301 is shown hovering over SONG 2, and pop-up 335 is displayed. In this example, pop-up 335 can display information regarding SONG 2, such as information selected from the group consisting of: text description of audio file; duration of audio file; performer of audio file; composer of audio file; artist associated with audio file; cost of audio file; offset associated with audio file; popularity of audio file (e.g. amongst other users of system 10); popularity of audio file relative to adjacent files (e.g. if other users have used similar combinations of files); and combinations of these. In some embodiments, information is displayed on select icon 321, such as the title of the associated source data file 350 or the length of the represented file (e.g. length of the audio file represented). In some embodiments, a select icon 321 comprises an icon or other symbol indicating additional information related to the associated source data file 350 and/or associated cell 311 is available, such as information to be displayed via pop-up 335 provided when the user hovers over the icon. In some embodiments, a cell 311 comprises a icon configured to indicate one, two, or more properties and/or notations relative to the cell 311. In some embodiments, the icon provides information to the user based on its visual properties (e.g. an "!" or similar icon can indicate an error), and/or the icon indicates the presence of additional information to be displayed when the user selects the icon.

In some embodiments, one, two, or more select icons 321 comprise one, two, or more controls. Select icons 321, including one, two, or more controls, can be positioned in one, two, or more areas of GUI 300, such as grid image 310 and selection area 320. Controls displayed on a select icon 321 can be similar or dissimilar within grid 310 to a select icon within selection area 320. On grid 310, select icon(s) 321 can include controls comprising a play/pause button 341, a stop button 342, and/or an edit button 343. Buttons 341 and 342 can be configured to control the preview playback of the associated source data file 350. Edit button 343 can be configured to activate a subroutine configured to allow a user to edit the associated source data file 350, as described herebelow in reference to FIG. 6. Select icon(s) 321 can further include one, two, or more controls configured to manipulate one, two, or more properties of the associated source data file 350. For example, as shown in FIG. 3, SONG 1 comprises a volume control slider 322. Volume control slider 322 can be configured to adjust the volume of source data file 350 with respect to other source data files 350 correlated to grid 310. In the embodiment shown, SONG 1 comprises a volume raised two units, and SONG 2 comprises a volume lowered three units. A unit can comprise a relative percentage, a scaled relative percentage, a decibel level, and the like.

In the embodiment shown in FIG. 3, seven select icons 321 are shown correlated to grid image 310. The following description describes an example of a grid image 310, in process of being created, representing an audio file, and is only intended to represent one possible use of the system of the present inventive concepts. SONG 1 comprises a length approximately equal to eight beats, and is displayed starting in cell $311_{1,5}$ and ending in cell $311_{2,4}$. SONG 2 comprises a length of approximately equal to nine beats and is displayed starting in cell $311_{2,5}$ and ending in cell $311_{3,5}$. As described herebelow in reference to FIG. 6, a source data file 350 can comprise a length greater than the length displayed by the corresponding select icon 321. Source data files 350 can comprise lead-in offset times and/or "fade-out" offset times not represented by select icon 321. In some embodiments, the first "down beat" of an audio file is represented by the start of the associated select icon 321, although the associated audio begins before the beat indicated by the placement of the associated select icon 321. In some embodiments, the user resizes the select icon 321, as shown by arrows 303 associated with SONG 2. The resizing of select icon 321 can be configured to truncate, and/or otherwise modify the length of the associated source data file 350 during generation of the preview output file 40 and/or final output file 50 (generally output file 50).

One, two, or more select icons 321 can be configured to allow a user to cause system 10 to apply an "effect", such as EFFECT 1, which can be configured to indicate a particular effect to be used during the generation of the output file 50. For example, EFFECT 1 can comprise a length of two beats and is shown on cells $311_{2,4}$ and $311_{2,5}$, and can comprise a "cross-fade" effect, which can be configured to fade SONG 1 into SONG 2. In some embodiments, an effect provided by system 10 comprises an effect selected from the group consisting of: a lead in, such as a lead in to an adjacent source data file; a silencer, such as an effect configured to silence one, two, or more other source data files; a vocal enhancement effect, such as an effect configured to adjust the amplitude of a specific set of frequency ranges; a studder effect, such as an effect routine which separates a source data file 350 into multiple segments and copies, rearranges, removes, duplicates, repeats and/or alters one, two, or more of these segments when generating an output file; an effect that is based on source data files 350 that precede and/or come after a selected source data file 350 in the grid image 310, such as a transition effect that stutters audio from X seconds prior to the selected source data file 350 and/or stutters audio from Y seconds after the selected source data file 350, with the sequences of the stuttered audio based on one, two, or more parameters of the adjacent source data files 350, such as time, tempo, or audio amplitude; and combinations of these.

The embodiment shown in FIG. 3 comprises three sound effect select icons, S1, SOUND 2, and SOUND 3. In some embodiments, titles and/or other text associated with a select icon are truncated (e.g. S1) such that the text fits within the associated select icon 321. S1 is shown on cell $311_{2,2}$ and overlaps SONG 1. SOUND 2 and SOUND 3 are shown on cells $311_{2,6}$ and $311_{2,7}$, and $311_{2,7}$ and $311_{2,8}$, respectively. SOUND 2 and SOUND 3 overlay SONG 2 and overlap each other in cell $311_{2,7}$. During the generation of an associated output file 50, processing unit 100 can be configured to merge or otherwise combine multiple overlapping source data files 350 as shown.

A user can insert one of more "notation-select" icons, for example, NOTATION 1 onto grid 310. NOTATION 1 is shown starting on cell $311_{2,1}$ and ending on cell $311_{2,6}$. Notation select icons can be configured to allow a user to create notes within and/or about grid image 310, such as without affecting the output file 50 to be generated. In some embodiments, system 10 comprises a library of choreography-based notation select icons 321, for example, one, two, or more notation select icons which represent movement in a performance associated with an output file 50. In some embodiments, choreography-based notation select icons 321 can comprise notations similar to those used in dance choreography notation (e.g. similar to those used by dance choreographers). In some embodiments, notation select icons 321 can be overlaid on grid image 310 (such as temporarily overlaid using a semi-transparent display, or on a layer, as described herebelow in reference to FIG. 16), and/or notation select icons 321 can be positioned at the bottom of associated cells 311 (e.g. in a bottom corner of a cell 311).

Source data files 350 can include information correlating to the appearance of the associated select icons 321, which can comprise one, two, or more display properties, such as properties selected from the group consisting of: color of select icon; font of text within select icon; properties of text within select icon (e.g. bold and/or italic); height of select icon; transparency of select icon; and combinations of these. The source data file 350 information can determine the appearance of the associated select icon 321 provided on GUI 300. In some embodiments, all select icons 321 of a particular type (e.g. songs, video files, and notations) can comprise at least one similar visual characteristic. Source data files 350 can further include information correlating to the position of the associated select icon 321 as it is displayed in grid 310. The position information can include vertical position information (e.g. whether the icon is placed at the top or bottom of the associated cell 311) and/or stack order information (e.g. song select icons can be ordered and displayed "on top of" sound select icons, as shown). In some embodiments, rows 312 increase in height to accommodate the placement of more select icons 321 within a cell 311.

Referring now to FIG. 4, a portion of a grid image containing an error is illustrated, consistent with the present inventive concepts. Algorithm 115 of system 10 can comprise an error detection algorithm $115_{ERR}$, which can be configured to alert a user if the grid image 310 comprises one, two, or more undesirable or unacceptable conditions. In some embodiments, the error detection algorithm $115_{ERR}$ is configured to detect an undesired position of one, two, or more select icons 321 on grid image 310, FIG. 4 illustrates a row $312_1$ (such as a row 312 of grid image 310 of FIG. 3 described hereabove), containing an error in cell $311_5$.

System 10 can modify one, two, or more visual characteristics of a cell 311 containing an error, such as is shown. System 10 can alert the user via an audio and/or visual alert, such as a pop-up message that appears when a user initiates an output 50 generation process. In some embodiments, a particular pattern of one, two, or more select icons 321 causes an error condition, such as a single select icon associated with a cell 311 without at least a second select icon associated with the same cell 311 (e.g. such that output file 50 would comprise a portion with only the audio from a single source data file 350). In some embodiments, an undesired length of the grid image 310 causes an error condition, such as a grid image 310 which is too short or too long. In some embodiments, error detection algorithm $115_{ERR}$ is configured to detect if a source data file 350 starts on an incorrect beat relative to one, two, or more other source data files 350 of grid image 310.

In some embodiments, a select icon 321 extends beyond the final (desired) cell 311 of grid image 310. For example, the user may place a select icon 321 representing a 4.0 second sound clip in the final cell 311 of grid image 310, the final cell 311 representing approximately 0.4 seconds of grid file 130. In this example, the sound clip would extend beyond the final cell 311 (e.g. extends 3.6 seconds beyond the final cell 311). An overage such as described in this example can be detected by the error detection algorithm $115_{ERR}$ and indicated to the user as described hereabove. In some embodiments, if the duration of the overage is below a threshold, a first error type is triggered, and if the duration is above a threshold (e.g. the same or a different threshold), a second error type is triggered, for example, a more critical error, indicated by a different visual cue. In some embodiments, the threshold between a first error type and a second error type is between two and eight seconds, such as approximately five seconds.

In some embodiments, system 10 is configured to analyze the grid file 130 and determine if one, two, or more source data files 350 are associated such that a poor correlation exists (e.g. two songs are associated which would not sound good paired together). For example, two or more source data files 350 can each comprise a tempo which can be poorly compatible with each other and/or with the desired tempo of the output file 50. In some embodiments, source data files 350 comprise one, two, or more weighted numeric values, such as a beginning value and an ending value. In some embodiments, the weighted values are configured to assist the user in creating the grid image 310 (for example, only matching values or similar values should be placed in neighboring cells). In some embodiments, the values are represented via text, image, color, and/or a pattern within the corresponding select icon 321. The weighted values can be determined by the system and/or set by an administrator and/or other user of system 10. In some embodiments, system 10 is configured to automatically adjust the tempo of adjacent source data files 350, such as when system 10 classifies adjacent source data files 350 as having poorly matched tempos.

System 10 can be configured that one, two, or more errors detected prevent processing unit 100 from generating an output 50. In some embodiments, system 10 provides a warning if an error condition exists and a user may override the warning to produce an output file 50.

In some embodiments, error detection algorithm $115_{ERR}$ comprises one, two, or more processing guidelines (also referred to here as algorithmic "rules") which define one, two, or more errors to be identified, as well as one, two, or more rules which define corrective steps that algorithm $115_{ERR}$ can perform to correct an error. For example, one, two, or more errors identified by algorithm $115_{ERR}$ can be automatically and/or semi-automatically (e.g. with the user's permission and/or input) corrected by system 10. In some embodiments, error detection algorithm $115_{ERR}$ analyzes the metadata associated with the source data files 350 or a grid file 130, and/or can use digital signal processing to identify one, two, or more errors.

In some embodiments, error detection algorithm $115_{ERR}$ is configured to determine if a portion of grid image 310 contains an undesirably high number of source data files 350, and/or a number of source data files 350 that fit together poorly (e.g. to detect "cluttered" sections of grid image 310). Additionally or alternatively, error detection algorithm $115_{ERR}$ can be configured to identify potentially "boring" portions of grid image 310. System 10 can identify a portion of grid image 310 as boring if the portion comprises a lasting consistency such as consistencies selected from the group consisting of: rhythmic pattern; vocalist gender; source data file 350 type; song length; and combinations of these. A lasting consistency can be identified as boring if it is greater than a percentage of the total grid image, such as greater than 10% of the grid image, and/or if it is longer than a pre-determined time period, such as longer than 15 seconds, 30 seconds, or one minute. In some embodiments, error detection algorithm $115_{ERR}$ is configured to provide a rating (e.g. a qualitative assessment) of all and/or one, two, or more portions of a grid image 310, for example, a rating ranging from "very boring" to "very exciting".

Referring now to FIGS. 5A and 5B, a portion of a grid image comprising a beat indicator is illustrated in FIG. 5A, and a seek bar comprising a position indicator are illustrated in FIG. 5B, consistent with the present inventive concepts. FIG. 5A illustrates two consecutive rows $312_1$ and $312_2$ (such as two consecutive rows 312 of grid image 310 of FIG. 3 described hereabove). FIG. 5B illustrates a seek bar 305, comprising position indicator 306, which can be configured to represent the time index or current playback position of the associated output file 50 being played by system 10 (e.g. a musical preview output file 40 and/or musical output file 50 being played through speakers 155 of system 10). System 10 can further comprise a control for playing and/or pausing the playback of the output file 50, play button 341.

System 10 can comprise an active cell highlight function, which can be configured to highlight one, two, or more active cells 311. The highlighting function can comprise a routine configured to alter a visual property of the active cell(s), such as a property selected from the group consisting of: cell color; cell background color; image displayed within a cell; cell text color; cell text attribute, such as bold or italic; cell border width; cell border pattern, such as a dashed pattern; and combinations of these. In some embodiments, the active cell corresponds to the current playback position, for example, such that seek bar 305 and the highlighted cell correlate to the same position in time and move with the playback of the music. FIGS. 5A and 5B represent an instant in time at which the playback position is represented by cell $311_5$ (i.e. the system is currently playing the sound associated with the beat of music correlating to cell $311_5$). In a following instant, system 10 will highlight cell $311_6$ and position indicator 306 will continue to seek to the right (as indicated by arrows A and B). In some embodiments, system 10 is configured to highlight an entire row 312 at a time, such that the highlighted row 312 remains highlighted while each beat represented by the row is played by the system.

In some embodiments, system 10 comprises a beat metronome function, such as to provide a metronome that produces an aural and/or a visual cue during playback. The beat metronome function can be configured to produce a cue for each cell 311 during playback of output file 50.

In some embodiments, system 10 enables a "click-and-drag" highlight function, such that a user can select a first cell 311 and drag (e.g. move the cursor) to a second (e.g. subsequent) cell 311, to select a subset of cells 311. System 10 can highlight the selected cells 311 to indicate the selection. In some embodiments, after a selection of multiple cells 311 is made, a preview of the output file 50 is automatically generated and presented (e.g. played through speakers 155 of system 10) to the user. Additionally or alternatively, one, two, or more player controls 340 can be displayed to allow the user to play, pause, and/or cancel the playback of the selected cells 311.

In some embodiments, a menu is displayed after a selection is made (e.g. pop-up 335 described hereabove, or other menu window), allowing the user to alter one, two, or more properties of the selected cells 311. For example, the menu can be configured to provide the user with options selected from the group consisting of: deleting the selection; rendering a file from the selection; loop a playback of the selection; adjust the properties of the selection, such as the tempo or relative volume; delete a portion of the selection, such as all of a type of source data file 350, such as all effects; duplicate the selection; insert a space into grid image 310, such as a space (e.g. additional cells 311) matching the number of cells 311 selected, before or after the selected cells 311; and combinations of these. In some embodiments, a source data file 350 spans one, two, or more selected cells 311 and one, two, or more unselected cells 311. In these embodiments, if the user modifies a property of the selected cells 311 (e.g. the tempo of the selection), system 10 can be configured to "split" the source data file 350 and modify only the portion of the source data file 350 represented by the selected cells 311.

In some embodiments; system 10 is configured to render the selected cells 311 as an output file 50 (output file 50 representing only the selected cells 311). This output file 50 can then be provided to the user (e.g. via email and/or download). This output file 50 can comprise a preview file 40 (e.g. with one, two, or more overlays) and/or an output file 50 (e.g. without an overlay). In some embodiments, system 10 exports this output file 50 directly to a social media platform (e.g. Facebook, Instagram, Twitter, and the like), such that the user can "share" the file, again with or without overlays. In some embodiments, the social media export contains one, two, or more hyperlinks, tags, location links, mentions, multimedia, or other embedded coding determined and/or added by system 10. This embedded coding can be removable (e.g. by the user) or it can be required to be included by system 10 (e.g. in order for the user to post the output file 50). In some embodiments, the post and/or the output file 50 contains a link to an online interface for system 10, such as a link to edit grid image 310. Additionally or alternatively, the output file 50 rendered from the selected cells 311 can be purchased by the user. For example, the user can select a portion of grid image 310 and purchase an associated output file 50, such as a purchase for less than the cost of the entire output file 50 associated with grid 310. In some embodiments, system 10 limits the number of sections of a grid image 310 that can be purchased individually (e.g. such that the user cannot "piece together" the entire output file from purchased sections).

Figure 6:
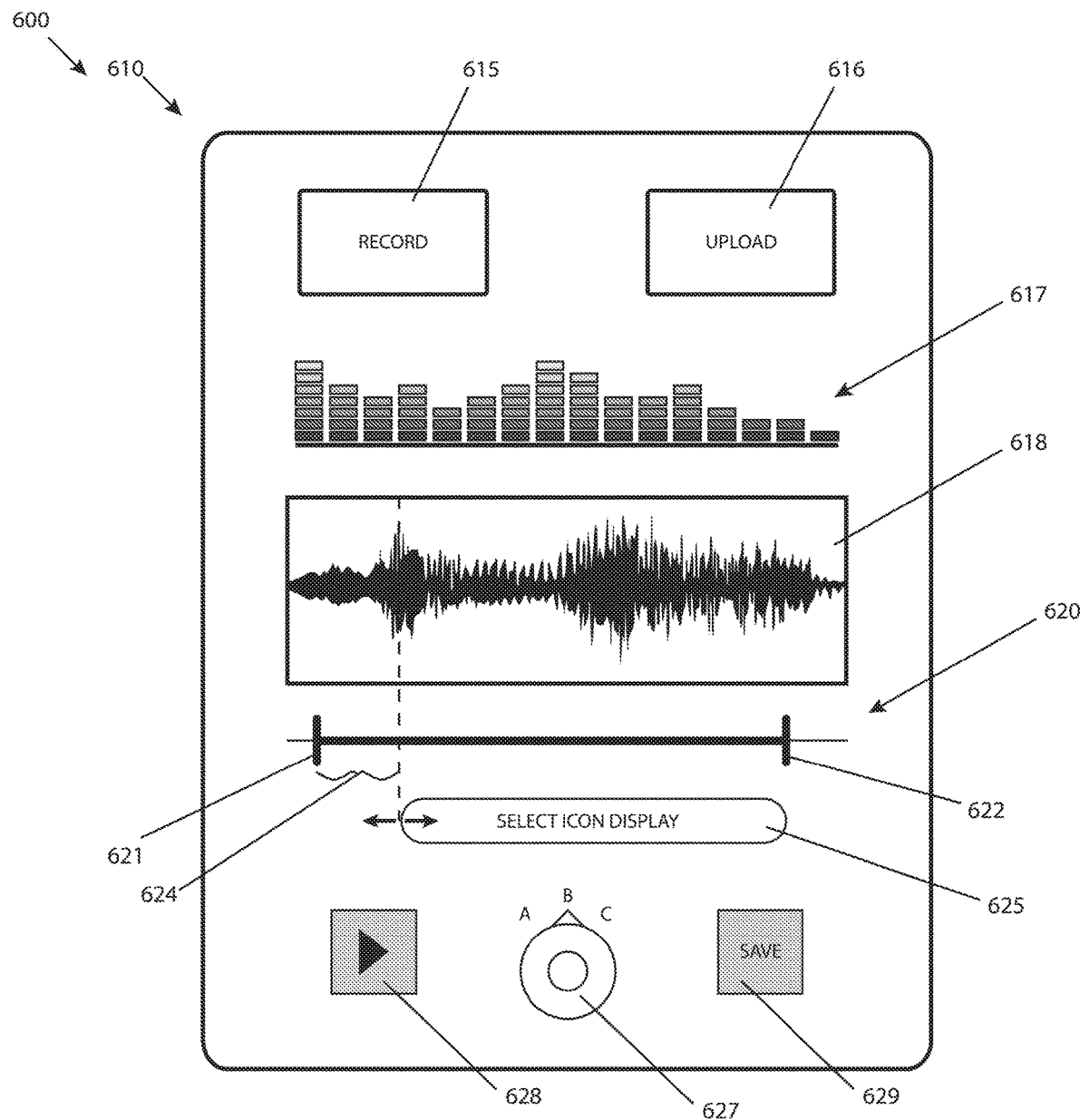
FIG. 6 illustrates a graphical user interface provided by a subroutine configured to allow a user to create and/or modify a source data file, consistent with the present inventive concepts.

Referring now to FIG. 6, a graphical user interface provided by a subroutine configured to allow a user to create and/or modify a source data file is illustrated, consistent with the present inventive concepts. Subroutine 600 can provide a graphical user interface, GUI 610. GUI 610 can comprise multiple display areas and controls to allow a user to generate new and/or modify existing source data files 350 of system 10. GUI 610 can comprise record button 615, with subroutine 600 comprising a corresponding record function which can be configured to allow a user to record an audio, video, and/or other input to be captured and/or manipulated by subroutine 600. GUI 610 can further comprise upload button 616, with subroutine 600 comprising a corresponding upload function, which can be configured to allow a user to upload audio; video; and/or other input file 30 to be captured and/or manipulated by subroutine 600, such as via a data transfer port, such as a USB port (e.g. data transfer port 203 described hereabove in reference to FIG. 1).

Subroutine 600 can include a spectrum analyzer and/or other audio file analyzer, and GUI 610 can comprise a corresponding graphical information display, graph 617, for providing output of the analysis. Proper (or improper) function of one, two, or more input devices, such as microphone 201 (e.g. of FIG. 1 described hereabove), can be indicated via graph 617. GUI 610 can include a visual time display, display area 618, which can be configured to provide a visual representation of the length of the recorded, uploaded and/or otherwise loaded (hereinafter "loaded", e.g. when an existing source data file 350 has been loaded into subroutine 600 for editing by a user) file. In some embodiments, the loaded file comprises an audio file, and display area 618 comprises a waveform display of at least a portion of the loaded file. Alternatively or additionally, the loaded file can comprise a video file, and display area 618 can comprise two or more frames of video, representing at least two different time indexes of the video file.

GUI 610 can include a trim control, control 620, including start and end selectors 621 and 622, respectively (e.g. start and end points used to segment a file via a trimming process of system 10). Trim control 620 can align with display area 618, such that selectors 621 and 622 can be aligned (e.g. automatically or by the user) to specific portions of the waveform or other time indicator displayed in display area 618, In some embodiments, display area 618 comprises two video frames (e.g. when the loaded file comprises a video file), a first video frame corresponding to the time index of the location of selector 621, and a second video frame corresponding to the time index of the location of selector 622. The first and/or second video frames can be configured to update, such as update in real time or at least near real time ("real time" herein), as a user adjusts the position of start and/or end selector 621 and/or 622, respectively.

In some embodiments, the loaded file comprises an audio file, and display area 618 comprises a waveform representing the audio file. Subroutine 600 can comprise an algorithm (e.g. algorithm 115 of system 10) configured to automatically detect the beginning and/or the end of the loaded audio file, and automatically position start and end selectors 621 and 622, respectively. Additionally or alternatively, a user can adjust the position of selectors 621 and 622. GUI 610 can further include select icon display 625, representing the time correlation between the loaded waveform and its representative select icon (e.g. select icon 321 to be used with system 10 described hereabove). In some embodiments, select icon display 625 matches the selected length determined by selectors 621 and 622, and represents the entire length of the loaded audio file. Alternatively, select icon display 625 can be adjusted to align with at least a portion of the selected length determined by selectors 621 and 622, and the loaded source data file can comprise an offset and/or a trail off, offset 624 as shown. Subroutine 600 can comprise an algorithm configured to automatically align the start of select icon display 625 with the first down beat, or other musically determinable portion of the loaded file. Additionally or alternatively, a user can adjust the size and/or position of select icon display 625 relative to display area 618.

Subroutine 600 can comprise an algorithm configured to automatically and/or semi-automatically generate a beat map for the loaded audio file. In some embodiments, the user indicates one, two, or more beats, such as by indicating on display area 618 a down beat and a subsequent beat, and system 10 is configured to analyze the input file along with the user input to determine a beat map. In some embodiments, system 10 is configured to determine a beat map without user input. In some embodiments, system 10 is configured to display the beat map to the user (e.g. via display area 618). In these embodiments, the user can confirm and/or adjust the beat map.

Subroutine 600 can comprise a video recorder function, which can be configured to allow a user to play an output file 50, such as a preview file 40 and/or final output file 50, while recording video. Subroutine 600 can be configured to synchronize the captured video with output file 50, or otherwise with a corresponding grid file 130, such as a grid file 130 created using system 10 as described hereabove, Subroutine 600, and/or another subroutine of system 10 can be configured to allow a user to replay the recorded video during and/or after a change has been made to the corresponding grid file 130 and view the video while hearing an audio portion of the modified output file 50. System 10 can be further configured to display a replay of the recorded video, while providing a visual representation of the current position of the track on the grid image 310, such as is described hereabove in reference to FIGS. 5A and 5B.

In some embodiments, subroutine 600 comprises a text to speech function. The text to speech function can be configured to analyze a text-based input file and to create synthetic and/or computer speech based on the text-based input file. In some embodiments, subroutine 600, and/or another routine of system 10, is configured to upload an electronic file, such as a file selected from the group consisting of: source data file; electronic spreadsheet; graphics file; scanned paper document; and combinations of these. In some embodiments, algorithm 115 of system 10 comprises file analysis algorithm $115_{FA}$ for analyzing the uploaded source data file and determining one, two, or more actions based on the analysis. In some embodiments, system 10 analyzes a spreadsheet, scanned image, and/or other file corresponding to a grid file 130 and automatically or otherwise populates at least a portion of grid image 310.

In some embodiments, subroutine 600 comprises a sound modification function which can be configured to modify the sound of one, two, or more loaded files. Multiple source data files can be loaded into subroutine 600, and/or subroutine 600 can be configured to make modifications to some or all source data files 350 of a particular type, for example, all music source data files, and/or all sound effect source data files. The modified source data files 350 can be selected from the group consisting of: music; voice over; sound effect; text; and combinations of these. The sound modification module can comprise one, two, or more preset modifications or effects to be applied to the source data file 350, such as is described hereabove in reference to FIG. 2. GUI 610 can comprise a graphical knob (e.g. an image of a knob) or other user manipulatable selector, selector 627, which can be configured to allow the user to choose a predefined sound modification. In some embodiments, GUI 610 comprises one, two, or more controls for manipulating the playback speed of the loaded file, for example, the speed of recorded and/or uploaded audio or visual files.

GUI 610 can further include a play button 628 and/or a save button 629. Play button 628 can be configured to play a preview of the loaded file. The preview can include an overlay as described hereabove. Save button 629 can be configured to save the modifications made to one, two, or more existing source data files 350. Additionally or alternatively, save button 629 can be configured to generate a new source data file 350, such as when the loaded file comprises a user uploaded file. The new source data file 350 can be saved in library 120 of system 10, and/or it can be stored in one, two, or more other libraries or other memory components, such as a library local to the user (e.g. on a user's computer).

Figure 7:
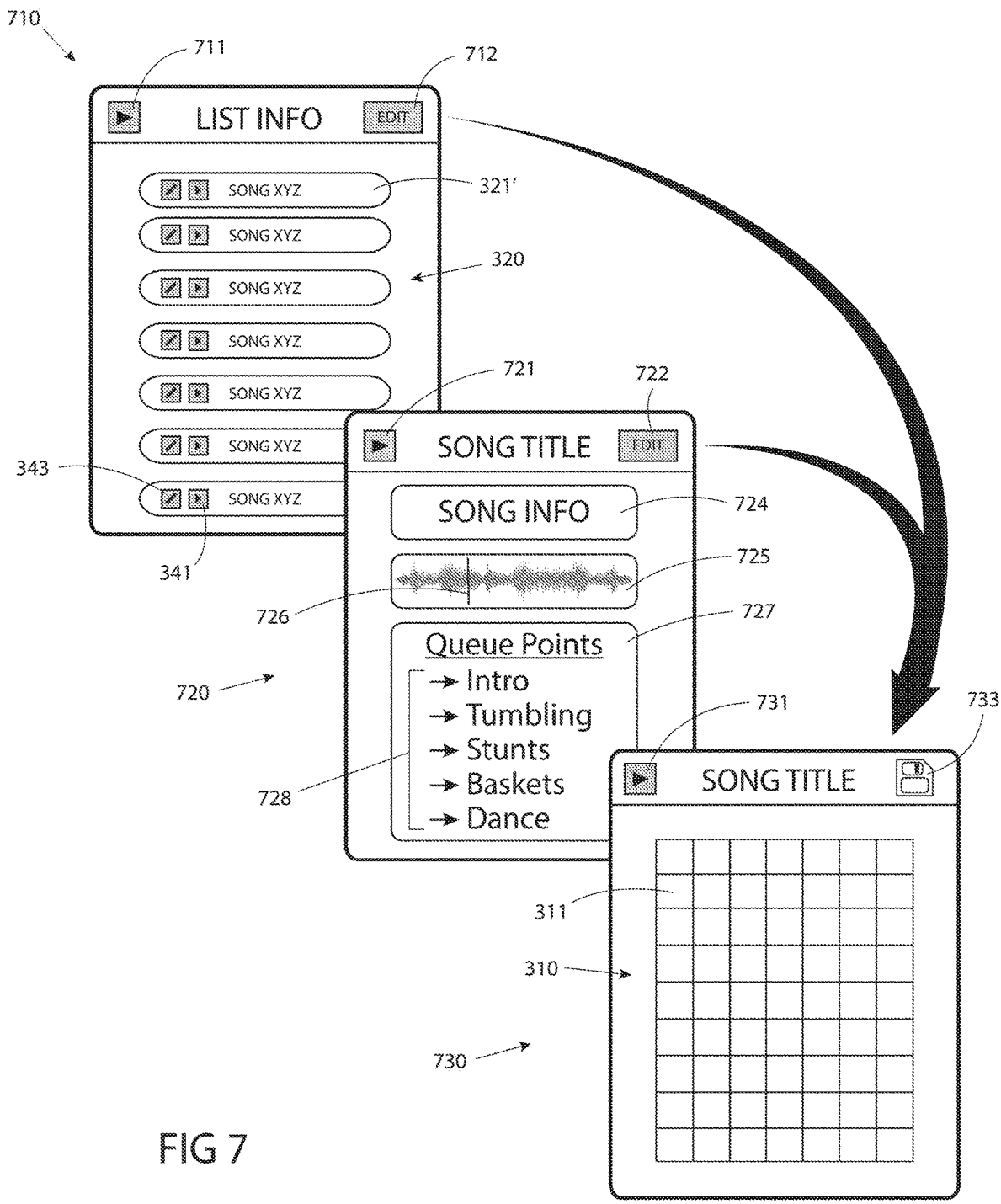
FIG. 7 illustrates a sequence of graphical user interfaces to be displayed, consistent with the present inventive concepts.

Referring now to FIG. 7, a sequence of graphical user interfaces to be displayed is illustrated, consistent with the present inventive concepts. FIG. 7 illustrates a first graphical user interface, playlist interface 710, a second graphical user interface, media detail interface 720, and a third graphical user interface, media editor interface 730. The GUIs illustrated in FIG. 7 can be presented to a user of system 10, such as via a display, such as display 160 of FIG. 1. In some embodiments, these GUIs are displayed on a user device, such as a smart phone or tablet. System 10 can be configured to navigate between GUIs 710, 720, and 730 as described herebelow. Media editor interface 730 can be similar to GUI 300 comprising grid image 310, as described hereabove in reference to FIG. 1 and FIG. 3.

The first GUI, playlist interface 710, can be presented to a user. Playlist interface 710 can comprise a selection area 320. Selection area 320 can comprise one, two, or more select icons 321'. Select icons 321' can each represent a source data file 350, or a grid file 130 (e.g. a grid file 130 associated with an output file 50). Grid files 130 can comprise template grid files 130 and/or user generated grid files 130. The arrangement of select icons 321' displayed by playlist interface 710 can correlate to a "playlist", such as a user manipulatable playlist. For example, the user can modify which select icons 321' are associated with the playlist (e.g. add or remove grid files 130), and/or the user can manipulate the order of select icons 321'. Playlist interface 710 can comprise one, two, or more player controls, control button 711, and one, two, or more playlist manipulation controls, edit button 712. Control button 711 can be configured to play the output files 50 associated with grid files 130 as associated with the select icons 321', for example, to play the output files 50 in the order indicated by the playlist. Additionally or alternatively, the output files 50 on the playlist can be played in a "shuffle" mode. Select icons 321' can comprise one, two, or more controls, for example, a play button 341 and/or an edit button 343. Play button 341 can be configured to play associated output file 50, for example, to "start" the playlist from the selected file, and to continue with subsequent files in the playlist. Edit button 343 can be configured to enable the user to manipulate the playlist, and/or to display media editor interface 730, as described herebelow. In some embodiments, the user rearranges the select icons 321' in selection area 320 using a drag and drop method, such as a drag and drop comprising visual indicators such as a "natural movement" indicator. In some embodiments, one, two, or more of the select icons 321' comprise a vertical grip, a horizontal grip, and/or an omnidirectional grip, such as a grip that indicates the direction in which the select icon 321' can be repositioned.

In some embodiments, a user has multiple grid files 130 associated with their user profile, as described hereabove in reference to FIG. 1. Playlist interface 710 can comprise a select icon 321' representing each or a subset of the multiple grid files 130 associated with the user profile. In some embodiments, select icons 321' represent files selected from the group consisting of: custom output files 50, such as output files 50 generated based on a user generated grid file 130; premade output files 50, such as song and/or song mixes generated by the one, two, or more administrators of system 10; preview files 40, such as files that have not been purchased by the user and include one, two, or more sound overlays; and combinations of these.

The second GUI, media detail interface 720, can be presented to the user while an associated output file 50 is playing (or otherwise selected without playing). Detail interface 720 can comprise an information display area 724. Information display area 724 can display one, two, or more properties of a selected grid 130 and/or output file 50, such as the file name or other meta data associated with the selected grid file 130. Detail interface 720 can comprise one, two, or more player controls, control button 721, and one, two, or more editing controls, edit button 722. Edit button 722 can be configured to present media editor interface 730 to the user, such as to edit an associated grid file 130, as described herebelow. Control button 721 can be configured to control the playback of output file 50, such as to play, pause, fast forward, and the like. Media detail interface 720 can comprise a visual time display, display area 725, which can be configured to provide a visual representation of the output file 50. Display area 725 can comprise an indicator 726, which can be configured to advance along display area 725 to indicate the playback time index. In some embodiments, indicator 726 is repositioned within display area 725 such that the user can "jump" or "scrub" through the timeline of output file 50:

Media detail interface 720 can further comprise a selection area 727, wherein one, two, or more queue points 728 are displayed. Queue points 728 can be configured to jump to a predefined time index of output file 50 (e.g. begin playback of output file 50 from a particular time index), such as a time index assigned by the user during the process of generating grid file 130.

Edit buttons 712 and/or 722 described hereabove can be configured to trigger system 10 to present to the user media editor interface 730. Media editor interface 730 can comprise a grid image 310, such as grid image 310 described herein. Edit buttons 712, 722 can load an associated grid file 130 when opening media editor interface 730, such that the user can choose to edit a grid file 130 from the playlist interface 710 and/or the media detail interface 720, for example, if the user chooses to edit a grid file 130 while listening to the associated output file 50. In some embodiments, edit button 722 is configured to display the current time index of the grid file 130 on grid image 310, such that the user does not have to "search" for a particular section of grid file 130. Additionally or alternatively, system 10 can be configured to highlight a cell 311 (e.g. as described hereabove in reference to FIG. 5), such as the cell 311 associated with the time index of the playback at the time edit button 722 was selected. Media editor interface 730 can comprise one, two, or more player controls, control button 731, which can be configured to control playback, for example, the playback of a preview output file 40 associated with the current grid image 310. Media editor interface 730 can further comprise a save button 733, which can be configured to enable a save function as described herein. In some embodiments, save button 733 additionally returns the user to the calling interface (e.g. the interface from which media editor interface 730 was triggered), for example, playlist interface 710 or media detail interface 720.

Figure 8:
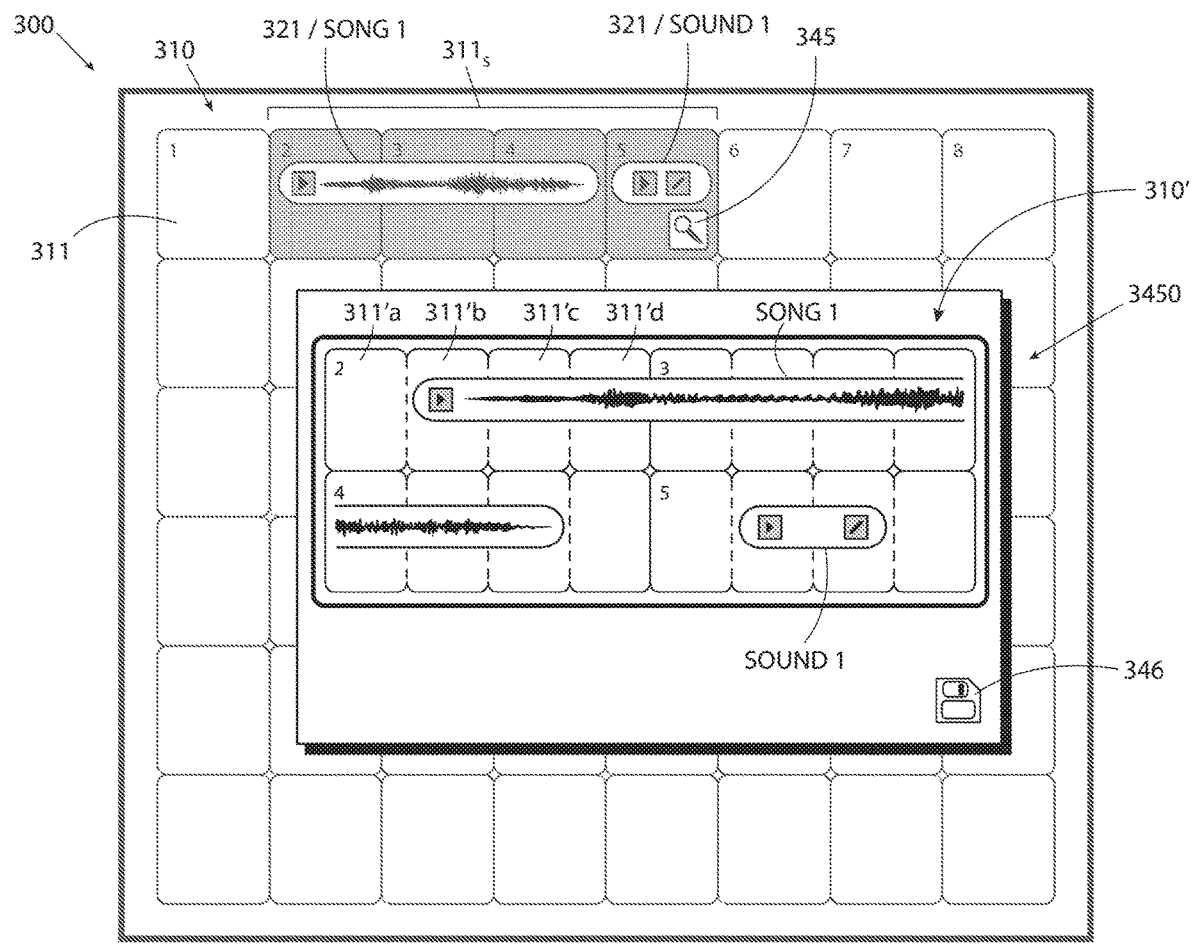
FIG. 8 illustrates a zoom window rendered over a grid image, consistent with the present inventive concepts.

Referring now to FIG. 8, a zoom window rendered over grid image is illustrated, consistent with the present inventive concepts. In some embodiments, system 10 is configured to allow the user to select one, two, or more cells 311 from grid image 310, cells $311_S$ shown, and to open a zoom window 3450 to analyze and/or modify the selected cells $311_S$. Zoom window 3450 can be rendered over grid image 310 which is displayed on GUI 300, as shown. Zoom window 3450 comprises a grid image 310' comprising multiple cells 311'. Each cell 311' of grid image 310' can comprise a time duration shorter than the time duration of cells 311 of the associated grid image 310. For example, grid image 310' can comprise four cells 311'a-d each representing ¼ beat when a single cell 311 of grid image 310, representing a single beat, is "zoomed" by zoom window 3450. As described herebelow, cells 311' of grid image 310' can also be referred to as sub-cells herein. Grid image 310 can be shown with a lower intensity presentation, "greyed out" herein (e.g. lighter brightness, different color, smaller font, and/or other graphical change indicating a lower priority). For example, grid image 310 can be greyed out below zoom window 3450. Alternatively zoom window 3450 can replace the rendering of grid image 310, for example, if zoom window 3450 is displayed in a "full screen" mode. As shown, grid image 311 can comprise a control, control 345 shown, which can be configured to trigger zoom window 3450. Control 345 can be rendered (e.g. automatically rendered) whenever one, two, or more cells 311 are selected on grid image 310. In some embodiments, control 345 is only rendered if the number of cells selected is below a threshold, for example, below 16 cells, such as below 8 cells. In some embodiments, system 10 is configured to display zoom window 3450 for a cell 311 if the user "clicks and holds" on a cell 311.

Zoom window 3450 can display the information related to selected cells 311s that have each been divided into one, two, or more parts. For example, if each cell 311 represents a full beat of music, zoom window can display each cell 311 divided into ¼ beats, represented by the four sub-cells 311'a-d. In some embodiments, each cell 311 is divided in up to $1/64^{th}$ beats. In some embodiments, sub-cells 311' equally divide a cell 311 (e.g. all sub-cells 311' comprise the same width). Zoom window 3450 can display one, two, or more select icons 321 associated with the selected cells 311s, such as SONG 1 and SOUND 1 shown. Select icons 321 displayed in zoom window 3450 can provide additional visual information to the user (e.g. more visual information than is visible on grid image 310). For example, a select icon 321 can display a waveform of the associated source data file 350, for example, a waveform as described in reference to FIG. 6 hereabove. Zoom window 3450 can comprise a save control, control 346 shown. Save control 346 can be configured to enable the user to save any changes made to grid image 310 within zoom window 3450.

FIG. 8 illustrates an example of zoom window 3450 displaying a zoomed in view of four cells 311, selected cells $311_S$. Selected cells $311_S$ comprise cells $311_2$-$311_5$. A select icon 321, SONG 1, spans cells $311_2$-$311_4$, and a second select icon 321, SOUND 1, is positioned within cell $311_5$. Zoom window 3450 visually illustrates to the user a more specific (e.g. with higher temporal resolution) position of both SONG 1 and SOUND 1. As shown, SONG 1 is 2.5 beats in length, starting a ¼ beat into cell $311_2$, and ending ¾ beats into cell $311_4$. Similarly, SOUND 1 is ½ beat in length and is positioned over the middle two ¼ beats of cell $311_5$. In this manner, zoom window 3450 allows the user finer control over the position of select icons 321 within grid image 310. For example, the user could reposition SOUND 1 such that it is positioned over the second half of cell $311_5$.

Figure 9:
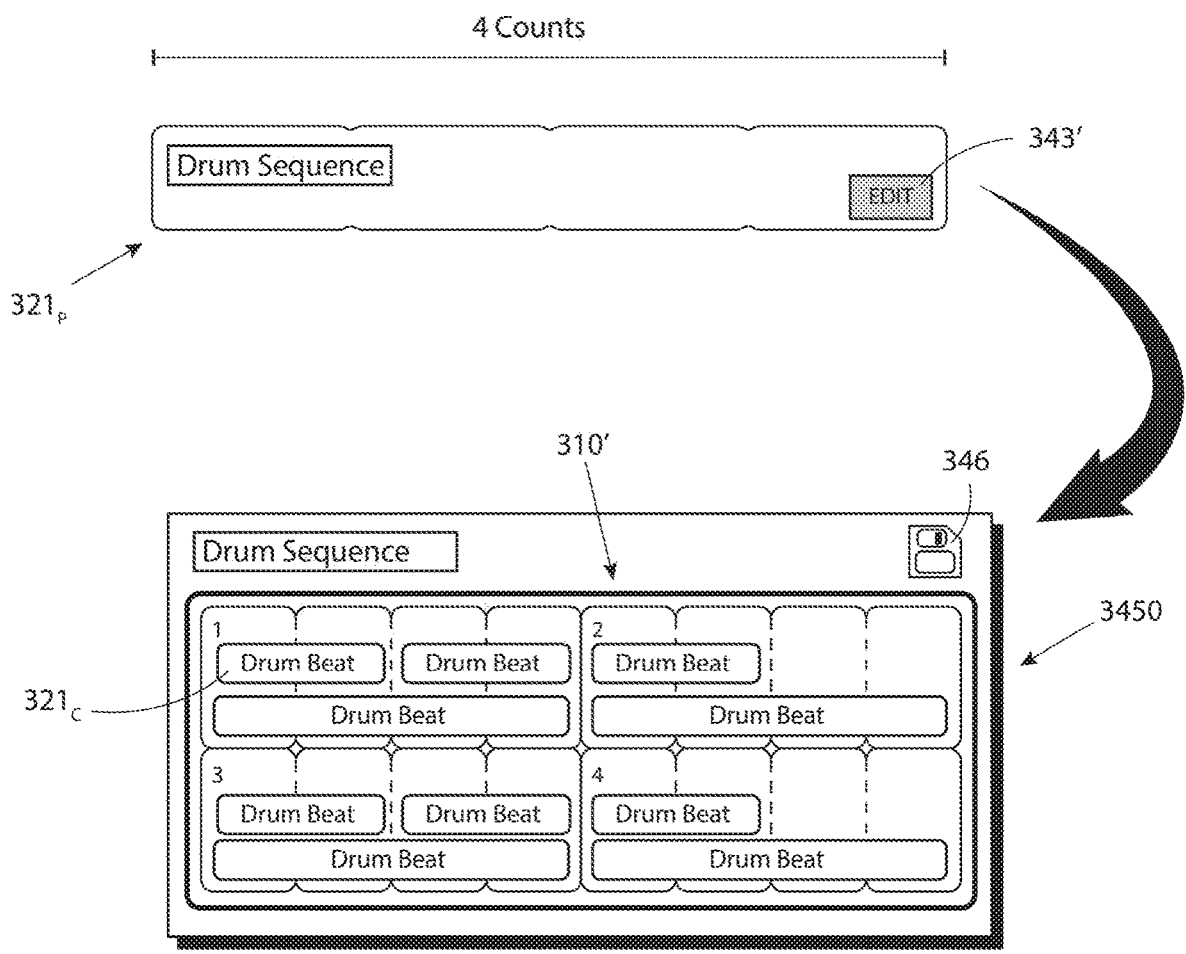
FIG. 9 illustrates a zoomed graphical user interface of a set of nested files, consistent with the present inventive concepts.

Referring now to FIG. 9, a zoomed graphical user interface of a set of nested files is illustrated, consistent with the present inventive concepts. In some embodiments, a parent source data file $350_P$ comprises one, two, or more nested child source data files $350_C$. For example, a source data file $350_P$ can comprise a sequence of drum beats with a length of four beats and it can be represented by a select icon comprising the same length, select icon $321_P$ shown. Select icon $321_P$ could be displayed on grid image 310 and/or in selection area 320, as described hereabove in reference to FIG. 3. A select icon $321_P$ comprising one, two, or more nested files can be displayed with an edit control, control 343'. Edit control 343' can be configured to trigger zoom window 3450 (e.g. to cause zoom window 3450 to be displayed). Zoom window 3450 can be similar to zoom window 3450 described hereabove in reference to FIG. 8, comprising a grid image 310'. Zoom window 3450 enables the user to modify the parent source data file $350_P$, such as by rearranging, adding, and/or subtracting one, two, or more source data files $350_C$, these files represented by select icons $321_C$. Zoom window 3450 can comprise a save control, control 346. Save control 346 can be configured to enable the user to save any changes made to source data file $350_P$.

In some embodiments, the user triggers a GUI similar to zoom window 3450, which can be configured to produce one, two, or more source data files $350_P$. Similar to the creation of an output file 50 described herein, the user can generate a source data file $350_P$ by adding one, two, or more source data files $350_C$ to grid image 310'. In these embodiments, the source data file $350_P$ can be saved to library 120 (e.g. via save control 346), and subsequently used within grid image 310. In some embodiments, two, three, or more levels of nested file structures are included to construct a final output file 50.

In some embodiments, such as is described hereabove in reference to FIG. 8, the user selects one, two, or more cells 311 of grid image 310 to trigger zoom window 3450. In some embodiments, the user saves the selection to library 120 as a stand-alone source data file $350_P$, with the included source data files 350 becoming source data files $350_C$ for that file $350_P$. This source data file $350_P$ can then be used in a new and/or different grid image 310, such as a use by the current user and/or a different user, such as is described in reference to marketplace 140 in FIG. 1 hereabove. For example, a user can select several cells 311 (e.g. a specific section of a first grid image $310_A$, such as a section corresponding to tumbling choreography), trigger zoom window 3450, and save the selection as a source data file $350_P$. Subsequently, the user can edit a second grid image $310_B$, and select the source data file $350_P$ generated previously. In this manner, a user can save sections of a grid image $310_A$ and import those sections into a second grid image $310_B$. Additionally or alternatively, the user can publish the selection to marketplace 140 (e.g. save the selection to library 120 and make available for purchase in marketplace 140), Publishing files to marketplace 140 is described in detail hereabove in reference to FIG. 1. In some embodiments, the user "breaks apart" (e.g. separates into two or more portions) a nested source data file $350_P$, such that the nested select icons $321_C$ replace the associated select icon $321_P$, and these nested select icons $321_C$ can subsequently be manipulated on grid image 310 without the use of zoom window 3450.

Referring now to FIG. 10, a method of remixing an input to produce an output is illustrated, consistent with the present inventive concepts. Process 4000 of FIG. 10 can be accomplished using system 10 described herein. Process 4000 comprises a series of steps for creating an output 50 based on the analysis of an input file 30 and a selected "style" (e.g. a musical style defining one, two, or more rules, as described herebelow), Algorithm 115 of FIG. 1 can comprise a remix algorithm, algorithm $115_{RMX}$, which can be configured to analyze input file 30 and perform one, two, or more modifications to input file 30 to produce output 50, based on the selected style.

In Step 4010, a user selects one, two, or more input files 30 to be remixed, and a style in which the input file is to be remixed. For example, the user may select an audio clip comprising a soft bassline and a moderate BPM (beats per minute), and the user may indicate this input should be remixed to be "more energetic" and/or in a "hip hop" style. In some embodiments, the user selects multiple input files 30, such that process 4000 is performed sequentially and/or in parallel on each of the input files. In some embodiments, the user elects to have one, two, or more input files 30 remixed two or more times, such as a remix in two or more different styles. For descriptive clarity, Steps 4020 through 4060 will be described herebelow for the analysis and remixing of a single audio file. The steps described herein can be used sequentially and/or in parallel for multiple input files 30, and/or for multiple remixes of a single input file 30. In some embodiments, process 4000 is configured to remix additional file types, such as video files and/or image files.

In Steps 4020 through 4050, remix algorithm $115_{RMX}$ analyzes, remixes, and produces a preview file 40 of the remixed input file 30. In Step 4020, the input file 30 is analyzed by remix algorithm $115_{RMX}$. The file analysis of the input file 30 can include: beat mapping; melody identification; lyric identification; analysis of the audio quality, for example, the bitrate of the audio file; tempo detection; musical key identification (e.g. based on melody identification or polyphony); mood and/or sentiment identification based on one, two, or more qualities such as key, timber, vocalist expression, inflection, or emotion; gender of vocalist; genre identification; meter detection; song structure (e.g. identifying the parts of a song such as intro, verse, pre-chorus, chorus, bridge); and combinations of these. In some embodiments, remix algorithm $115_{RMX}$ is configured to "reject" an input file 30, based on acceptance criteria used in the analysis. For example, if the quality of the input file 30 is below a threshold, process 4000 can reject the input file 30 and cancel the process, and/or can alert the user and proceed only with user approval. Additionally or alternatively, after analysis of the input file 30, process 4000 may determine that the input file 30 cannot be algorithmically remixed based on the selected style, and system 10 can alert the user and/or cancel the process.

In Step 4030, one, two, or more break points can be identified in the input file 30. Break points are time indices on the input file where the remix algorithm $115_{RMX}$ determines that the file can be segmented, such that one, two, or more of the segments of the input file 30 can then be removed, reordered, and/or modified individually. In some embodiments, no break points are identified in input file 30. In some embodiments, one, two, or more break points are identified and the resulting segments of the input file can be analyzed by the remix algorithm $115_{RMX}$. In some embodiments, one, two, or more segments are identified as being the same or at least similar. For example, if the input file 30 comprises an audio file comprising three verses and three choruses, five break points corresponding to six segments can be identified in Step 4030, and of the six segments, the three chorus segments can be identified as being the same or at least similar. In some embodiments, remix algorithm $115_{RMX}$ is configured to automatically resize an input file 30. For example, remix algorithm $115_{RMX}$ can be configured to trim an input file 30 comprising a music track to a specific duration, such as by determining appropriate start and end points, and/or by adjusting the tempo of the input file 30 to meet the desired requirements.

In Step 4040, one, two, or more modifications to input file 30 are determined by algorithm $115_{RMX}$, and the one, two, or more modifications to input file 30 are implemented. In some embodiments, the one, two, or more modifications to input file 30 include: an added rhythm; an added key baseline; a modification to the duration and/or playback rate; an added effect, such as an adjustment to the amplitude of a defined frequency range (equalization); and combinations of these. In some embodiments, the input file 30 can be replaced by two or more alternate files, such as when an input file 30 comprising a complete song is replaced with two separate files that comprise the acapella and the instrumental portions of the song.

In optional Step 4050, system 10 can produce a preview file 40 of the remixed input file 30 for a user to review. In optional Step 4055, if the remix is not approved by the user, Steps 4020 through 4050 can be repeated. In some embodiments, a user provides feedback to system 10, such as feedback related to why the remixed file was not approved, and Step 4020 can include an analysis of this user-provided feedback, the results of the analysis used as an input to remix algorithm $115_{RMX}$. In some embodiments, an analysis of the input file is performed by algorithm $115_{RMX}$, such as when algorithm $115_{RMX}$ comprises a self-checking algorithm. For example, algorithm $115_{RMX}$ can be configured such that distinct processes modify the input file 30 and review the modification, such as to confirm that the modifications have produced a remixed file that is acceptable based on one, two, or more rules and/or guidelines of algorithm $115_{RMX}$. Additionally or alternatively, review algorithm $115_{REV}$ can be configured to review a remixed input file after one, two, or more modifications have been made. If the remixed input file is approved in Step 4055, process 4000 proceeds to Step 4060.

In Step 4060, the remixed input file can be mastered, such as by mastering algorithm $115_{MAS}$ described hereabove in reference to FIG. 1 and FIG. 2, and the remixed and mastered file is saved. In some embodiments, the file is saved to library 120 as a source data file 310. Alternatively or additionally, the file can be saved as a final output file 50, and provided to the user, such as provided for purchase via a shopping cart function as described herein. In some embodiments, process 4000 is performed on any input file 30 introduced into system 10 (e.g. to be saved as a source data file 350). In some embodiments, process 4000 provides a batching function, such as a function configured such that an administrator or other user of system 10 can upload multiple input files 30 for incorporation into library 120, and process 4000 can be performed on each input file 30, sequentially and/or in parallel. In some embodiments, remixing an input file 30 comprises checking the fidelity of an input file 30, and improving the fidelity if it is below a threshold, for example, a fidelity check performed by mastering algorithm $115_{MAS}$. In some embodiments, process 4000 is configured to automatically remix one, two, or more input files 30 (e.g. using a batching function), such as to apply one, two, or more modifications to ensure an input file 30 comprises an appropriate format and/or other minimum requirements to properly serve as a source data file 350 of system 10 (e.g. when process 4000 is configured to remix one, two, or more input file 30 to populate a library or source data files 350 of system 10). In some embodiments, remixing an input file 30 for use as a source data file 350 comprises applying one, two, or more styles and/or other preset modifications to the input file 30, such as to ensure the input file 30 matches a particular sound associated with one, two, or more source data files 350. For example, process 4000 can be configured to automatically remix one, two, or more input files such as to apply a "pop" or "cheer" style to the input files.

Figure 11:
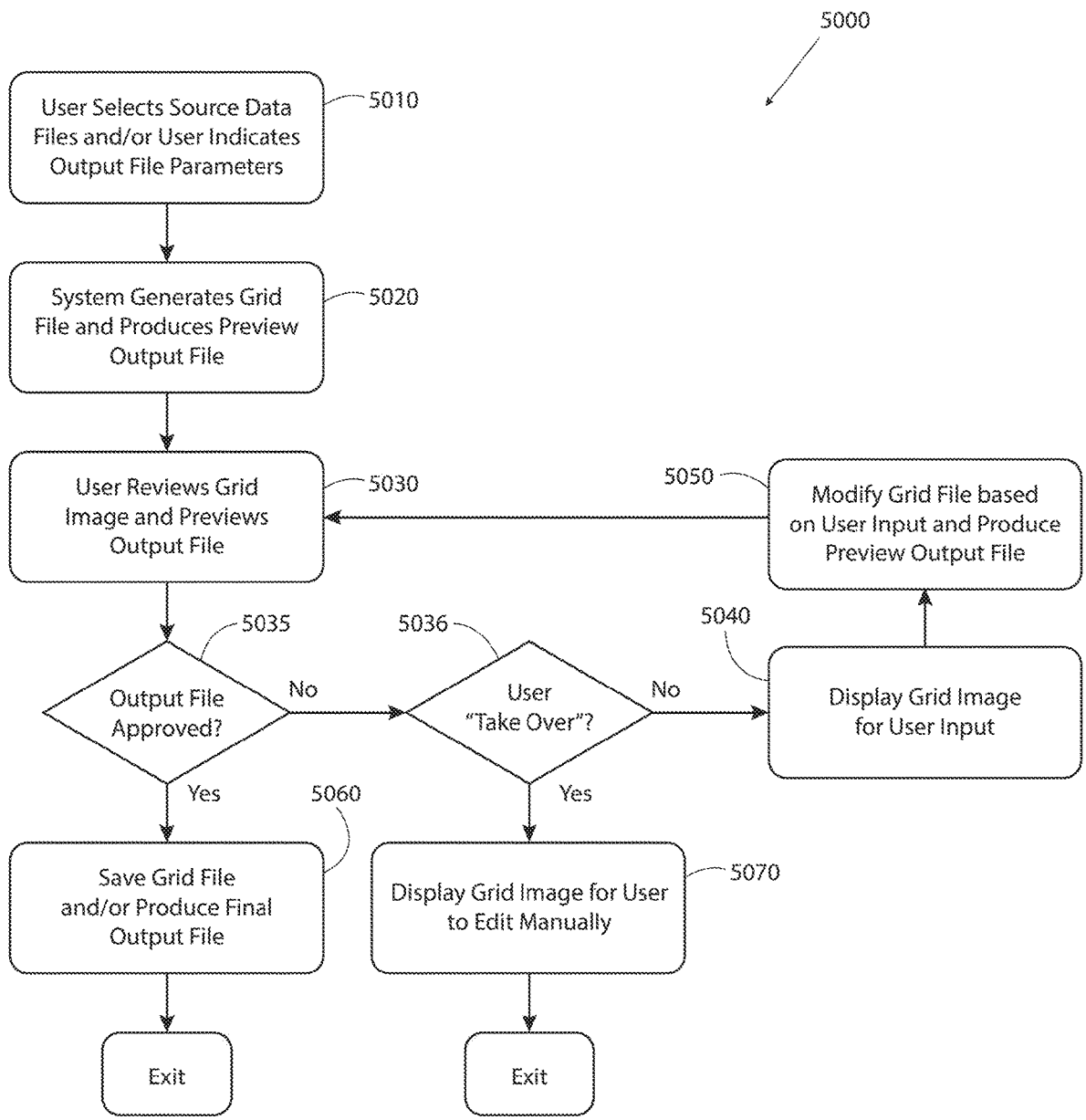
FIG. 11 illustrates a method of producing a grid file, consistent with the present inventive concepts.

Referring now to FIG. 11, a method of producing a grid file is illustrated, consistent with the present inventive concepts. Process 5000 of FIG. 11 can produce a grid file (automatically, semi-automatically, and/or manually) using system 10 described herein. Process 5000 comprises a series of steps for creating a grid file 130 (and/or an associated output file 50) based one, two, or more user inputs. Algorithm 115 of FIG. 1 can comprise an automation algorithm 115$_{AUTO}$, which can be configured to create a grid file 130 (e.g. a correlation between two or more source data files 350), and/or to produce an output file based on the correlation.

In Step 5010, a user initiates the production (e.g. automatic production) of a grid image 310. In some embodiments, the user selects one, two, or more source data files 350 to be included in the generated grid file 130. Additionally or alternatively, the user can indicate one, two, or more parameters of grid file 130 to be generated, such as the final length of grid file 130, and/or the number of source data files 350 to be included in the grid file 130. In some embodiments, the user provides a partially completed grid file 130, and process 5000 is configured to automatically "complete" the grid file 130. For example, the user can create a portion of a grid file 130, as described herein, by setting the length, tempo, and/or one, two, or more other desired characteristics to be included. Additionally, the user can annotate the grid file 130, for example, the user can insert one, two, or more notation select icons, annotating one, two, or more sections of the grid file 130. In some embodiments, the user can select a portion of a partially completed grid file 130, and process 5000 is configured to automatically populate the selected portion of grid image 310 with one, two, or more source data files 350.

In some embodiments, system 10 is configured to continuously or periodically review a grid file 130 (e.g. as a user is generating the file). Based on process logic data 500 and/or learning data 550 and the review of grid file 130, an algorithm 115 of system 10 can identify one, two, or more sections of grid image 310 where the user may desire an automatically generated portion. For example, system 10 can "recognize" (e.g. an algorithm 115 identifies based on learning data 550) that the user has modified most or all of a grid image 310 except the first portion. System 10 can present a prompt to the user recommending an automatically generated intro portion to grid image 310, such as a prompt that is similar to: "It looks like you need an intro. Let me help!". In some embodiments, one, two, or more prompts presented to the user by system 10 are personified, such as when system 10 refers to itself in the first person (e.g. "let 'me' help").

In Step 5020, system 10 completes the generation of the grid file 130 (e.g. automatically) and produces a preview output file 40. In some embodiments, system 10 analyzes one, two, or more inputs, and generates at least a portion of grid file 130 based on the analysis, for example, such as described hereinbelow in reference to FIG. 17, In generating the grid file 130, system 10 can be configured to perform one, two, or more of the following: select one, two, or more source data files to add to the grid image 310; modify one, two, or more source data files prior to and/or once added to the grid image 310; adjust the tempo of at least a portion of the grid image 310; arrange and/or rearrange one, two, or more source data files 350 of the grid image 310; and combinations of these. In some embodiments, system 10 is configured to automatically generate a portion of a grid image 310, for example, a layer of grid image 310 is automatically generated, such as a layer described herein in reference to FIG. 16, For example, system 10 can be configured to automatically generate the "sound effect" layer for a grid image 310 previously generated by a user with or without sound effects. In some embodiments, the user locks a portion of a previously generated grid image 310, and system 10 is configured to automatically generate (or regenerate) the unlocked portion of grid image 310. In some embodiments, system 10 selects one, two, or more source data files 350 to include in grid image 310 based on one, two, or more properties of the grid image 310 and/or the source data files 350, such as popularity, mood, and/or theme. In some embodiments, the popularity of a source data file 350 is determined based on one, two, or more of the following: popularity of the source data file 350 among some or all users of system 10 (e.g. how users of system 10 have previously rated the source data file 350); similarity to other source data files 350 previously favorited by the user; metadata from other sources, such as Billboard Top 40, Pandora, Spotify, or the like; and combinations of these.

System 10 can be configured to select one, two, or more source data files 350 for use in an automatically generated grid image 310 based on one, two, or more of the following: the style of the source data file 350, such as the music style or genre; the size of the source data file 350, such as the duration; the tempo of the source data file 350; the lyrics of the source data file 350; user info, for example, a team name; correlation to other source data files 350 associated with the grid image 310; and combinations of these.

In Step 5030, system 10 displays the generated grid image 310, and/or the user reviews (e.g. listens to) the generated grid image 310 and/or preview output file 40. In Step 5035, if the user has reviewed and approved the generated grid file 130 and preview output file 40, process 5000 proceeds to Step 5060. If the user has not approved the generated grid file 130, process 5000 proceeds to step 5036. In Step 5036, system 10 allows the user the option to manually "take over" the process of completing grid file 130. If the user chooses this manual mode, process 5000 proceeds to Step 5070. If the user does not choose the manual mode, process 5000 proceeds to Step 5040, and the generated grid image 310 is modified further (e.g. automatically by system 10).

In Step 5040, grid image 310 is presented to the user. The user can provide feedback to system 10 via grid image 310 to direct further modification (e.g. automatic modification) of grid file 130 in Step 5050. For example, the user can select one, two, or more source data files 350 and/or regions of grid image 310 and flag ("identify") those selections ("user flags" herein). User flags can indicate a user guideline for process 5000, such as a guideline selected from the group consisting of: lock selection (e.g. do not edit the selection); replace selection (e.g. replace the source data files 350 associated with the selection); remix selection (e.g. modify the "sound"

of the selection, for example, using process 4000 described hereabove in reference to FIG. 10, but don't replace all source data files 350 within the selection); modify a specific parameter of the selection; lock and mimic the selection; mark a section as a "favorite", such as to lock the selection and indicate to system 10 to emulate the properties of the selection in other sections; and combinations of these. For example, if the user indicates a selection is to be locked and mimicked, system 10 will not modify the selection, and will adjust the remainder of grid file 130 to mimic one, two, or more characteristics of the selection throughout grid file 130.

In Step 5050, system 10 edits (e.g. automatically edits) the grid file 130 based on the user input of Step 5040 and produces a preview output file 40, The processes of Step 5050 can be similar to the processes of Step 5020 described hereabove. In some embodiments, process 5000 begins at Step 5050, for example, if the user initiates an automatic completion of at least a portion of grid file 130 while populating and/or otherwise editing a grid image 310, such as in Step 2200 of process 2000 described hereabove in reference to FIG. 2. In some embodiments, in Step 2200 of process 2000, the user selects a region and indicates a user guideline for process 5000 to replace and/or complete the selection, and initiates process 5000. In these embodiments, process 5000 would initiate at Step 5050, Following Step 5050, Steps 5030 and 5035 are repeated. In some embodiments, two, three, or more loops through Step 5050 are performed to generate a grid file 130. In some embodiments, process 5000 comprises a functionality requiring a limited amount of user input (e.g. a limited number of mouse or other input device clicks). For example, system 10 can display an icon configured to initiate process 5000 with a single click. Process 5000 can comprise a "rinse and repeat" type functionality, wherein a grid image 310 is generated and presented to the user, and the user selects portions of the grid image the user likes and/or dislikes (e.g. the user "rinses" the grid image 310), and process 5000 subsequently repeats the automatic generation of the portions of grid image 310 the user indicated. This rinse and repeat functionality (or another implementation of process 5000) can be configured to require a limited number of user interactions in each step, for example, less than 5 interactions (e.g. clicks) per step, such as less than 10, less than 15, or less than 20. In some embodiments, less than 5, 10, 15, or 20 interactions per 30 seconds of length of a grid file 130 are required per step of process 5000 (e.g. such that a user can generate a subsequent two minute and 30 seconds output file 50 with less than 25 clicks, or less than 100 clicks).

If the output file 50 is approved in Step 5035, Step 5060 is performed. In Step 5060, grid file 130 is saved and/or system 10 produces a final output file 50 as described herein. In some embodiments, grid image 310 is displayed to the user and output file 50 is output to the user, such as played via speaker 155 of user interface 150 of FIG. 1. In some embodiments, output file 50 is added to a digital shopping cart, as described hereabove in reference to FIG. 2. In some embodiments, grid file 130 and/or output file 50 are saved to library 120 and/or added to marketplace 140, as described hereabove in reference to FIG. 1, After Step 5060, process 5000 is exited.

If the user chooses to enter manual mode in Step 5036, Step 5070 is performed. In Step 5070, the generated (e.g. automatically generated) grid image 310 is displayed to the user, such as is described hereabove in reference to FIGS. 2 and 3. The user can manually modify the grid image 310 as described herein, and trigger system 10 to produce a final output file 50 based on both an automatic generation by system 10, and the manual edits made to the grid file 130 by the user. In some embodiments, while editing grid image 310, the user reinitiates process 5000, such as described hereabove, by providing user guidelines and initiating process 5000, from Step 5050. After Step 5070, process 5000 is exited.

Figure 12:
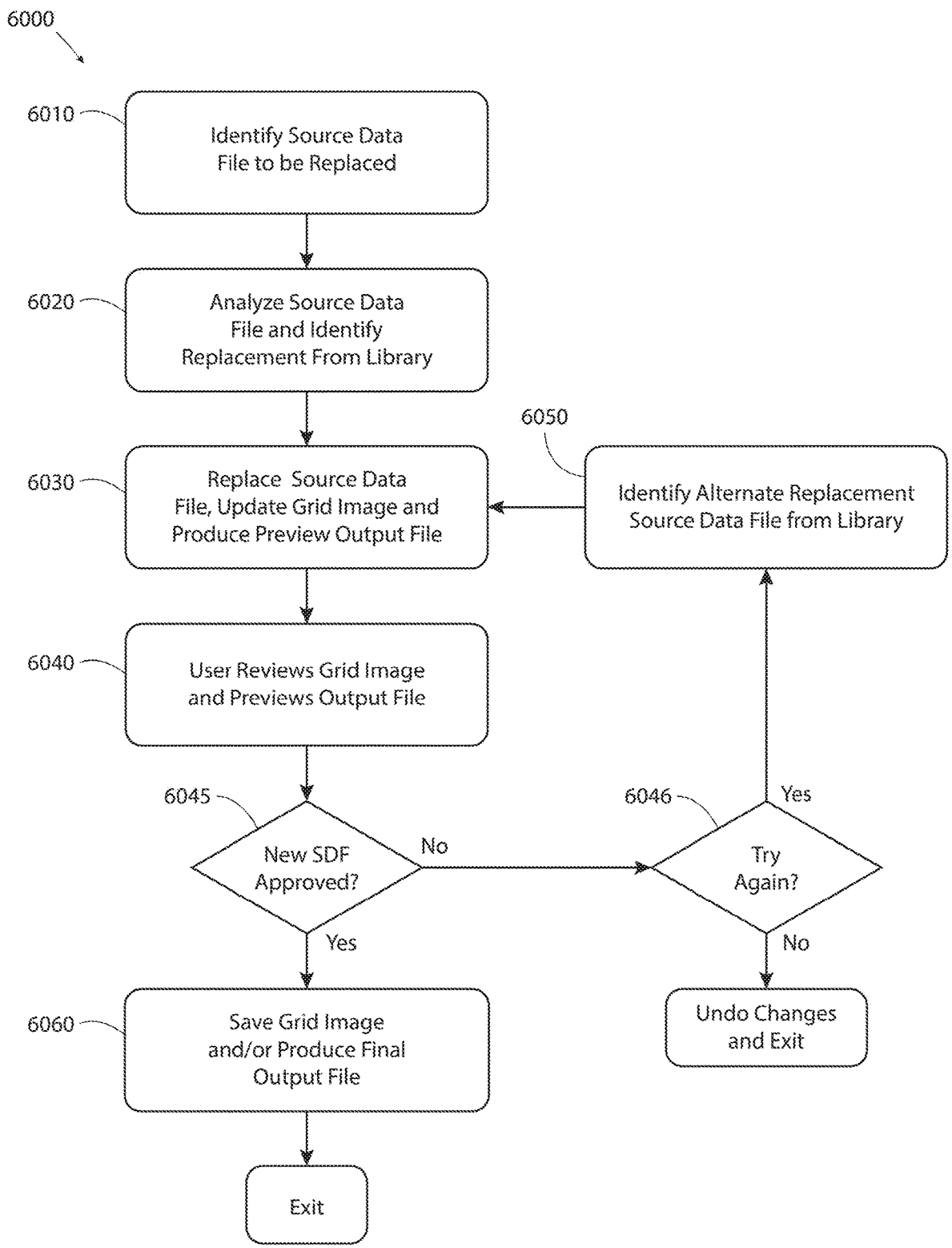
FIG. 12 illustrates a method of replacing a source data file on a grid image, consistent with the present inventive concepts.

Referring now to FIG. 12, a method of replacing a source data file on a grid image is illustrated, consistent with the present inventive concepts. Process 6000 of FIG. 12 can replace (e.g. automatically replace) one, two, or more source data files 350 on a grid image using system 10 as described herein. Process 6000 comprises a series of steps for analyzing and replacing the one, two, or more source data files 350, Automation algorithm $115_{AUTO}$ can be configured to analyze and replace one, two, or more source data files, such as is described herebelow.

In Step 6010, the user identifies one, two, or more source data files 350 associated with grid image 310 to be replaced by process 6000. For example, the user may select a select icon 321 representing a source data file 350, and initiate process 6000 (e.g. by selecting an icon and/or menu item initiating the process). In some embodiments, the user selects multiple select icons 321, such as to automatically replace multiple source data files 350. In some embodiments, process 6000 automatically analyzes and/or replaces some and/or all source data files 350 associated with a grid image 310, such as to upgrade one, two, or more source data files 350, such as is described herebelow.

In Step 6020, system 10 analyzes the selected source data file 350, and identifies a replacement source data file 350 from library 120. System 10 can be configured to identify a replacement source data file based on one, two, or more of the following: user information, for example, user preference data determined using process 7000 of FIG. 13 described herebelow; the popularity of a source data file, for example, a replacement source data file 350 can be identified to be similar but more popular among users of system 10; source data file 350 licensing, for example, if the user pays for a premium license, open license source data files 350 can be replaced with licensed versions or counterparts; the cost of a source data file, for example, the user can choose to replace an economy version of a source data file 350 with an enhanced, "Elite" version; and combinations of these.

In Step 6030, the selected source data file 350 is replaced, grid image 310 is updated, and a preview output file 40 can be generated. In Step 6040, the user reviews the updated grid image 310 and/or preview file 40. In Step 6045, if the replacement source data file 350 is approved by the user, process 6000 proceeds to Step 6060. If the replacement source data file 350 is not approved by the user, process 6000 proceeds to Step 6046. In Step 6046, the user can indicate to system 10 if process 6000 should be repeated, such as to find a different (e.g. preferable) replacement for the selected source data file 350. If the user does not indicate for process 6000 to be repeated, process 6000 is exited, the changes are undone and/or no changes are saved to grid file 130 (e.g. the original source data file 350 remains). If the user indicates for process 6000 to be repeated, process 6000 proceeds to Step 6050.

In Step 6050, system 10 analyzes (e.g. automatically analyzes) the selected source data file 350, as well as any previously suggested replacement source data files 350, and identifies an alternate replacement source data file 350 from library 120. In some embodiments, in Step 6040, the user indicates one, two, or more characteristics the user likes and/or dislikes about the source data file 350 selected to be replaced and/or that was previously suggested and rejected by the user. Following Step 6050, process 6000 proceeds to Step 6030.

If the replacement source data file 350 is approved in Step 6045, process 6000 proceeds to Step 6060. In Step 6060, grid file 130 is saved and/or system 10 produces a final output file 50 as described herein. In some embodiments, grid image 310 is displayed to the user and output file 50 is output to the user, such as an output file 50 played via speaker 155 of user interface 150 of FIG. 1. In some embodiments, output file 50 is added to a digital shopping cart, as described hereabove in reference to FIG. 2. In some embodiments, grid file 130 and/or output file 50 are saved to library 120 and/or added to marketplace 140, as described hereabove in reference to FIG. 1. After Step 6060, process 6000 is exited.

Figure 13:
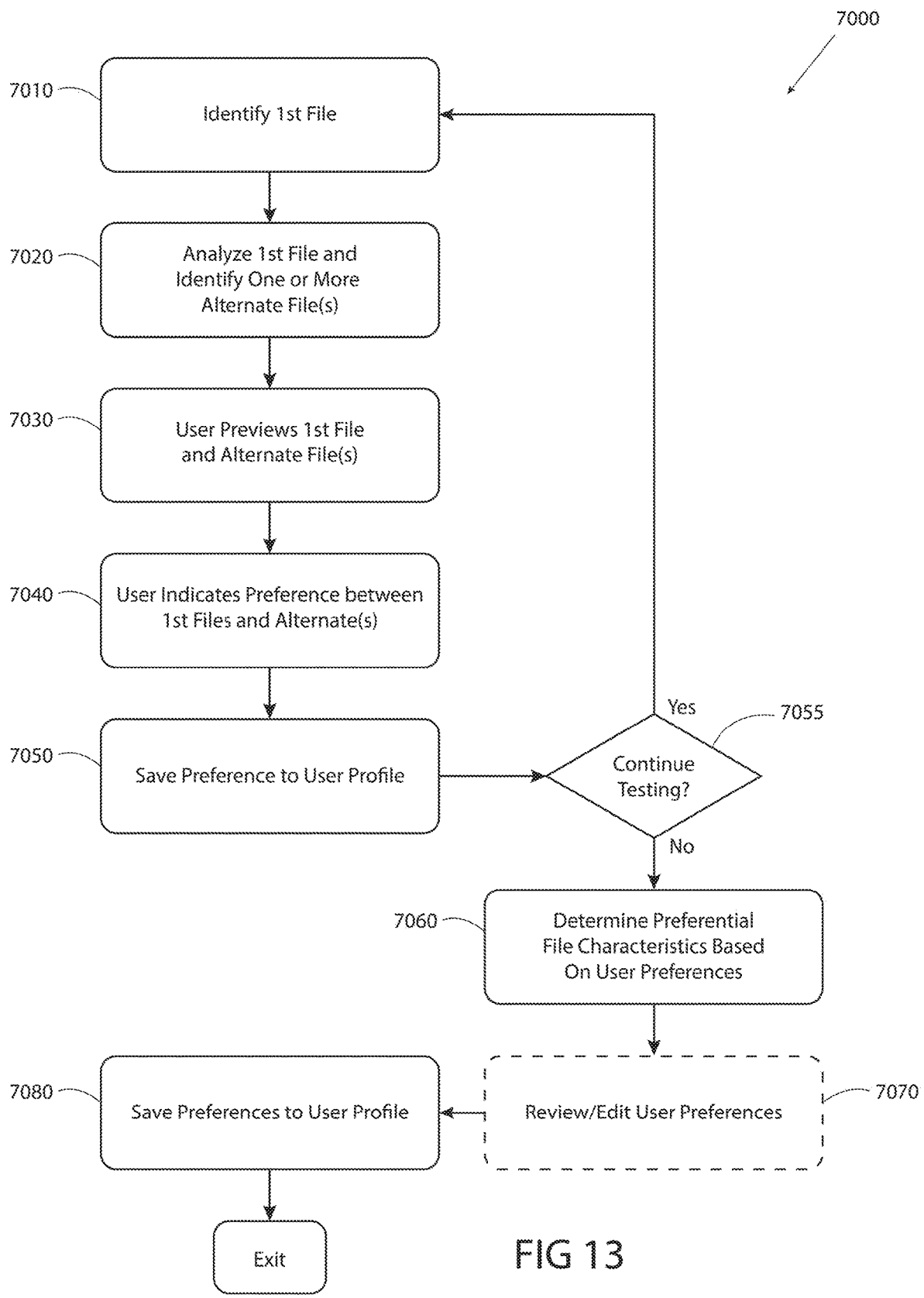
FIG. 13 illustrates a method of performing a user preference analysis, consistent with the present inventive concepts.

Referring now to FIG. 13, a method of performing a user preference analysis is illustrated, consistent with the present inventive concepts. Process 7000 of FIG. 13 can be performed using system 10 described herein. Process 7000 comprises a series of steps for learning (e.g. determining or at least estimating, "determining" or "estimating" herein) one, two, or more preferences of a user, such as by analyzing user input based on a comparison of two or more system 10 outputs. Learning algorithm 115$_L$ can be configured to select system outputs, collect user responses, and/or analyze user responses to create a profile of user preferences, such as is described herebelow.

In Step 7010, a first file (e.g. a source data file 350 and/or an output file 50) is identified for user review by system 10. In Step 7020, system 10 analyzes the first file, and one, two, or more alternate files are identified by system 10 for user review. In some embodiments, Steps 7010 and 7020 have been performed previously (e.g. files have been previously paired, such as is described herebelow), and Step 7010 comprises selecting a pair of files, and proceeds directly to Step 7030. Files for user review can include source data files 350, grid files 130, preview output files 40, final output files 50, and/or other files each comprising one, two, or more unique characteristics. In some embodiments, one, two, or more pairs of files are previously identified for user analysis, such as a set of pairs of files prepared by an administrator of system 10 and/or prepared by learning algorithm 115$_L$ to test a user's preferences based on a particular set of characteristics. For example, a set of pairs of song clips can be previously prepared to determine a user's preference in music based on, for example, genre, lyric content, and/or tempo.

In Step 7030, the user previews the first file and the alternate files. In Step 7040, the user indicates a preference between the first file and the alternate files (e.g. the user indicates a favorite of the file options). In Step 7050, the user preference is saved to the user profile. In Step 7055, if user chooses to continue the testing (e.g. the preference analysis is continued), Steps 7010 through 7050 are repeated, otherwise process 7000 proceeds to Step 7060.

As an illustrative example, an image of a black dog and an image of a white cat can be paired for user comparison. As described herebelow, if the user selects the image of the black dog, learning algorithm 115$_L$ can add to the user profile that the user selected a black dog over a white cat. A subsequent image pair can comprise a white dog and a brown horse. If the user selects the image of the brown horse, learning algorithm 115$_L$ can add to the user profile that the user selected the brown horse over the white dog. As another example, a clip of hip-hop music and a clip of classical music can be paired for user comparison. If the user indicates a preference for the classical music, learning algorithm 115$_L$ can add to the user profile that the user selected a classical clip over a hip-hop clip. One, two, or more pairs of files can be selected based on obvious and/or subtle differences, such that through iterative testing, learning algorithm 115$_L$ can build a preference profile associated with a user (e.g. a profile stored as user data 400). For example, after several iterations, learning algorithm 115$_L$ can determine that the user prefers images of horses over both cats and dogs, and/or that the user prefers the images with the color black, and cares less about the type of animal pictured. In some embodiments, user input and/or the analysis performed by learning algorithm 115$_L$ can be stored as learning data 550 and/or training data 560, such as to later provide input to learning algorithm 115$_L$ in making one, two, or more decisions. In some embodiments, learning algorithm 115L is configured to select one, two, or more pairs of files to be presented to the user, based on previously presented pairs, for example, to resolve any ambiguities present in a previous analysis, for example, a pair of images of white and black horses can be selected, and/or a black horse and a black dog to address this particular scenario of analyzed images. In some embodiments, the user is asked to rate a single file without comparison to an alternative file, for example, a yes or no (binary) comparison, or a rating, such as on a scale from 1 to 10. For audio files, the first file and the alternate file can be played sequentially, such that the user chooses a preference after each file has been played for the user (e.g. to rate files from least desirable to most desirable). In some embodiments, learning algorithm 115, is configured to track if the user is more or less likely to select the first or second audio file played, and to account for that tendency in the analysis of the users preferential file characteristics.

In Step 7060, based on the determined user preferences (e.g. user preferences saved by system 10), learning algorithm 115$_L$ determines preferential file characteristics for the user.

In optional Step 7070, the user can review the user preferences determined by process 7000. In some embodiments, the user modifies one, two, or more of the determined preferences. For example, the user can "overrule" the determination that the user prefers images of dogs over images of cats. In some embodiments, if a user overrules a user preference of learning algorithm 115, that information is saved as learning data 550 and/or training data 560.

In Step 7080, the determined user preferences are saved to the user profile (e.g. saved as user data 400). The user preferences determined by process 7000 can be referenced by system 10, such as by any process, algorithm, and/or routine of system 10, such as process 5000 and/or process 6000, each configured to automatically generate at least a portion of grid file 130. After Step 7080 process 7000 is exited.

Figure 14:
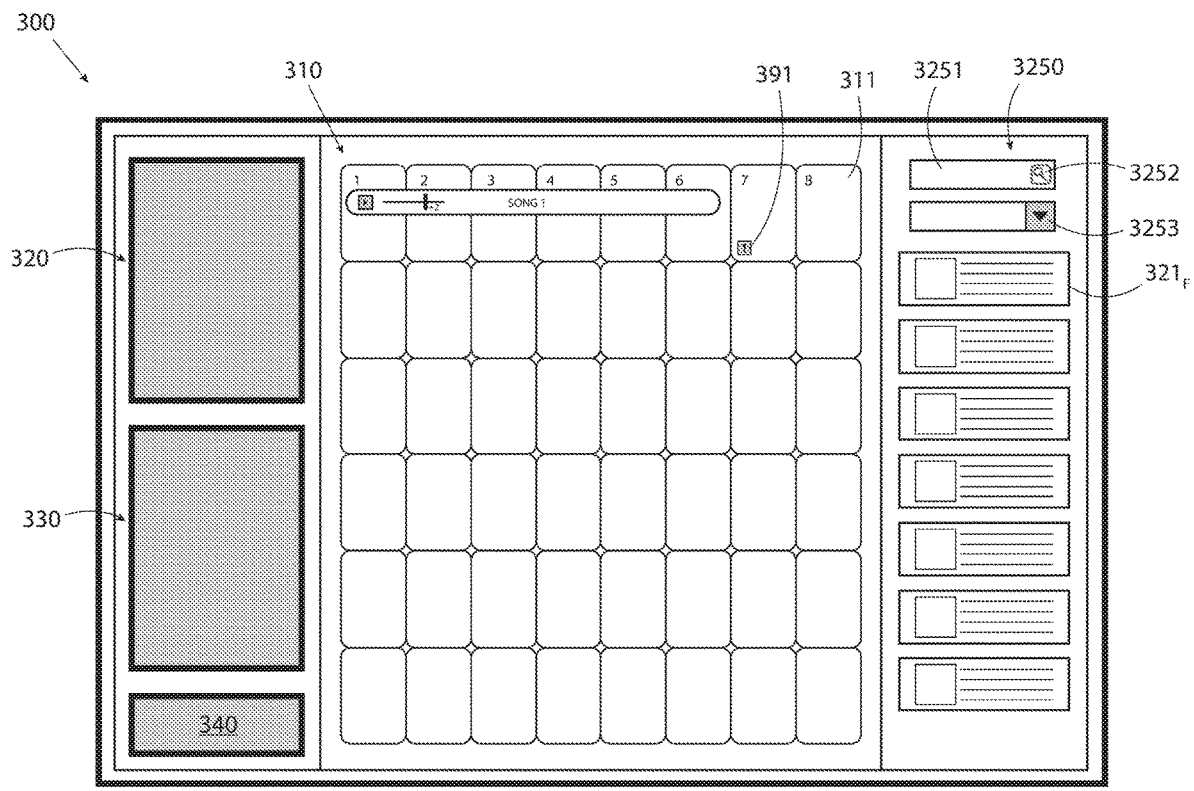
FIG. 14 illustrates a graphical user interface comprising a grid image correlating multiple select icons to multiple cells, consistent with the present inventive concepts.

Referring now to FIG. 14, a graphical user interface comprising a grid image correlating multiple select icons to multiple cells is illustrated, consistent with the present inventive concepts. Processing unit 100 of system 10 can be configured to provide GUI 300 to be displayed on display 160. GUI 300 of FIG. 14 can be of similar construction and arrangement to GUI 300 of FIG. 3 described hereabove. GUI 300 can comprise one, two, or more controls, display areas, and/or other components not shown, but similar to GUI 300 of FIG. 3. In FIG. 14, grid image 310 is shown including a single select icon SONG 1, representing an associated source data file 350. As described herein, GUI 300 enables a user of system 10 to populate grid image 310 with multiple select icons 321, generating a grid file 130. As described herebelow, GUI 300 can comprise one, two, or more controls and/or areas configured to assist the user in generating grid file 130.

GUI 300 can comprise; an area including selectable icons; selection area 320, information display area 330; and/or one, two, or more user selectable controls, controls 340. GUI 300 can further comprise an area for presenting one, two, or more suggestions to the user, suggestion area 3250. Suggestion area 3250 can comprise a search bar 3251, including a search control 3252. Additionally or alternatively, suggestion area 3250 can comprise a filter control, control 3253 (e.g. a control configured to enable a user to apply a filter). Suggestion area 3250 can be configured to provide one, two, or more filtered select icons $321_F$, each representing a source data file 350. Filtered select icons $321_F$ can comprise select icons representing a subset of the source data files 350 of system 10, the subset based on: a search performed by the user using search bar 3251; a filter selected from filter control 3253; and/or one, two, or more algorithmic suggestions presented by system 10, such as suggestions determined by algorithm $115_{AUTO}$ of system 10. In some embodiments, an algorithm 115 of system 10 is configured to perform a validation procedure, such as a validation procedure to verify the selected source data file 350 matches the user's search parameters. For example, algorithm 115 can verify that the source data file 350 contains the searched text, or the lyrics contain the searched text (e.g. as determined by a speech to text conversion of the lyrics of source data file 350).

In some embodiments, selection area 320 and suggestion area 3250 comprise the same area, for example, an area comprising a tabbed interface of multiple stacked areas, allowing the user to select a tab to display selection area 320, and a tab to display suggestion area 3250. In some embodiments, selection area 320 is displayed by default, and replaced (e.g. automatically replaced by system 10) by suggestion area 3250 if a suggestion exists (e.g. algorithm $115_{AUTO}$ has identified one, two, or more suggested source data files 350 for the user). In some embodiments, a suggestion indicator, indicator 391, is displayed relative to a cell 311 when a suggestion is identified by system 10 relative to the cell 311. In some embodiments, when a user selects indicator 391, suggestion area 3250 is displayed, comprising one, two, or more select icons $321_F$ identified by system 10 for the selected indicator.

In some embodiments, filter control 3253 comprises two or more filter controls 3253, such that a user can filter source data files 350 by two or more different filters (e.g. filter for two or more different properties). Filter properties can be selected from the group consisting of: genre; style; popularity; theme; perceived emotion (such as emotional information stored as meta data of a source data file 350); and combinations of these. In some embodiments, when a select icon $321_F$ is selected, info display area 330 displays information (e.g. meta data) related to the associated source data file 350.

In some embodiments, system 10 is configured to analyze grid image 310 as a user modifies the associated grid file 130, such as a modification via automation algorithm $115_{AUTO}$, and to make suggestions "in real time" based on user actions. For example, the user may add a select icon to grid image 310 (e.g. SONG 1 as shown), and after an automatic analysis of grid image 310 including SONG 1, one, two, or more suggestions can be presented to the user by system 10. In some embodiments, indicator 391 is displayed on a cell 311, for example, the last cell 311 associated with SONG 1, or the cell 311 immediately following SONG 1, such as to indicate to the user that system 10 has determined one, two, or more suggested actions. In some embodiments, system 10 does not provide any suggested actions until at least two or more select icons 321 are added to grid image 310. In some embodiments, the location of an indicator 391 indicates to the user the correlation between cell 311 (or cells 311) and a provided suggestion. In some embodiments, suggestion area 3250 displays text and/or other visual suggestions, in addition to and/or instead of suggested select icons $321_F$. Text and/or visual suggestions can comprise suggested instructions to the user to perform an action such as: to add a transition between two select icons 321; to remove excess sound effects; to change one, two, or more repeated source data files 350; and the like. Suggestions displayed in suggestion area 3250 can comprise suggestions related to: what should come next; what source data files work well together; where to add or remove modifiers; and combinations of these.

Suggestion area 3250 can be configured to display both recommended actions to the user, as well as suggested select icons $321_F$. Automation algorithm $115_{AUTO}$ can analyze grid image 310 and determine suggestions using process logic data 500, learning data 550, and/or user data 400, such as described hereabove in reference to FIG. 1. Suggestions made by system 10 can be based on one, two, or more of: meta data of source data files 350; learning data 550, for example, data related to the actions of other users of system 10; user preferences; a filter set by the user, for example, such that all suggestions follow a theme or genre previously selected by the user; and combinations of these. In some embodiments, the user inputs one, two, or more pieces of information related to the intended use of the output file 50 (output file 50 to be generated from the current grid file 130), and one, two, or more suggestions are presented based on the input information. For example, a user can indicate that an output file is intended for a high school cheer routine, and a suggestion could indicate, for example, "most high school cheer routines start with two 8-counts of voice overs". System 10 can be further configured to automatically implement one, two, or more suggestions, such as by methods similar to method 5000 and/or 6000 described hereabove in reference to FIGS. 11 and 12, respectively. In some embodiments, one, two, or more system 10 provided suggestions are based on the lyrics of one, two, or more source data files 350 included in grid image 310 (e.g. suggestions for lyrics or other provided output that creates a smooth transition or a transition that provides a link between source data files 350). For example, if system 10 identifies the need for a transition between a source data file 350 with the lyrics "do you believe in love", and a source data file with the lyrics "one last time", system 10 can suggest a source data file comprising a voice over with the words "you love it every time, believe me we'll blow your mind", Automation algorithm $115_{AUTO}$ can be configured to analyze lyrics and identify potential correlations and/or other transitions between one, two, or more source data files 350.

Figure 15A:
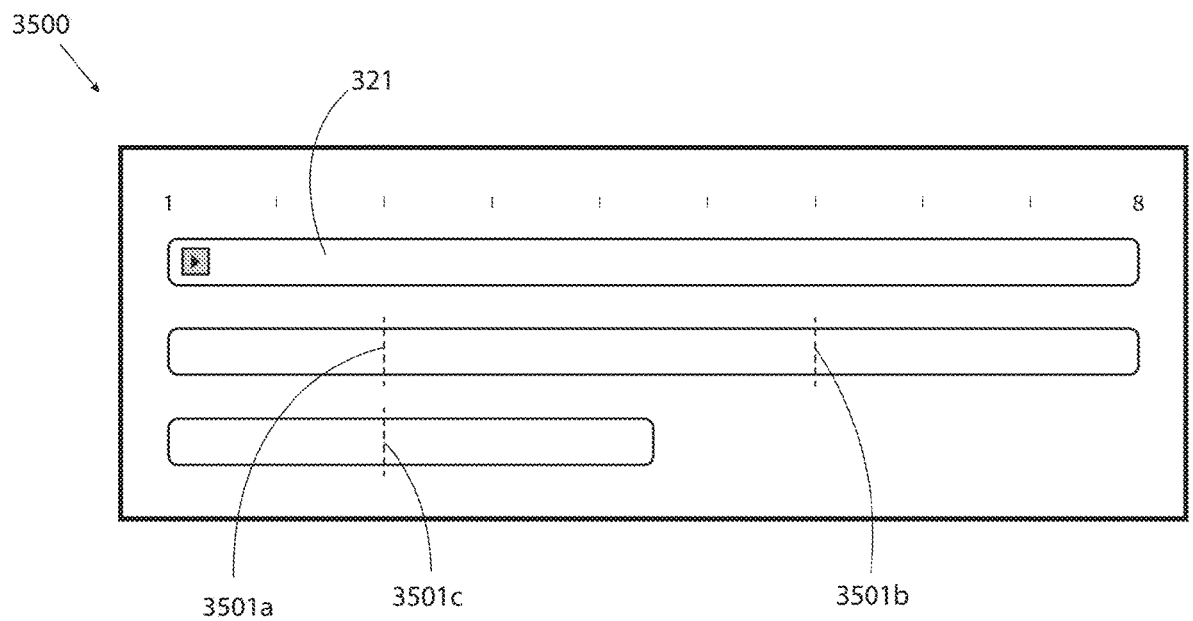
FIGS. 15A and 15B illustrate two portions of a graphical user interface, consistent with the present inventive concepts.
Figure 15B:
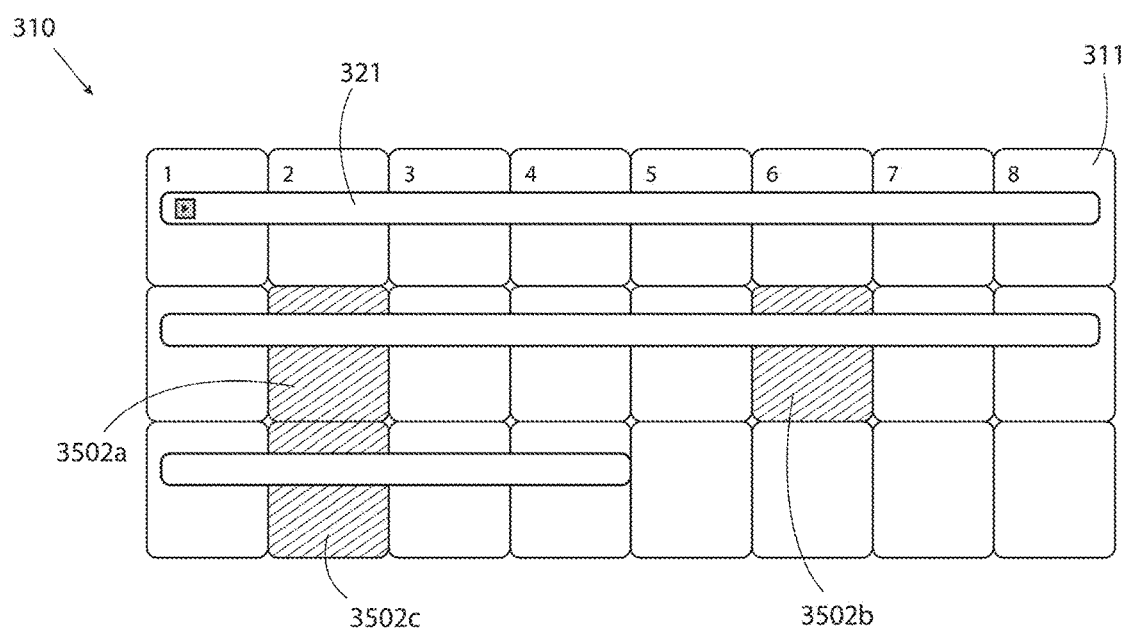

Referring now to FIGS. 15A and 15B, two portions of a graphical user interface are illustrated, consistent with the present inventive concepts. FIG. 15A illustrates an area of GUI 300 of system 10, such as a popup window, window 3500. FIG. 15B illustrates a portion of a grid image 310. System 10 can be configured to allow a user to segment or otherwise break apart a source data file 350, for example, to create a shorter source data file 350 for use in a grid file 130. Window 3500, and/or grid image 310 of FIGS. 15A and 15B, can be displayed to the user (e.g. via display 160) and each can comprise one, two, or more indicators to suggest to the user ideal break points for a selected source data file 350. A select icon 321 is shown rendered within window 3500, and relative to grid image 310. In FIG. 15A, three suggested break points are indicated by markers 3501a-c. In FIG. 15B, the same suggested break points are shown by highlighted cells 3502a-c (of cells 311 of grid image 310). In some embodiments, the user selects a marker 3501 or 3502, and system 10 automatically trims the source data file 350 associated with select icon 321, as well as resizes the select icon 321 to represent the length of the modified source data file 350. In some embodiments, the user is allowed to trim a source data file 350 at any location. Alternatively or additionally, system 10 only allows the user to split source data files 350 at the predetermined locations indicated by markers 3501 or 3502. In some embodiments, the interfaces of FIGS. 15A and 15B are displayed to the user after a user action, such as after the user double clicks on a select icon or otherwise indicates to system 10 the user's desire to trim the associated source data file. Additionally or alternatively, markers 3501 or 3502 can be displayed on any select icon 321, such as whenever a select icon 321 is positioned on a grid image 310, as described herein.

Figure 16:
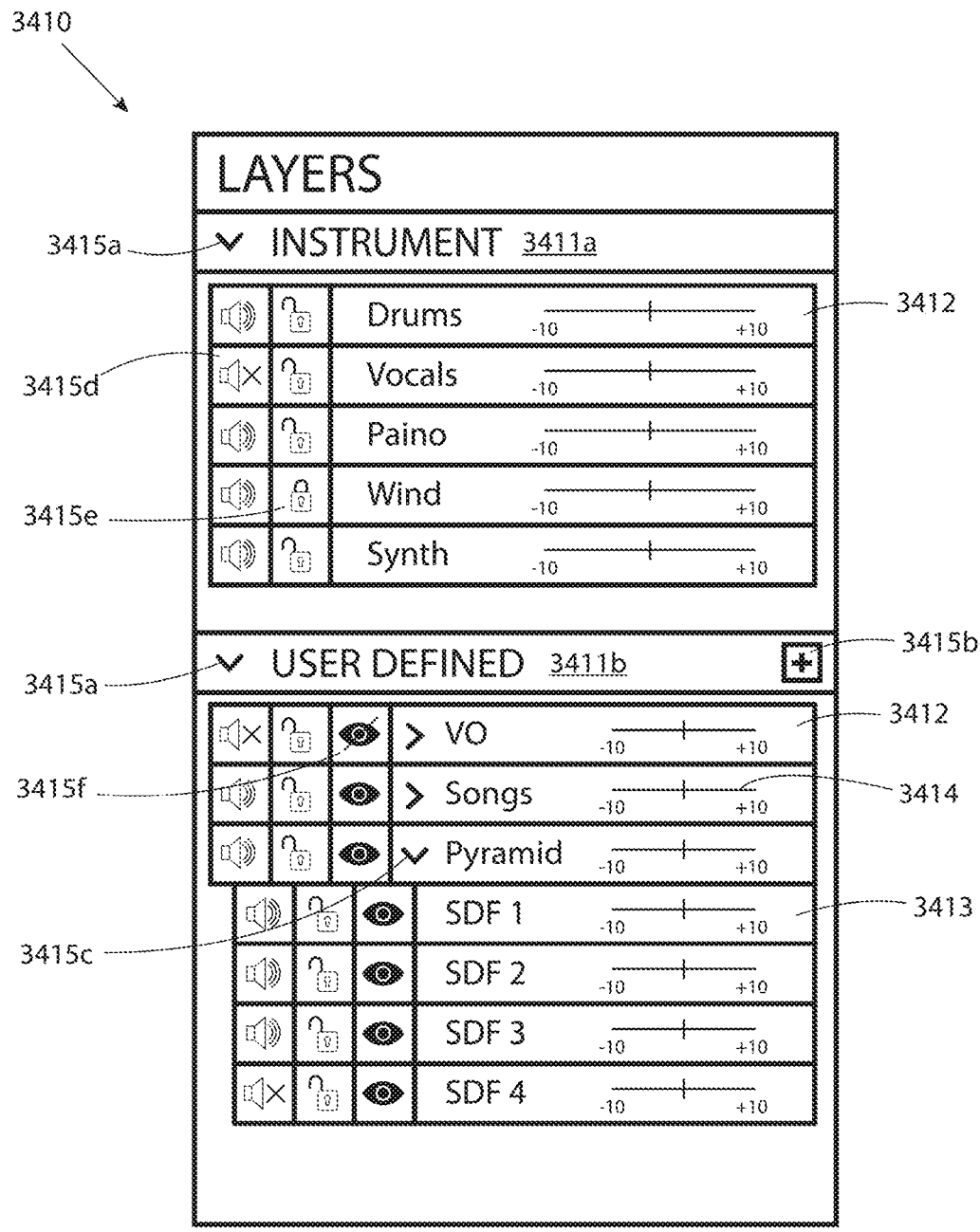
FIG. 16 illustrates a system control interface comprising a layer function, consistent with the present inventive concepts.

Referring now to FIG. 16, a system control interface comprising a layer function is illustrated, consistent with the present inventive concepts. As described hereabove in reference to FIG. 3, system 10 can provide GUI 300, via display 160, comprising one, two, or more system controls (such as system control 340 of FIG. 3) along with grid image 310, such as one, two, or more controls configured to assist a user in modifying grid image 310. FIG. 16 illustrates layer control 3410 (an example of a control 340) which can comprise one, two, or more controls that can be configured to allow a user to set, adjust, modify and/or otherwise control one, two, or more layers of grid image 310. Layer control 3410 can comprise one, two, or more "panels", for example, instrument panel 3411a and user-defined panel 3411b illustrated (singly or collectively panels 3411 herein). Each panel 3411 can comprise a graphical interface containing one, two, or more items associated with the panel, layer boxes 3412. Each layer box 3412 can correlate to a layer of grid file 130. Each layer panel 3411 can comprise a control 3415a configured to expand or collapse the set of layer boxes 3412 associated with panel 3411.

Grid file 130 can comprise system 10 defined layers, such as one, two, or more instrument layers. Instrument layers, and the associated layer controls, can be configured to group portions of the source data files 350 associated with grid image 310. For example, each source data file 350 can comprise multiple "layers of sound", for example, a drum beat, vocals, and/or a piano piece. When a source data file 350 is associated with a grid image 310 (e.g. by an associated select icon 321 being placed on grid image 310), system 10 can identify these layers, and associate the appropriate components with a corresponding instrument layer. In this manner, system 10 can be configured to allow the user to edit, for example, a particular instrument layer (e.g. the drum layer) of some or all source data files 350 associated with a grid image 310, such as is described herebelow. In some embodiments, if a source data file 350 is associated with grid image 310 (for example, during the editing process of grid image 310), and the source data file comprises an instrument layer not currently included in panel 3411a, a new layer box 3412 can be automatically added by system 10.

Additionally or alternatively, grid image 310 can comprise one, two, or more user-defined layers. For example, while editing a grid image 310, the user can assign one, two, or more source data files 350 to a user-defined layer. In some embodiments, user layer panel 3411b comprises a control 3415b configured to generate a new layer. In some embodiments, a user selects a layer prior to adding one, two, or more select icons 321 to grid image 310, and the associated source data file 350 is automatically associated with the selected layer. Additionally or alternatively, the user can assign and/or reassign source data files 350 to layers by one, two, or more methods after the file has been associated with grid image 310, such as via a drag and drop function. Each layer box 3412 of user layer panel 3411b can comprise a control 3415c configured to expand or collapse the set of source data files 350 associated with the layer, each represented by a file box 3413. Each file box 3413 can be associated with a source data file 350, similar to each select icon 321 described herein. In some embodiments, one, two, or more notation select icons 321 (e.g. as described hereabove in reference to FIG. 3) are associated with a layer of layer control 3410.

Each layer box 3412 can comprise one, two, or more controls configured to allow the user to modify one, two, or more properties of the associated source data files 350 and/or layers of the associated source data files 350. Each layer box 3412 can comprise one, two, or more controls, control 3415d, which can be configured to mute (or unmute) the associated layer. In some embodiments, a preview data file 40 is played for the user with one, two, or more layers muted. In some embodiments, prior to a preview data file 40 and/or a final output file 50 being generated by system 10, the user is warned if any layers are muted. Each layer box 3412 can further comprise a control 3415e, which can be configured to lock the associated layer. In some embodiments, a locked layer prevents the user from modifying the properties of that layer and/or the source data files 350 associated with that layer. For example, a locked user layer can prevent the user from modifying the position of the associated select icons 321 relative to grid image 310. In some embodiments, system 10 allows the user to lock a region of grid image 310, such as a region selected by the user and subsequently locked. Each layer box 3412 can further comprise a control 3415f, which can be configured to allow the user to hide one, two, or more select icons 321 on grid image 310. Again, one, two, or more actions of system 10 can be configured to alert the user if one, two, or more layers are hidden. In some embodiments, selecting a layer in layer panel 3410 defines the select icons 321 displayed on grid image 310. For example, the user can select the layer box 3412 for a particular instrument layer (e.g. the piano layer), and only select icons 321 representing source data files 350 containing that particular instrument will be displayed. In some embodiments, layers that are not selected (e.g. actively or passively) are greyed out and/or not editable on grid image 310. Layer control 3410 can be configured to allow the user to select one, two, or more layers simultaneously.

Each layer box 3412 can further comprise a slider control 3414. Slider control 3414 can be configured to adjust one, two, or more properties of the associated source data files 350 relative to the source data files associated with other layers of grid image 310. For example, slider control 3414 can be configured to adjust the volume of a layer, such that a user can increase the relative volume of one, two, or more particular instrument layers (e.g. the drum and vocal layer), and decrease the volume of one, two, or more other particular instrument layers (e.g. the piano layer), while leaving all other layers at a neutral relative volume. Slider control 3414 can be similar to volume control slider 322 described hereabove in reference to FIG. 3. In some embodiments, one, two, or more source data files 350 are associated with more than one layer, for example, an instrument layer and a user-defined layer. In some embodiments, a relative property of a source data file 350 is modified by a layer control of two separate layers. In these embodiments, system 10 is configured to combine the modifications by one, two, or more methods during a mastering process, such as is described hereabove in reference to FIG. 2. In some embodiments, the user defines an order of priority (e.g. importance) to layer controls, for example, such that a source data file whose volume has been lowered as a part of a user layer is not increased by an instrument layer.

Figure 17:
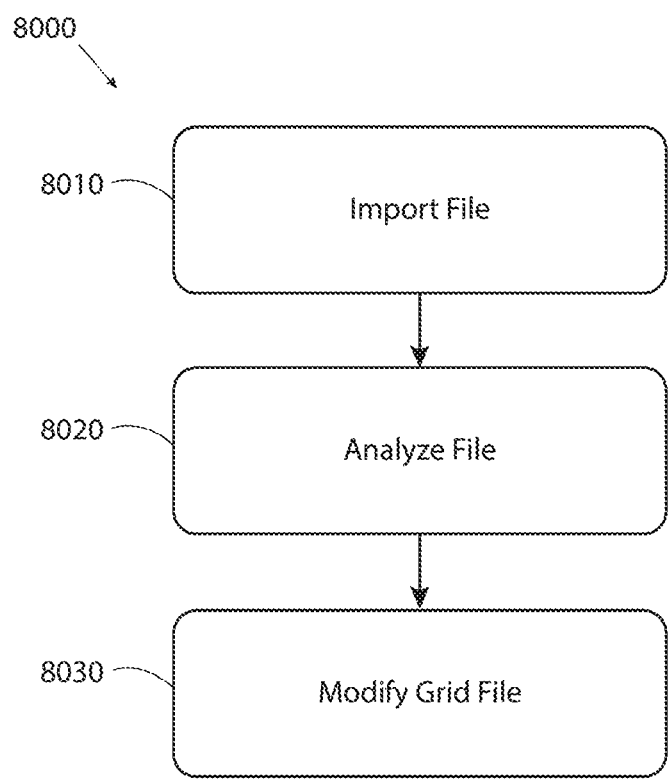
FIG. 17 illustrates a method of modifying a grid file based on an imported file, consistent with the present inventive concepts.

Referring now to FIG. 17, a method of modifying a grid file based on an imported file is illustrated, consistent with the present inventive concepts. Process 8000 of FIG. 17 can be used to import and analyze one, two, or more files and modify a grid image 310 based on the analysis using system 10 as described herein. Process 8000 comprises a series of steps for importing a file to system 10, analyzing the imported file, and modifying a grid image 310. Automation algorithm $115_{AUTO}$ can be configured to analyze the imported file, and to modify the grid image 310 based on the analysis, such as is described herebelow.

In Step 8010, a file is imported into system 10. An imported file can comprise input file 30, such as described hereabove in reference to FIG. 1. In some embodiments, the imported file comprises a text file.

An imported file can comprise a video file, such as a video file comprising a video track and an audio track. In some embodiments, a video file is recorded by system 10 and automatically imported as described herebelow. Alternatively or additionally, a video file can be recorded by a separate device, and the file can be imported to system 10.

In Step 8020, automation algorithm $115_{AUTO}$ analyzes the file. In some embodiments, automation algorithm $115_{AUTO}$ analyzes the input file, and determines a corresponding grid image file 130 to be modified. Alternatively or additionally, the user can indicate which grid image 310 is to be modified based on the input file. In some embodiments, system 10 is configured to generate a new grid image 310 based on the analysis of an input file.

In Step 8030, automation algorithm $115_{AUTO}$ modifies a grid image 310 based on the analysis of the imported file. In some embodiments, one, two, or more of the modifications are presented to the user prior to the modification being made to grid image 310, such that the user can confirm the modification was interpreted as intended by the input file.

In some embodiments, a text-based input file comprises a document created using a "short hand" language, such as a short hand language unique to system 10 and provided to a user. Using a word processor, a user can generate a text file using the short hand language, such that when imported to system 10, automation algorithm $115_{AUTO}$ can decipher the text file, and modify a grid image 310 accordingly. In some embodiments, a short hand language comprises a code structure for adding choreography notes (e.g. one, two, or more notation select icons 321) to a grid image 310. For example, a short hand language can comprise a structure such that grid coordinates are separated by a separator (e.g. a comma), and letters correspond to specific choreography, (e.g. "3.2 C" indicates that on the $2^{nd}$ beat of the $3^{rd}$ 8 count of a grid image 310, a "clap" notation should be inserted). In some embodiments, system 10 comprises a library of choreography notation select icons 130, such as described hereabove in reference to FIG. 1.

In some embodiments, an input file 30 comprises a video input file including video of one, two, or more subjects (e.g. dancers, cheerleaders, and/or other athletes) performing a choreographed routine. For example, an input file 30 can comprise a recording of a performance or competition of a choreographed routine. In some embodiments, the input file 30 includes a video audio track comprises a recording of an output file 50, such as when the subjects were recorded preforming the choreography to the output file 50. In some embodiments, automation algorithm $115_{AUTO}$ is configured to analyze the motion of the subjects, while analyzing the audio corresponding to an output file 50 and modify the grid image 310 associated with the output file 50. In some embodiments, system 10 comprises one, two, or more motion tracking devices, sensor 299, worn by the subjects, such as to assist algorithm $115_{AUTO}$ in the detection of motion of the subjects. In some embodiments, system 10 is configured to play an output file 50, while recording video of one, two, or more subjects performing associated choreography. Algorithm $115_{AUTO}$ can be configured to analyze the recording and assess the choreography. Algorithm $115_{AUTO}$ can be configured to modify grid image 310 based on the analysis of the choreography, and/or to alert the user to any issues or inconsistencies identified between the recorded choreography and the intended choreography (e.g. based on choreography notation of grid image 310) and/or the beat of grid image 310. In some embodiments, system 10 is configured to provide a score to the performance based on this analysis of recorded choreography and intended choreography. In some embodiments, motion tracking devices connect to a user interface (e.g. user input module 200 of FIG. 1) via Bluetooth or other wireless communication. Additionally or alternatively, motion tracking devices can comprise devices configured to be easily identified via motion processing software, such as are used in motion capture cinematography. In some embodiments, a user input module 200 comprises one, two, or more sensors, sensor 299 of system 10, which can be configured to provide information related to one, two, or more parameters, such as pressure, light intensity, temperature, sound, motion, and combinations of these. For example, a performance floor (e.g. stage) can be fit with a sensor 299 comprising an array of sensors that are configured to record the locations and motions of athletes as a routine is performed, and system 10 can be configured to analyze the data recorded by this array of sensors 299 to generate a grid image 310. In some embodiments, motion tracking of automation algorithm $115_{AUTO}$ is configured to identify one, two, or more of the following choreographies (e.g. choreography of a cheerleading routine): jumps; dance; baskets; stunts; transitions; and combinations of these. In some embodiments, identified choreography is correlated to a grid image 310 by analysis of one, two, or more of the following: audio recorded with the performed choreography, such as an output file 50; a visual cue, such as a flashing light strobing at the beat of the choreography; one, two, or more vocal cues identified in the input file, such as a coach or choreographer "counting" the choreography; and combinations of these.

In some embodiments, input file 30 comprises a video file capturing motion of an event selected from the group consisting of: movement of cars along a highway or other road; movement of clouds or other weather-generating objects; motion of a living organism; migration of birds and/or other animals; motion of cells in an assay; and combinations of these. In some embodiments, system 10 is configured to segment an input file 30 (e.g. a video file) into portions, each portion becoming a source data file 350. This segmentation can be performed by a user and/or by algorithm 115. A user can insert one, two, or more source data files 350 (e.g. each representing a portion of an input file 30, or an entire input file 30) into grid image 310, from which an output file 50 can be generated. Algorithm 115 can be configured to perform an analysis of the output file 50. The results of this analysis can be provided to a user as feedback data 590. For example, feedback data 590 provided by algorithm 115 can comprise an analysis of traffic patterns, such as when one, two, or more source data files 350 representing movement of cars along a road are inserted into grid image 310. Feedback data 590 provided by algorithm 115 can comprise an analysis of previous weather patterns and/or a prediction of future weather patterns, such as when one, two, or more source data files 350 representing movement of clouds or other weather-generating objects are inserted into grid image 310. Feedback data 590 provided by algorithm 115 can comprise an analysis of the activity, health, and/or other physiologic parameter of a living organism, such as when one, two, or more source data files 350 representing motion of a living organism are inserted into grid image 310. Feedback data 590 provided by algorithm 115 can comprise an analysis of migration patterns of birds and/or other animals, such as when one, two, or more source data files 350 representing migration of birds and/or other animals are inserted into grid image 310. Feedback data 590 provided by algorithm 115 can comprise an analysis of cell activity, such as when one, two, or more source data files 350 representing motion of cells in an assay are inserted into grid image 310. Alternatively or additionally, algorithm 115 can be configured to perform an analysis of the one, two, or more source data filed 350, prior to insertion into grid image 310.

In some embodiments, an image input file comprises an image scanned or otherwise imported into system 10. In some embodiments, an image input file comprises a scan of a template form, such as a template form provided by system 10, printed by the user, filled out, and imported back into system 10. In some embodiments, the template form comprises a layout configured to be analyzed by system 10, similar to a Scantron test. In some embodiments, automation algorithm $115_{AUTO}$ comprises one, two, or more image processing algorithms configured to analyze an image input file, such as to detect handwriting and/or hand drawn grid images. In some embodiments, system 10 is configured to analyze in image input file comprising a hand drawn (or at least partially hand drawn or filled out) "8 count sheet", and to generate a grid image 310 based at least in part on the analysis of the input file.

Figure 18:
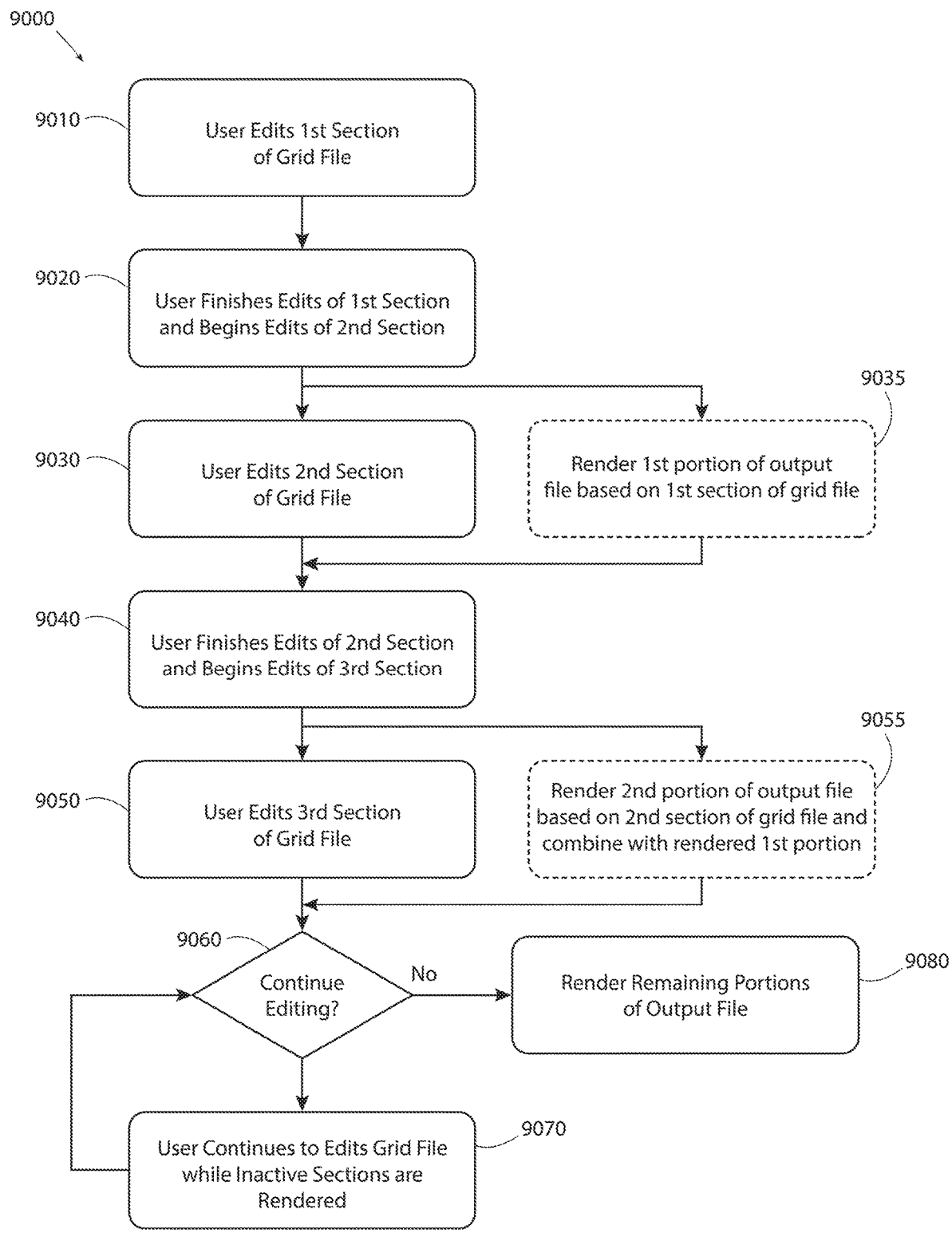
FIG. 18 illustrates a method of rendering an output file simultaneously with a user editing a grid image, consistent with the present inventive concepts.

Referring now to FIG. 18, a method of rendering an output file simultaneously with a user editing a grid image is illustrated, consistent with the present inventive concepts. Process 9000 of FIG. 18 can be accomplished using system 10 described herein. Process 9000 comprises a series of steps for a user editing a grid image 310 while system 10 simultaneously (e.g. concurrently or at least in near real time) renders at least portions of an output file 50 based on the grid image 310 being edited. As used herein, rendering a portion of grid image 310 can comprise rendering the portion of output file 50 associated with that portion of grid image 310. In some embodiments, the rendering of output file 50 is done "in the background", and/or is otherwise performed without user interaction, or specific knowledge of the ongoing processes being performed by system 10.

In Step 9010, the user can begin to edit a first section of a grid image 310. In some embodiments, the user begins to edit a new grid image 310, and the first section comprises the first section of the grid image 310 to be edited. In these embodiments, no associated output file 50 (or portion thereof) yet exists when the user begins editing the first section. Alternatively, the user begins editing a first portion of an existing grid image 310, wherein an associated output file 50 may already exist (e.g. may have already been rendered by system 10 at a previous time and may be stored in library 120). In these embodiments, process 9000 continues primarily as described herebelow in reference to Step 9070. In these embodiments, the first section refers to the first section the user started to edit of the existing grid image 310.

In Step 9020, the user finishes editing the first section of grid image 310, and the user begins to edit a second section of grid image 310. After Step 9020, Steps 9030 and 9035 proceed concurrently. In Step 9030, the user continues to edit the second section of grid image 310. In Step 9035, system 10 concurrently begins to render a portion of output file 50 based on the user generated first section of grid image 310. Rendering of a portion of output file 50 can comprise actions similar to those described hereabove in reference to Step 2600 of FIG. 2.

In Step 9040, the user finishes editing the second section of grid image 310, and the user begins to edit a third section of grid image 310. After Step 9040, Steps 9050 and 9055 proceed concurrently. In Step 9050, the user continues to edit the third section of grid image 310. In Step 9055, system 10 concurrently begins to render a second portion of output file 50 based on the user generated second section of grid image 310. In some embodiments, the second rendered second portion of output file 50 is combined with the rendered first portion of output file 50 (e.g. the first portion rendered in step 9035).

In Step 9060, the user finishes editing the third section of grid image 310, and if the user continues editing the grid image 310 (e.g. a fourth section of grid image 310), process 9000 continues to Step 9070. If the user does not continue editing grid image 310 (e.g. the user is ready to review output file 50), system 10 continues to Step 9080, and system 10 renders any portions of grid image 310 not currently rendered as output file 50. In some embodiments, for example, if the user has edited grid image 310 from "start to finish", system 10 is configured to begin a playback of output file 50 from the beginning, while later sections of grid image 310 are concurrently being rendered, such that those sections are fully rendered by the time the playback of output file 50 plays those sections. In some embodiments, after the user is finished editing grid image 310, system 10 combines any individually rendered portions of grid image 310 to construct a complete output file 50 based on the associated grid image 310.

In Step 9070, process 9000 continues similar to Steps 9020-9050. As the user edits a section of grid image 310, system 10 renders a previously edited portion of the grid image 310. In some embodiments, for example, if the user opens an existing grid image 310 for editing, the first, second, and third sections described herein are not sequential sections in grid image 310. In some embodiments, one, two, or more renderings of portions of grid image 310 are cached in memory of system 10. In some embodiments, system 10 is biased towards combining sequential rendered portions of grid image 310, such as to have a minimum number of rendered portions cached at one time, for example, no more than five individual rendered portions cached for a single grid image 310 at one time. In some embodiments, if the user begins to edit a portion of grid image previously rendered and combined with other renderings, system 10 is configured to break apart the combined rendering, such as to maintain a majority of the rendering.

As an illustrative example, a grid image 310 can comprise eight rows 312, of eight cells 311 each (such as described hereabove in reference to FIG. 3). In some embodiments, system 10 dynamically adjusts the length (e.g. the number of cells 311) or appearance of "sections" of grid image 310 described herein based on one, two, or more of the following: the portions of the grid image that are currently being displayed to the user; the length of one, two, or more source data files 350 associated with the cells 311 of grid image 310; the color of a select icon 321; and combinations of these. In this example, sections are defined by the rows of grid image 310, such that there are eight sections. As the user progresses through grid image 310, and as the user is editing the fifth row, the rows one, two, and three have each been rendered as described hereabove and subsequently combined into a single cached file. Row four is also rendered and cached as a single file. After editing the fifth row, if the user continues to the sixth row, the rendering of row four can be combined with the renderings of rows one, two, and three, and the fifth row can be rendered. Alternatively, the renderings of rows four and five can remain single renderings, depending on the maximum number of individual renderings allowed by system 10. In some embodiments, again as an illustrative example, after the user finishes editing the sixth row, renderings of rows one, two, and three are combined into a single cached file, and renderings of rows four and five can be combined into a single cached file. If the user begins to edit row two, system 10 can discard the combined rendering of rows one, two, and three, such that the three rows are re-rendered after editing of row two. Alternatively, system 10 can be configured to break apart the combined rendering, such that as the user begins to edit row two, renderings of row one, row three, and combined rows four and five exist in the cache. System 10 can be configured to maintain one, two, or more break points within combined renderings, such as to separate the renderings into one, two, or more portions. Combined renderings can comprise, two, three, four, or more levels of combination which can be disassembled and reassembled such that an edit to a small portion of a fully rendered grid image 310 (e.g. a fully rendered final output file 50) only requires the re-rendering of the edited portion to again be fully rendered after completion of the edits.

Figure 19:
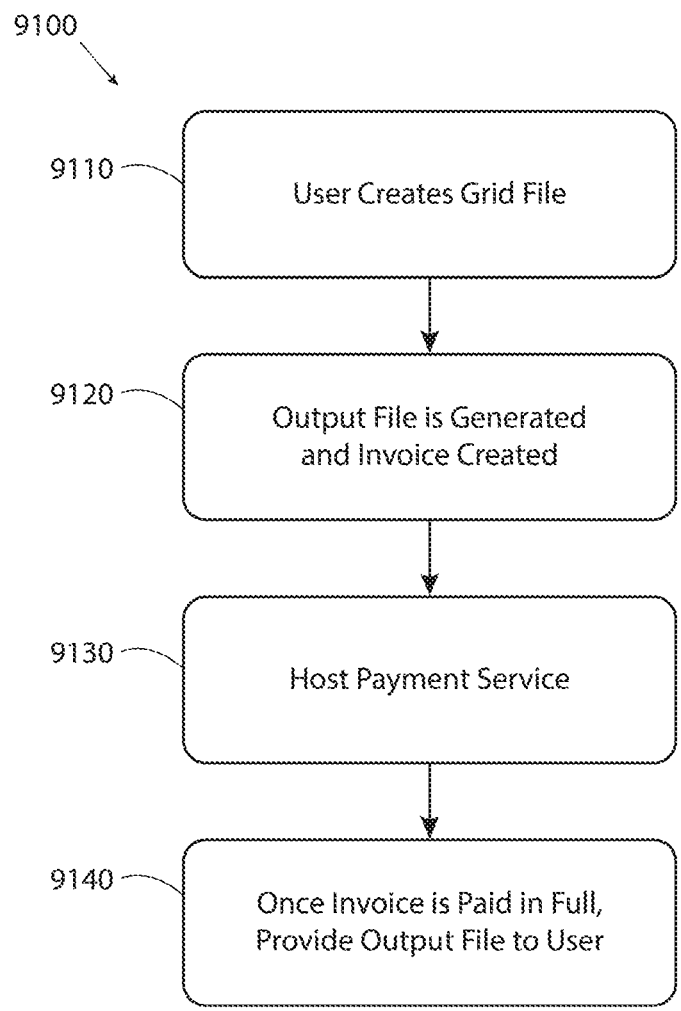
FIG. 19 illustrates a method of financing a purchase through fundraising, consistent with the present inventive concepts.

Referring now to FIG. 19, a method of financing a purchase through fund raising is illustrated, consistent with the present inventive concepts. Process 9100 of FIG. 19 can be accomplished using system 10 described herein. Process 9100 comprises a series of steps for creating an output file 50 and raising funds related to the purchase price of the output file 50, before delivery of the output file 50 to the user.

In Step 9110, the user creates a grid file 130 (e.g. by editing a grid image 310) as described herein. In Step 9120, system 10 generates output file 50 based on the grid file 130 and an invoice to the user is generated. Step 9120 can be similar to Step 2700 of process 2000 described hereabove in reference to FIG. 2.

In Step 9130, system 10 hosts a payment service for one, two, or more users to pay for at least a portion of the invoice generated in Step 9120. In some embodiments, a user, (e.g. the user who generated the grid file 130) advertises the payment service, such as to raise funds for the purchase of output file 50. In some embodiments, system 10 maintains an "order" (e.g. based on the users request to purchase output file 50) as pending while the payment service is active, but the order payment is not yet fulfilled.

In some embodiments, system 10 links with an external payment or fundraising service. For example, the user can create a grid image 310 and select an external fundraising service as a payment option at checkout. System 10 can generate an invoice which is provided to the external service to create and host the fundraising campaign. When the invoice has been paid in full, the external service can transfer the appropriate funds to system 10, and process 9100 continues to Step 9140.

In Step 9140, when the total of the invoice has been paid, output file 50 is provided to the user, such as is described herein. In some embodiments, the payment service comprises a financing service (e.g. a service for providing a loan to the user). In these embodiments, output file 50 can be provided to the user before the invoice is paid in full. In some embodiments, a limited version of output file 50 is provided to the user, such as a version comprising watermarks (e.g. a preview output file 40), or a version with a degraded bitrate and/or other suboptimal characteristics, and the optimal version of final output file 50 is provided upon full payment of the invoice. In some embodiments, the limited version of output file 50 comprises limited or "economy" versions of one, two, or more source data files 350, as described hereabove in reference to FIG. 1. In some embodiments, if an invoice is overpaid (e.g. fundraising activities received more funds than the amount of the original invoice), the additional funds are transferred to the user. Such embodiments enable the user to fund raise for purposes other than the purchase of an output file 50 using method 9100 described herein. Alternatively or additionally, if additional funds are raised, system 10 can offer and/or recommend one, two, or more source data file upgrades, such as from an economy version to an elite version, as described hereabove in reference to FIG. 1. In some embodiments, additional funds can be allocated to a user account, such as to be used in the payment of a future order.

Figure 20A:
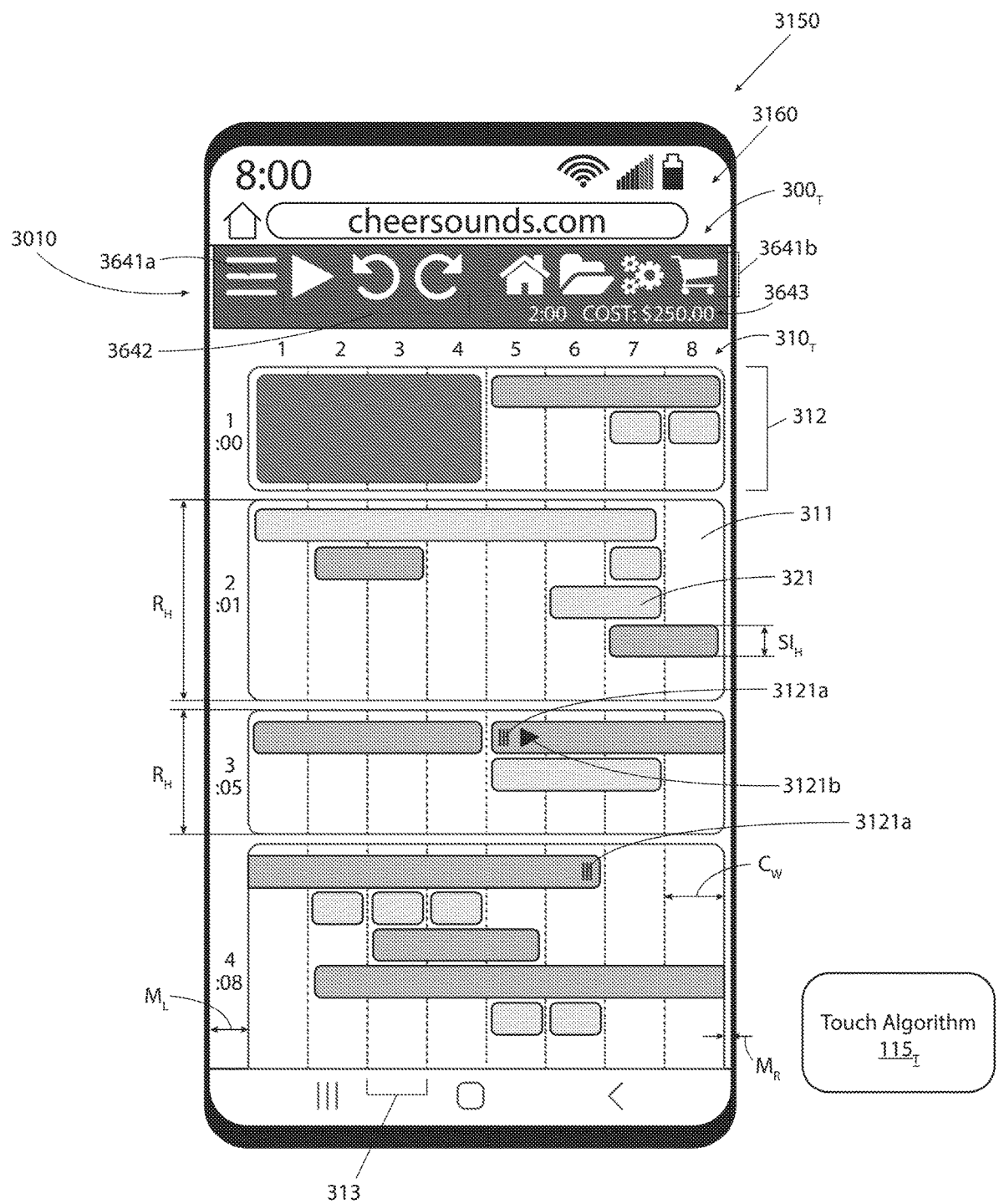
FIG. 20A-F illustrate various embodiments of a graphical user interface displayed on a handheld touchscreen device, consistent with the present inventive concepts.

Referring now to FIGS. 20A-F, various embodiments of a graphical user interface displayed on a handheld touchscreen device are illustrated, consistent with the present inventive concepts. FIG. 20A illustrates a handheld touchscreen device, device 3150. Device 3150 can comprise a device selected from the group consisting of: smart phone or other cell phone; smart watch; tablet; laptop; a device with a touch-controlled user interface; and combinations of these. Device 3150 can comprise a touchscreen display, screen 3160. Device 3150 can comprise a device configured to be held and/or operated with a single hand, such as when device 3150 is configured to be held in the palm of the hand and a finger (e.g. the thumb) is used to interact with screen 3160. Alternatively or additionally, device 3150 can be operated using either or both hands, with any of the thumbs and/or other fingers of the user being used (e.g., individually or in combination) to interact with screen 3160. In some embodiments, device 3150 comprises a stylus configured to engage screen 3160, such as to select and/or modify icons or other graphical elements, enter (written text), and/or otherwise provide input to device 3150, such as a stylus that is operated by a hand of a user and/or the mouth of a user (e.g. when the user is a quadriplegic or otherwise has limited motion of a hand). Processing unit 100, as described herein, can provide a touch optimized graphical interface. GUI 300$_T$.

GUI 300$_T$ can comprise a header area 3010, comprising one, two, or more controls and/or information display areas. Header area 3010 can comprise one, two, or more menu controls, such as menu control 3641a and menu control 3641b shown. Header area 3010 can further comprise one, two, or more additional controls, controls 3642 shown. Controls 3642 can comprise one, two, or more controls selected from the group consisting of: a play control; a pause control; a redo control; an undo control; a save control; a macro control (e.g. a control that performs two or more user-defined and/or system-defined actions in a single click); and combinations of these. Menu control 3641a can be configured to trigger the display of an overlay menu, such as overlay menu 3600 described herein in reference to FIG. 20B. Menu control 3641b can comprise one, two, or more controls configured to trigger one, two, or more menus, for example, a home menu, a file directory menu, a shopping cart, and/or a settings menu, such as popup menu 3700 described herein in reference to FIG. 20D. Header area 3010 can also comprise an information display area, area 3643, Area 3643 can display information relating to the current grid image 310 and/or a selected select icon 321, for example, the cost to purchase the current grid image 310 and/or the duration of the current grid image 310. Additionally or alternatively, area 3643 can also display the status of a process of system 10, such as the progress of a pending process (e.g. file save state or progress), data related to a current process (e.g. positional information during a drag operation), and/or last operation performed.

GUI $300_T$ can comprise touch optimized grid image $310_T$, comprising multiple rows 312 and columns 313 of cells 311, similar to grid image 310 described herein. Grid image $310_T$ can comprise one, two, or more indicators, for example, numerical indicators identifying the column, the row, and/or the time index of the first cell of a row 312, as shown and/or a range of time indexes spanning the first cell 311 to the last cell 311 of each row 312 (e.g. :01-:04). As described herein, one, two, or more select icons 321 can be placed relative to grid image $310_T$. Also as described herein, one, two, or more of the dimensions of the elements of GUI $300_T$ can be selected to optimize touch interaction with GUI $300_T$ (e.g. the size, placement, and/or orientation of one, two, or more elements of GUI $300_T$ can be selected to increase the ease of use of system 10 with a touch screen device, instead of a hardware based interface, for example, a mouse and keyboard). In some embodiments, one, two, or more of the optimized dimensions described herein can comprise minimum dimensions, for example, a minimum dimension of an element which is selectable by the user's finger. In some embodiments, GUI $300_T$ is configured to adapt to multiple devices 3150, each of which can comprise different sizes and/or resolutions. GUI $300_T$ can be configured to scale to fit various device 3150 configurations, while maintaining one, two, or more minimum dimensions described herein. In some embodiments, system 10 is configured to determine the pixel width and/or pixel height of an element of GUI $300_T$ based on the resolution and pixel density of screen 3160 and the desired physical dimension of the element. As described herein, the dimensions of elements of GUI $300_T$ are described in millimeters, which correlate to a certain number of pixels displayed on a screen 3160 with a certain resolution (pixels per millimeter). In some embodiments, system 10 provides GUI $300_T$ at a first resolution to device 3100, and device 3100 comprises additional software and/or hardware to enhance and/or downgrade the resolution of GUI $300_T$ to a second, different resolution (e.g. a different resolution which matches the resolution of screen 3160).

Each cell 311 comprises a width, width $C_W$. Width $C_W$ can comprise a width of at least 5 mm, such as at least 10 mm. In some embodiments, grid image $310_T$ is positioned off center within GUI $300_T$. Grid image $310_T$ can be placed at a first margin distance, distance $M_L$, from the left edge of GUI $300_T$, and a second margin distance, distance $M_R$, from the right edge of GUI $300_T$. In some embodiments, distance $M_L$ is greater than distance $M_R$, for example, distance $M_L$ is at least 10%, at least 20%, or at least 30% greater than distance $M_R$, such that grid image $310_T$ is positioned towards the right side of GUI $300_T$. In some embodiments, grid image $310_T$ is positioned off center to better accommodate a left handed and/or a right-handed user. For example, for a right-handed user, grid image $310_T$ can be positioned closer to the right side of GUI $300_T$, or closer to the left side of GUI $300_T$ for a left-handed user. In some embodiments, the position of grid image $310_T$ relative to GUI $300_T$ is user adjustable, for example, based on the dominant hand of the user. In some embodiments, GUI 300T is configured for use in landscape mode (e.g. where the user holds device 3100 with two hands, using the left and right thumb to interact with screen 3160). One or more controls of GUI $300_T$ can be positioned away from the vertical center of GUI $300_T$ (e.g. closer to the edges of GUI $300_T$ than the middle of GUI $300_T$) such as to provide enhanced user interaction with the one or more controls. In some embodiments, GUI $300_T$ is configured to automatically switch between a portrait mode and a landscape mode based on the orientation of device 3100 (e.g. based on accelerometer or other data).

Each row 312 comprises a height, height $R_H$. Each select icon 321 comprises a height, height $SI_H$, when displayed on grid image $310_T$. In some embodiments, height $R_H$ comprises a minimum height of at least three times height $SI_H$ (e.g. the height of three select icons 321 stacked vertically). In some embodiments, height $R_H$ comprises a minimum height of at least three times height $SI_H$, plus a padding distance between each select icon 321. In some embodiments, a padding distance comprises a distance of at least 1 pixel, such as at least 3 pixels, such as at least 5 pixels. In some embodiments, a padding distance comprises a distance of at least 1 mm, such as at least 2 mm. In some embodiments, height $R_H$ is adjusted based on the number of select icons 321 associated with the most populated cell 311 in the respective row 312. As an illustrative example, the second row 312 shown comprises a height $R_H$ of five times height $SI_H$, plus padding, as the seventh cell 311 of the second row 312 comprises four select icons 321. In some embodiments, grid image $310_T$ is configured such that each cell 311 comprises an area that is at least the width $C_W$ and at least the height $SI_H$ where no select icon 321 is positioned ("white space" herein). In some embodiments, certain "press", "press and hold", and/or "press and drag" actions (as described herein) are configured to trigger events relative to the selected cell 311, such as when the action is done within the white space of the cell 311.

Algorithm 115 described herein can comprise touch algorithm $115_T$. Touch algorithm $115_T$ can monitor screen 3160 touch input information (e.g. user finger screen 3160 contact information such as where on the screen, how long on the screen, and/or any movement of the user's finger while touching the screen), and determines what, if any, associated actions should be performed. In some embodiments, touch algorithm $115_T$ is configured to identify one, two, or more of the following user actions: a single touch; an extended touch and hold; a touch and drag (e.g. to perform a drag and drop operation); a touch and scroll (e.g. to scroll grid image $310_T$ vertically on display 3160); a light touch versus a heavy touch (e.g. via a touch pressure measurement); a single finger touch versus a multiple finger touch; a first finger versus a second finger (e.g. as determined by the associated fingerprints of a single user or multiple users); and combinations of these. In some embodiments, a single user's fingerprints are used to differentiate a first function associated with a first finger, a second function associated with a second, different finger, and so on.

Figure 20B:
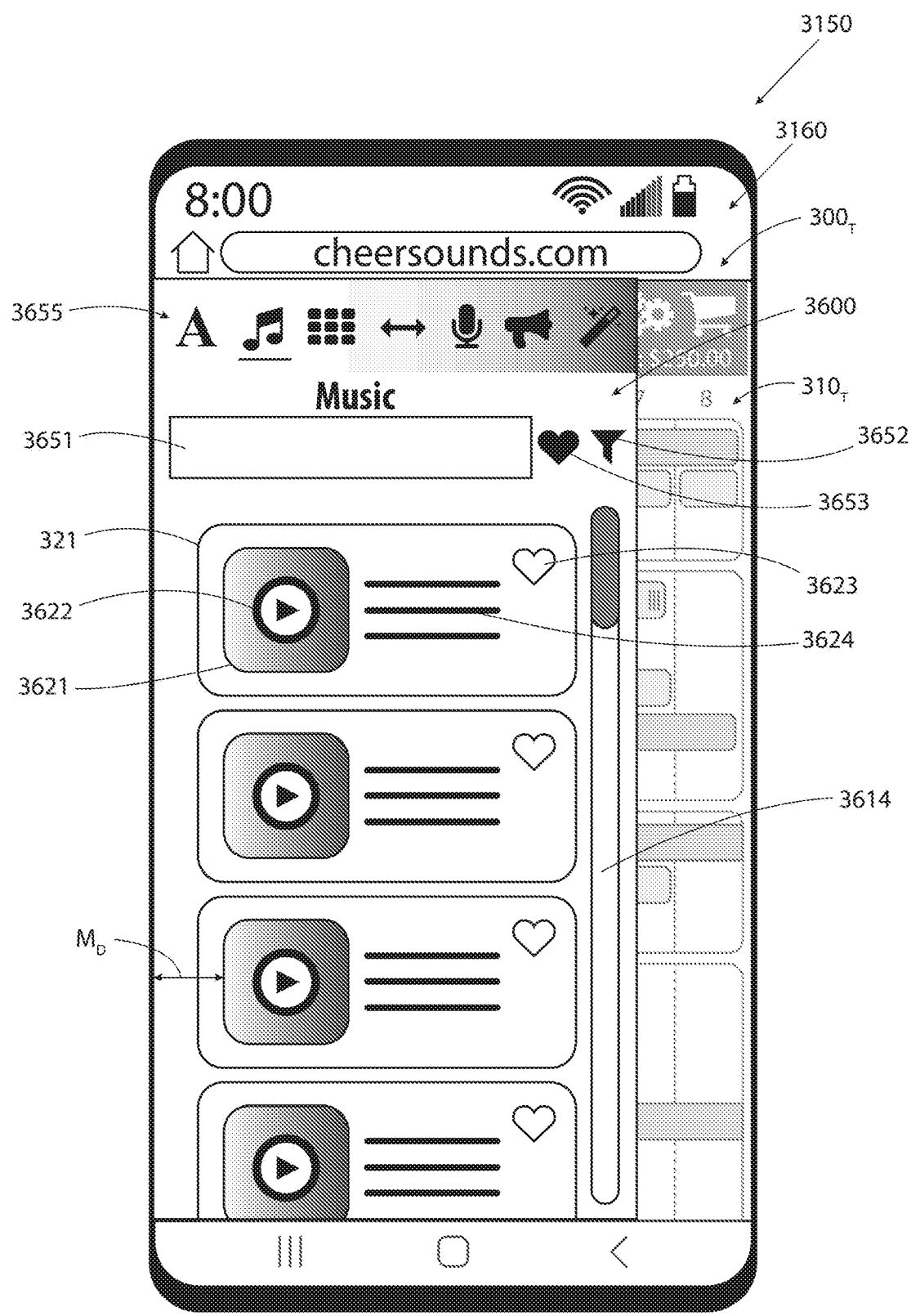

In some embodiments, algorithm $115_T$ is configured to determine the difference between an intended "touch and scroll" input and an intended "touch and drag" input. In some embodiments, certain areas of GUI $300_T$ only allow one or the other, for example, if the user presses white space within a cell 311, algorithm $115_T$ only allows a scrolling function in response to movement of the pressed finger (e.g. the drag and drop function is disabled if the initial touch placement is within the white space of a cell 311). Additionally or alternatively, separate areas of an element, for example, a select icon 321, can enable different user actions. For example, FIG. 20B illustrates a list of select icons 321. If an initial touch is detected on the right portion (e.g. the right half) of a select icon 321, subsequent movement can cause the list of select icons to scroll. If an initial touch is detected on the left portion (e.g. the left half) of a select icon 321, subsequent movement can trigger a drag and drop function (e.g. such that the user can drag the select icon 321 for placement on grid image $310_T$). In some embodiments, the ratio of the size of the right portion (e.g. the scroll area) to the left portion (e.g. the drag area) of select icon 321 is at least 1:1, such as at least 2:1, such as at least 3:1, such as at least 4:1, such as at least 5:1 (e.g. the width of the scroll area is at least five times the width of the drag area).

In some embodiments, algorithm $115_T$ is configured to differentiate between a touch and scroll input and a touch and drag input based on the direction of movement of the users finger after the initial touch is detected, Additionally or alternatively, algorithm $115_T$ can be configured to only detect a scroll and/or a drag input if the user's finger moves more than a threshold distance while touching the surface of screen 3160. In some embodiments, algorithm $115_T$ requires a threshold of movement of at least 1 mm, such as at least 1.5 mm, in any direction to recognize a scroll and/or a drag input. In some embodiments, if the initial direction of movement after a touch comprises a greater x-direction component than a y-direction component, a drag input can be determined, and if the y-direction component s larger than the x-direction component, a scroll input can be determined.

In some embodiments, algorithm $115_T$ is configured to differentiate between a tap, an extended touch and hold, and/or a touch and move (e.g. drag or scroll) based on the duration of time that the user places their finger on screen 3160. In some embodiments, if the user touches and holds for a duration above a threshold of time, a touch and hold action can be determined. In some embodiments, the touch and hold threshold comprises a threshold of at least 200 ms, at least 400 ms, at least 1000 ms, or at least 1500 ms. In some embodiments, after a touch and hold input is detected, the mode of one, two, or more elements of grid image $310_T$ changes. For example, if the user performs a touch and hold input while selecting a select icon 321, the select icon 321 can enter a reposition mode, such as described herein and illustrated in reference to FIG. 20O. Alternatively, if the user touches the same location immediately (e.g. less than the threshold time), and begin to move their finger (or other screen-touching element) vertically, grid image $310_T$ can be configured to scroll.

In some embodiments, each select icon 321 displayed on grid image $310_T$ includes one, two, or more controls, controls 3121, configured to provide an enhanced user interaction with the associated select icon 321. Controls 3121 can comprise handle controls, handles 3121a. Handle controls 3121a can be positioned proximate the left edge and/or the right edge of a select icon 321. Handle controls 3121a can provide a discrete location within select icon 321 for the user to select, such as to perform one, two, or more actions, such as moving and/or resizing the select icon 321, as described herein, Controls 3121 can further comprise one, two, or more player controls, such as play control 3121b shown, which can be configured similar to play button 341 described herein. In some embodiments, one, two, or more of controls 3121 are removed from (e.g. not displayed on) select icon 321, such a removal based on the duration of the select icon 321 described herein. In some embodiments, one, two, or more of the actions enabled by controls 3121 are accessed via a menu, such as pop-up menu 3800 described herein in reference to FIG. 20E. In some embodiments, if a select icon 321 comprises a length of less than or equal to a first threshold number of cells 311 (e.g. a threshold of five, four, or three cells 311), no controls 3121 are displayed on the select icon 321. Additionally or alternatively, if a select icon 321 comprises a length of less than or equal to a second, larger threshold number of cells 311 (e.g. a threshold of seven, or six cells 311), and greater than the first, lower threshold, only play control 3121b is displayed on select icon 321.

In some embodiments, one, two, or more controls and/or other elements displayed on GUI $300_T$ comprise a "bounding area" extending beyond the graphical representation of the control. Algorithm $115_T$ can be configured to include this bounding area when determining if the user selects a control. For example, if handle control 3121a is displayed with a width of 10 mm, a bounding area of at least 1 mm surrounding the control can be considered when determining if the user is selecting the control (e.g. touching screen 3160 proximate the control). In some embodiments, the bounding areas of two or more neighboring controls partially overlap, and algorithm 1151 can be configured to determine which control is being selected based on the percentage of the icon and bounding area being touched (e.g. the control with a greater percentage of its area being touched is assumed to be being selected).

As shown in FIG. 20B, GUI 3001 can comprise a menu 3600 for selecting a source data file 350 (represented by select icons 321) to add to grid image $310_T$, Menu 3600 can be displayed when menu control 3641a is selected by the user. Menu 3600 can comprise a hidden menu, which can appear from an edge of GUI $300_T$, for example, appearing from the left edge of GUI $300_T$ (e.g. when menu control 3641a is selected) and covering at least a portion of grid image $310_T$. In some embodiments, at least a portion of grid image $310_T$ remains visible while menu 3600 is displayed, such that the user can select (e.g. touch) the visible portion of grid image $310_T$ to automatically close menu 3600. Menu 3600 can comprise a category selection area, area 3655, comprising one, two, or more controls configured to allow the user to filter the select icons 321 displayed in menu 3600 by category. Menu 3600 can further comprise a search bar 3651, configured to allow a user to search for a particular select icon 321. Menu 3600 can further comprise a "favorites" filter control, favorites control 3653, configured to allow the user to filter for select icons which have been "favorited" by the user (e.g. previously favorited by the user). Menu 3600 can further comprise a filter toggle control, toggle 3652, configured to allow the user to toggle between filtered subsets of available select icons 321 and larger sets of available select icons 321 (e.g. all available select icons 321). Menu 3600 can further comprise a scroll bar 3614, configured to allow the user to scroll through the displayed select icons 321.

As displayed in menu 3600, each select icon 321 can comprise an image area 3621, a play control 3622, an information display area 3624, and/or a favorite control 3623. Image area 3621 can comprise a thumbnail image representing and/or correlating to the represented source data file 350, for example, an image of an album cover. Play control 3622 can be configured to allow the user to preview the source data file 350, with or without closing menu 3600. Information display area 3624 can comprise an area where text is displayed relating to the represented source data file 350. Favorite control 3621 can enable the user to flag a select icon 321 as a favorite, such that the favorited select icon 321 is included when favorites control 3653 is selected. In some embodiments, such as is described herein, information display area 3624 only enables touch and scroll type input from the user, such that when the user touches a select icon 321 proximate display area 3624, any movement in the touch causes menu 3600 to scroll (e.g. scroll vertically) through the listed select icons 321. Additionally or alternatively, image area 3621 only enables touch and drag type input from the user, such that in order to add a select icon 321 to grid image 310$_T$, the user must touch and hold proximate the image area 3621, and drag the select icon 321 to grid image 310$_T$. In some embodiments, image area 3621 is positioned at least a margin distance, distance MD, from the edge of GUI 300$_T$, for example, such that a user can select image area 3621 using the thumb while holding the phone in the palm of the hand. In some embodiments, distance $M_D$ comprises a distance at least 5% of the width of GUI 300$_T$, such as at least 10%, or at least 15%.

In some embodiments, when a select icon 321 is selected by the user (e.g. by touching and dragging as described herein), menu 3600 is automatically hidden, thereby revealing grid image 310$_T$. In some embodiments, system 10 and/or GUI 300$_T$ are configured such that a user can select and add a select icon 321 to grid image 310$_T$ with as few as two touch actions (e.g. a first touch action of selecting menu control 3641$a$, and a second touch action of touching and dragging a select icon 321 to grid image 310$_T$, with menu 3600 automatically being removed to display grid image 310$_T$).

Figure 20C:
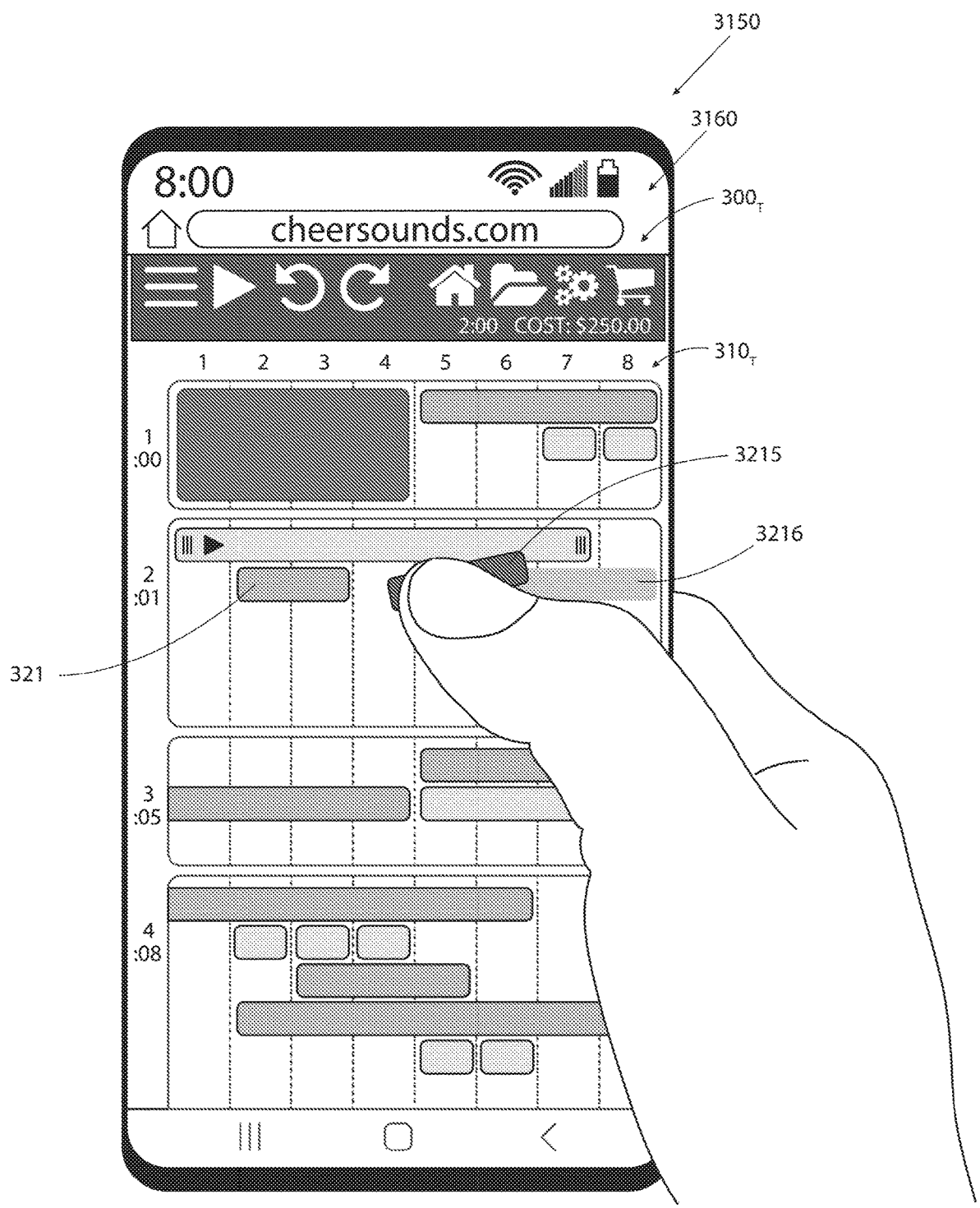

GUI 300$_T$ can be configured to allow a user to position and/or reposition select icons 321 relative to grid image 310$_T$ by performing touch and drag operations. As shown in FIG. 20C, while performing a drag operation, a temporary icon 3215 can be displayed relative to the location where the users finger is in contact with on screen 3160. As the user moves their finger (e.g. without lifting), temporary icon 3215 moves simultaneously. Additionally or alternatively, a shadow icon 3216 can be displayed, indicating where the selected select icon 321 would be placed on grid image 310$_T$ if the user were to remove (e.g. lift) their finger from screen 3160. In some embodiments, as the drag operation is carried out, grid image 310$_T$ dynamically updates the layout of the associated select icons 321 and/or the size of cells 311 to represent the layout based on where the selected select icon 321 would be placed relative to grid image 310$_T$ if the user removes their finger from screen 3160 (e.g. "drops" the select icon 321 being "dragged"). Alternatively or additionally, GUI 300$_T$ displays the select icon 321 during the drag operation (e.g. renders a more detailed icon than shadow icon 3216). In some embodiments, temporary icon 3215 is offset from the location where the user is touching screen 3160, and/or displayed askew, as shown, such as to avoid any obstruction from view by the users finger. In some embodiments, if a select icon comprises a width below a threshold, such as a width less than the width of two cells 311, shadow icon 3216 and/or temporary icon 3215 can comprise a width larger than the width of the select icon 311, for example, at least the width of two cells 311. In some embodiments, when the user drags the select icon near the top and/or the bottom of GUI 300$_T$, if the bottom and/or the top of grid image 310$_T$ is not displayed, respectively, GUI 300$_T$ is configured to automatically scroll grid image 310$_T$ such that previous and/or subsequent rows 312, respectively, are displayed, and such that the user can navigate to a row 312 which is not displayed when the drag operation is initiated during the drag operation.

Figure 20D:
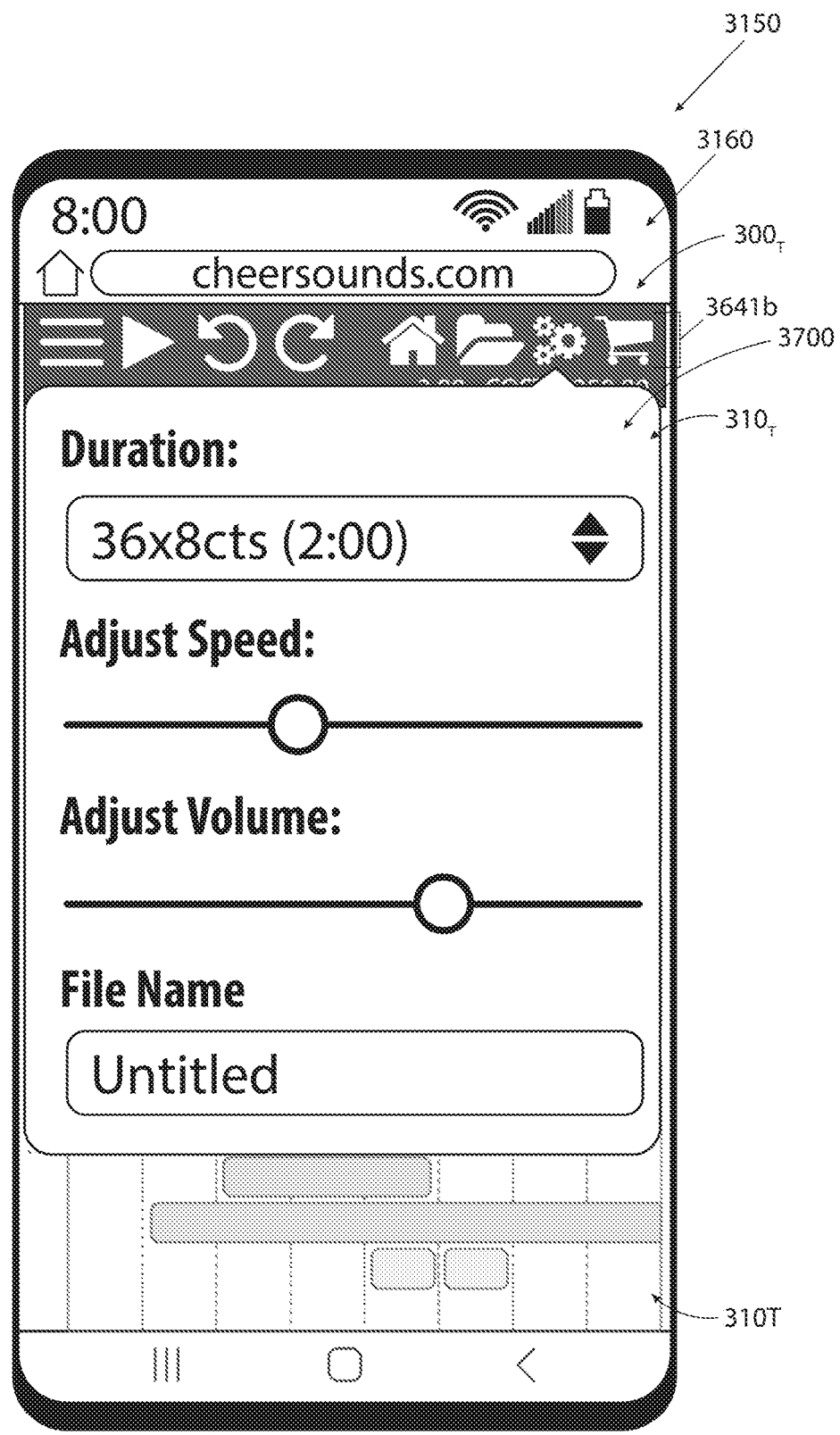

GUI 300$_T$ can be configured to display a pop-up menu 3700, such as is illustrated in FIG. 20D. Pop-up menu 3700 can be configured to be displayed when a menu control 3641$b$ is selected by the user. Pop-up menu 3700 can comprise one, two, or more controls configured to allow the user to modify a parameter of a select icon 321, grid image 310$_T$, and/or another property of GUI 300$_T$ and/or system 10, as described herein. In some embodiments, pop-up menu 3700 is configured to automatically close when the user touches a location on screen 3610 not included within menu 3700, for example, in the example illustrated in FIG. 20D, when the user touches the area below menu 3700 (e.g. touches grid image 310$_T$ displayed behind menu 3700).

Figure 20E:
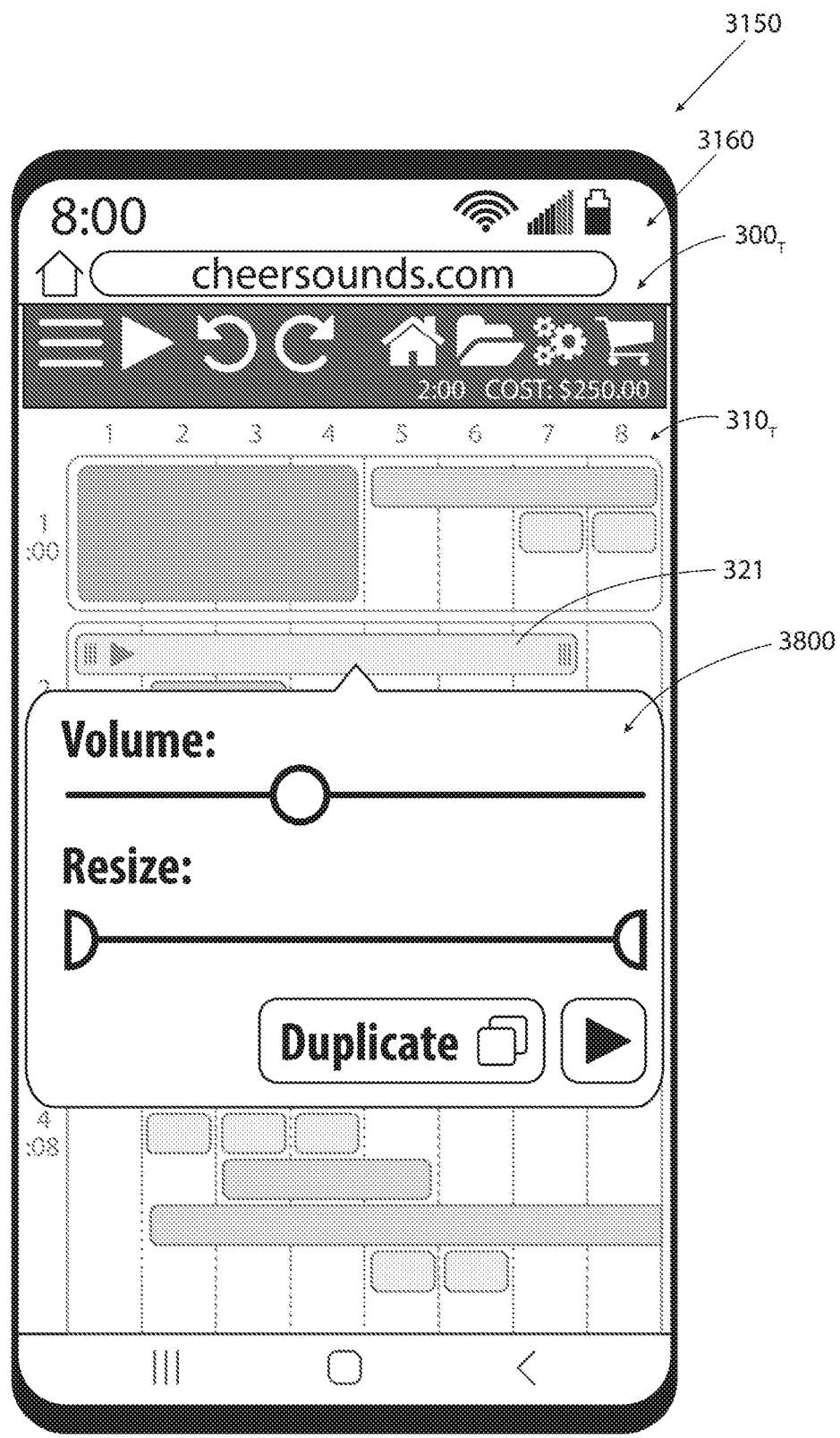

GUI 300$_T$ can also be configured to display a pop-up menu 3800, such as illustrated in FIG. 20E. Pop-up menu 3800 can be configured to be displayed when a select icon 321 is tapped (e.g. selected by momentarily tapping with the finger) by the user. Pop-up menu 3800 can comprise one, two, or more controls configured to allow the user to modify a parameter of the select icon 321, as described herein. In some embodiments, pop-up menu 3800 is configured to automatically close when the user touches a location on screen 3610 not included within menu 3800, for example, in the example illustrated in FIG. 20E, when the user touches the area above or below menu 3800 (e.g. touches grid image 310$_T$ displayed behind menu 3800).

Figure 20F:
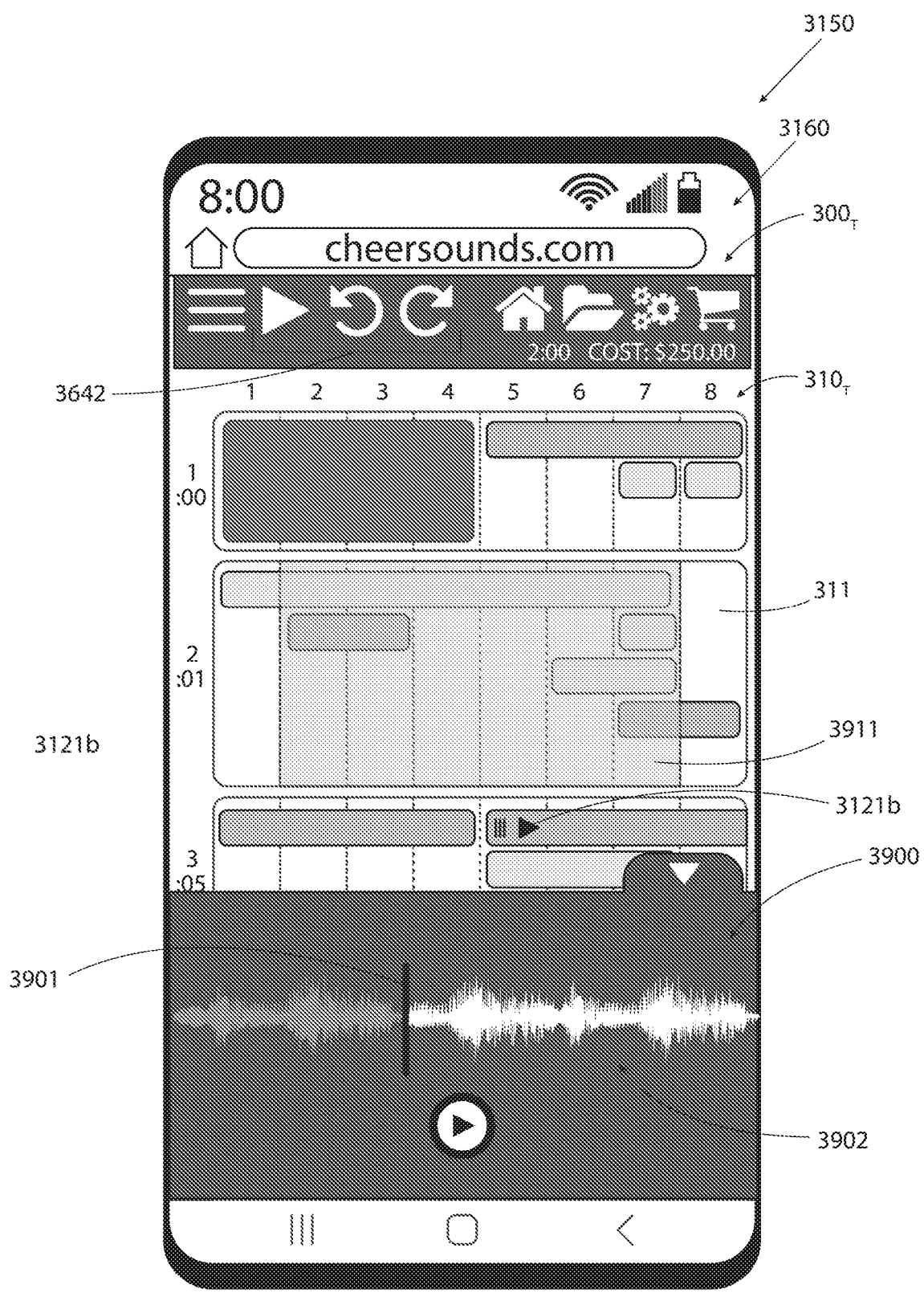

GUI 300$_T$ can also be configured to display a pop-up player, player 3900, such as is illustrated in FIG. 20F. Player 3900 can be displayed when the user selects a play control, such as a control 3642 configured to render and play the grid file 130 associated with the grid image 310$_T$, and/or when the user selects a play control 3121$b$ of a select icon 321 configured to play the source data file 350 associated with the select icon 321. In some embodiments, GUI 300$_T$ enables the user to select one, two, or more cells 311 by touching a first cell 311 and moving their finger (e.g. dragging their finger) to select two or more additional cells 311, cells 3911 shown highlighted in FIG. 20F. After selecting one, two, or more cells 311 in this manner, system 10 can be configured to automatically render and/or play the selected portion of grid image 310$_T$, and it can automatically display player 3900. Player 3900 can comprise a seek bar 3901, displayed over a waveform display 3902. Seek bar 3901 can enable the user to perform a seek function through the file (e.g. source data filed 350) being played. In some embodiments, as grid file 130 is being played, grid image 310$_T$ is configured to automatically scroll such that the portion of grid image 310$_T$ being played is displayed. In some embodiments, the current cell 311 (e.g. the cell representing the portion of the grid file currently being played) is highlighted during playback, such as is described herein in reference to FIGS. 5A and 5B. In some embodiments, player 3900 comprises one or more controls configured to be rendered within a group of cells 311 (e.g. instead of being displayed at the bottom of GUI 300$_T$). For example, the user can select a group of cells 311 to be rendered and played by system 10, and waveform display 3902 can be displayed within the selected cells (e.g. displayed semi-transparently and/or behind other items such as one or more select icons 321 also displayed within the selected cells 311). In some embodiments, a waveform display 3902 rendered within one or more neighboring cells 311 indicates a portion of grid image 310$_T$ which has been previously rendered and is ready for immediate playback (e.g. playback without the need to render the region of grid image 310$_T$). One or more select icons 321 within a previously rendered region of grid image 310$_T$ is modified (e.g. moved), the waveform display 3902 can be removed to indicate the need to re-render the region before playback.

While device 3150 of FIGS. 20A-F has been described primarily as a device including a touch-input enabled screen 3160, through which information is input into device 3150 via touch (e.g. via fingers of a user or a stylus), each of the methods of controlling, entering information, and/or otherwise using device 3150 can be accomplished via other input means, such as input means selected from the group consisting of: voice control; mouse control; touchpad control; motion control (e.g. as interpreted by a motion sensing device); eye-gaze control (e.g. as interpreted by a device configured to monitor eye motion of a user); thought control (e.g. as interpreted by a brain-machine interface); and/or other input means known to those of skill in the art.

While the present inventive concepts have been particularly shown and described above with reference to example embodiments thereof, it will be understood by those of ordinary skill in the art, that various changes in form and detail can be made without departing from the spirit and scope of the present inventive concepts described and defined by the following claims.

What is claimed is:

1. A system for creating an output, comprising:
a processing unit;
a user input module operably connected to the processing unit; and
a video monitor operably connected to the processing unit, wherein the processing unit provides on the video monitor:
a grid image comprising multiple cells, each cell representing a duration of time; and
a selection area comprising multiple select icons, each select icon representing a source data file;
wherein the processing unit is configured such that a user can create a grid layout representing the correlation between individual selected source data files and one, two, or more of the multiple cells;
wherein the processing unit produces the output based on the correlation; and
wherein the processing unit further comprises memory storing instructions for the processing unit to perform an algorithm configured to automate, semi-automate, and/or otherwise assist a user with the layout of the grid image and/or production of the output,
wherein the source data file comprises a parent source data file comprising one, two, or more nested child source data files,
wherein the system is configured to open a zoom window to allow the user to modify the parent source data file,
wherein the system is configured to allow a user to rearrange, add, and/or subtract one, two, or more child source data files, and
wherein the system is configured to generate the parent source data when the user adds one, two, or more source data files to the grid image, and wherein the one, two, or more source data files comprise the child source data files.

2. The system according to claim 1, wherein the system further comprises a graphical user interface comprising one, two, or more controls configured to allow a user to modify the grid image.

3. The system according to claim 1, further comprising a marketplace.

4. The system according to claim 3, wherein a user can purchase an output from the marketplace.

5. The system according to claim 4, wherein the output comprises multiple outputs, and wherein a user can purchase one, two, or more of the multiple outputs from the marketplace.

6. The system according to claim 3, wherein the system is configured to allow a first user to create a grid layout, wherein the processing unit creates an output based on the grid layout, and wherein a second user can purchase the output from the marketplace.

7. The system according to claim 6, wherein the system is configured to allow the first user to receive a royalty when the second user purchases the output from the marketplace.

8. A system for creating an output, comprising:
a processing unit;
a user input module operably connected to the processing unit; and
a video monitor operably connected to the processing unit, wherein the processing unit provides on the video monitor:
a grid image comprising multiple cells, each cell representing a duration of time; and
a selection area comprising multiple select icons, each select icon representing a source data file;
wherein the processing unit is configured such that a user can create a grid layout representing the correlation between individual selected source data files and one, two, or more of the multiple cells;
wherein the processing unit produces the output based on the correlation,
wherein the processing unit further comprises memory storing instructions for the processing unit to perform an algorithm configured to automate, semi-automate, and/or otherwise assist a user with the layout of the grid image and/or production of the output,
wherein the algorithm comprises an error detection algorithm, and
wherein the error detection algorithm is configured to detect an undesired positioning of a source data file in the grid image.

9. The system according to claim 8, wherein the error detection algorithm is configured to produce a warning upon detection of an undesired event.

10. The system according to claim 8, wherein the error detection algorithm is configured to prevent preview of the output upon detection of an undesired event.

11. The system according to claim 8, wherein the error detection algorithm is configured to prevent creation of the output upon detection of an undesired event.

12. The system according to claim 8, wherein the system further comprises a user upload function, wherein the error detection algorithm detects one, two, or more undesirable characteristics of a user uploaded file.

13. The system according to claim 8, wherein the error detection algorithm is configured to automatically and/or semi-automatically correct one, two, or more errors.

14. The system according to claim 8, wherein the processing unit is configured to create the grid layout based on one, two, or more user inputs.

15. The system according to claim 14, wherein the algorithm comprises an automation algorithm configured to create the grid layout based on a correlation between two or more source data files.

16. The system according to claim 15, wherein the processing unit produces the output based on the grid layout.

17. The system according to claim 8, wherein the processing unit is configured to analyze and replace one, two, or more source data files on the grid image.

18. The system according to claim 8, wherein the processing unit is configured to analyze the grid image as a user modifies an associated grid layout.

19. The system according to claim 18, wherein the processing unit is configured to provide suggestions based on the modifications.

20. The system according to claim 19, wherein the processing unit is configured to provide the suggestions in real time.

21. The system according to claim 8, wherein the processing unit is configured to analyze data recorded by one, two, or more sensors.

22. The system according to claim 21, wherein the processing unit is configured to generate the grid image based on the analyzed data.

23. The system according to claim 8, wherein the processing unit is configured to simultaneously produce at least portions of the output as a user edits the grid image.

24. The system according to claim 8, wherein the processing unit is configured to produce the output without user interaction.

25. A system for creating an output, comprising:
a processing unit;
a user input module operably connected to the processing unit; and
a video monitor operably connected to the processing unit, wherein the processing unit provides on the video monitor:
a grid image comprising multiple cells, each cell representing a duration of time; and
a selection area comprising multiple select icons, each select icon representing a source data file;
wherein the processing unit is configured such that a user can create a grid layout representing the correlation between individual selected source data files and one, two, or more of the multiple cells;
wherein the processing unit produces the output based on the correlation,
wherein the processing unit further comprises memory storing instructions for the processing unit to perform an algorithm configured to automate, semi-automate, and/or otherwise assist a user with the layout of the grid image and/or production of the output,
wherein the algorithm comprises an error detection algorithm, and
wherein the error detection algorithm is configured to detect an undesired length of the grid layout.

26. The system according to claim 25, wherein the system further comprises a user upload function, wherein the error detection algorithm detects one, two, or more undesirable characteristics of a user uploaded file.

27. The system according to claim 25, wherein the error detection algorithm is configured to automatically and/or semi-automatically correct one, two, or more errors.

28. A system for creating an output, comprising:
a processing unit;
a user input module operably connected to the processing unit; and
a video monitor operably connected to the processing unit, wherein the processing unit provides on the video monitor:
a grid image comprising multiple cells, each cell representing a duration of time; and
a selection area comprising multiple select icons, each select icon representing a source data file;
wherein the processing unit is configured such that a user can create a grid layout representing the correlation between individual selected source data files and one, two, or more of the multiple cells;
wherein the processing unit produces the output based on the correlation,
wherein the processing unit further comprises memory storing instructions for the processing unit to perform an algorithm configured to automate, semi-automate, and/or otherwise assist a user with the layout of the grid image and/or production of the output,
wherein the algorithm comprises an error detection algorithm, and
wherein the one, two, or more source data files comprise a matching score, wherein the error detection algorithm detects a poor compatibility between two or more source data files based on the matching score.

29. The system according to claim 28, wherein the two or more source data files are sequentially placed in the grid layout.

30. The system according to claim 28, wherein the error detection algorithm is configured to automatically and/or semi-automatically correct one, two, or more errors.

31. A system for creating an output, comprising:
a processing unit;
a user input module operably connected to the processing unit; and
a video monitor operably connected to the processing unit, wherein the processing unit provides on the video monitor:
a grid image comprising multiple cells, each cell representing a duration of time; and
a selection area comprising multiple select icons, each select icon representing a source data file;
wherein the processing unit is configured such that a user can create a grid layout representing the correlation between individual selected source data files and one, two, or more of the multiple cells;
wherein the processing unit produces the output based on the correlation,
wherein the processing unit further comprises memory storing instructions for the processing unit to perform an algorithm configured to automate, semi-automate, and/or otherwise assist a user with the layout of the grid image and/or production of the output,
wherein the processing unit is configured to provide suggestions to a user, and
wherein the provided suggestions are configured to create a transition between two source data files.

32. The system according to claim 31, wherein the source data file comprises lyrics and the provided suggestions are based on the lyrics.

* * * * *